United States Patent
Cavanaugh et al.

(10) Patent No.: US 11,753,788 B2
(45) Date of Patent: *Sep. 12, 2023

(54) MULTILAYER INTEGRAL GEOGRIDS HAVING A CELLULAR LAYER STRUCTURE, AND METHODS OF MAKING AND USING SAME

(71) Applicant: Tensar International Corporation, Alpharetta, GA (US)

(72) Inventors: Joseph Cavanaugh, Cumming, GA (US); Manoj Kumar Tyagi, Fayetteville, GA (US); Daniel Mark Baker, Broomfield, CO (US); Andrew Curson, Burnley (GB); Tom-Ross Jenkins, Baildon (GB); Andrew Edward Waller, Newton Le Willows (GB); Daniel John Gallagher, Adlington (GB)

(73) Assignee: TENSAR INTERNATIONAL CORPORATION, Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/557,504

(22) Filed: Dec. 21, 2021

(65) Prior Publication Data

US 2022/0275596 A1    Sep. 1, 2022

Related U.S. Application Data

(60) Provisional application No. 63/154,209, filed on Feb. 26, 2021, provisional application No. 63/154,588, filed on Feb. 26, 2021.

(51) Int. Cl.
*E02D 17/20* (2006.01)
*B32B 3/26* (2006.01)
(Continued)

(52) U.S. Cl.
CPC ............ *E02D 17/202* (2013.01); *B32B 3/266* (2013.01); *B32B 5/18* (2013.01); *B32B 27/08* (2013.01);
(Continued)

(58) Field of Classification Search
CPC .. B32B 5/18; B32B 3/266; B32B 3/12; E02D 17/202; E02D 2300/0006; E02D 2300/0084
See application file for complete search history.

(56) References Cited

U.S. PATENT DOCUMENTS 3,252,181 A    5/1966  Hureau
3,317,951 A    5/1967  Hureau
(Continued)

FOREIGN PATENT DOCUMENTS

CN    201411677    2/2010
CN    201826440    5/2011
(Continued)

OTHER PUBLICATIONS

Das, Braja, M. Use of geogrid in the construction of railroads. Innov. Infrastruc. Solu. (2016) 1:15, published Jun. 28, 2016.
(Continued)

*Primary Examiner* — Hai Vo
(74) *Attorney, Agent, or Firm* — Jacobson Holman, PLLC

(57) ABSTRACT

A multilayer integral geogrid, including one or more cellular layers, has a plurality of oriented multilayer strands interconnected by partially oriented multilayer junctions with an array of openings therein. The multilayer integral geogrid having one or more cellular layers is produced from a coextruded or laminated multilayer polymer starting sheet. The integral geogrid has a multilayer construction, with at least one outer layer thereof having the cellular structure. By virtue of the cellular layer structure, the multilayer integral
(Continued)

geogrid provides for increased layer vertical compressibility under load, resulting in enhanced material properties that provide performance benefits to use of the multilayer integral geogrid to stabilize and strengthen soil, aggregates, or other particulate materials.

11 Claims, 59 Drawing Sheets

(51) Int. Cl.
*B32B 27/08* (2006.01)
*B32B 5/18* (2006.01)
*B32B 37/16* (2006.01)
*B32B 27/32* (2006.01)

(52) U.S. Cl.
CPC .............. *B32B 27/32* (2013.01); *B32B 37/16* (2013.01); *B32B 2250/24* (2013.01); *B32B 2250/40* (2013.01); *B32B 2264/104* (2013.01); *B32B 2307/518* (2013.01); *B32B 2307/732* (2013.01); *E02D 2300/0006* (2013.01); *E02D 2300/0084* (2013.01)

(56) References Cited

U.S. PATENT DOCUMENTS

| | | | |
|---|---|---|---|
| 3,496,965 | A | 2/1970 | Hureau |
| 4,374,798 | A | 2/1983 | Mercer |
| 4,470,942 | A | 9/1984 | Beretta |
| 4,590,029 | A | 5/1986 | Mercer |
| 4,743,486 | A | 5/1988 | Mercer et al. |
| 4,756,946 | A | 7/1988 | Mercer |
| 4,808,358 | A | 2/1989 | Beretta |
| 5,053,264 | A | 10/1991 | Beretta |
| 5,419,659 | A | 5/1995 | Mercer |
| 7,001,112 | B2 | 2/2006 | Walsh |
| 9,315,953 | B2 | 4/2016 | White |
| 9,556,580 | B2 | 1/2017 | Walsh |
| 10,024,002 | B2 | 7/2018 | Walsh |
| 10,501,896 | B2 | 12/2019 | Walsh |
| 11,390,015 | B2 * | 7/2022 | Curson ................ E02D 17/202 |
| 11,519,150 | B2 * | 12/2022 | Curson ................... E02D 3/00 |
| 2009/0263645 | A1 * | 10/2009 | Barger ................... B29C 48/08 |
| | | | 264/46.1 |
| 2015/0203648 | A1 * | 7/2015 | Yahara ..................... C08J 9/141 |
| | | | 521/150 |
| 2018/0298582 | A1 * | 10/2018 | Shelton .................. B29C 55/12 |
| 2022/0127810 | A1 * | 4/2022 | Curson ................. E02D 17/202 |

FOREIGN PATENT DOCUMENTS

| | | |
|---|---|---|
| CN | 102615817 | 8/2012 |
| CN | 102615818 | 8/2012 |
| CN | 203855867 | 10/2014 |
| CN | 205171489 | 4/2016 |
| CN | 205421227 | 8/2016 |
| CN | 205990615 | 3/2017 |
| CN | 208039219 | 11/2018 |

OTHER PUBLICATIONS

Webster, S. L. Geogrid reinforced based courses for flexible pavements for light aircraft: Test section construction, behavior under traffic, laboratory tests, and design criteria. Report DOT/FAA/RD-92, Dec. 1992.

Ghafoori, Nader, Ph.D et al. Use of geogrid for strengthening and reducing the roadway structural sections. NDOT Research Report No. 327-12-803, Jan. 2016.

Giroud, J.P. et al. Discussing of "Design Method for Geogrid-Reinforced Unpaved Roads, I: Development of Design Method." Journal of Geotechnical and Geoenvironmental Engineering. Aug. 2004, vol. 130, No. 8, pp. 775-786.

Koerner, Robert M. Designing with Geosynthetics. Fourth Edition, 1998.

"Geosynthetic Design & Construction Guidelines—Reference Manual—NHI Course No. 132013," U.S. Department of Transportation Federal Highway Administration Publication No. FHWA NHI-07-092, Aug. 28, 2008.

* cited by examiner

| | Recipe | Nominal Sheet thickness, mm | Nominal Hexagon A/F, mm | Approx. Geogrid Weight, kg/m^2 | Average Rib Height, mm | Average Rib Width, mm | Average Rib Aspect Ratio |
|---|---|---|---|---|---|---|---|
| Invention | CaCO3 2X Caps | 5.5 | 80 | 0.294 | 2.2 | 1.4 | 1.6 |
| Invention | CaCO3 2X Caps | 6.2 | 80 | 0.351 | 2.7 | 1.4 | 2.0 |
| Invention | CaCO3 2X Caps | 7.5 | 80 | 0.425 | 3.1 | 1.4 | 2.4 |

FIG. 27

|  | Recipe | Nominal Sheet thickness, mm | Nominal Hexagon A/F, mm | Approx. Geogrid Weight, kg/m^2 | Average Rib Height, mm |
|---|---|---|---|---|---|
| Invention-Hexagonal | CaCO3 2X Caps | 6.2 | 80 | 0.294 | 2.7 |
| Solid/Mono-Hexagonal | Solid/Mono | 6.3 | 80 | 0.285 | 2.8 |

FIG. 31

| | Recipe | Nominal Sheet thickness, mm | Nominal Hexagon A/F, mm | Approx. Geogrid Weight, kg/m^2 | Average Rib Height, mm |
|---|---|---|---|---|---|
| Invention−Hexagonal | CaCO3 2X Caps | 7.5 | 80 | 0.425 | 3.1 |
| Solid/Mono−Hexagonal | Solid/Mono | 7.5 | 80 | 0.413 | 3.0 |

FIG. 33

| Nominal Test | |
|---|---|
| Sample | Force at 0.5mm (N) |
| A | 383 |
| C | 82 |
| E | 712 |

FIG. 35

|  | Average values | |
| --- | --- | --- |
|  | Peak stress (psi) | strain at peak stress (%) |
| Control | 55.9 | 1.81 |
| Grid A | 70.2 | 2.17 |
| Grid B | 71.1 | 2.08 |
| Grid C | 71.6 | 2.27 |
| Grid D | 71.0 | 1.92 |
| Grid E | 70.1 | 1.82 |
| Grid G | 72.0 | 2.07 |

FIG. 37

| Trafficking test No. | Material | Sheet Configuration | Final pattern description | Punch Diameter (L for laser) (mm) | Final Aperture size (mm AF) | Sheet thickness (mm) | Rib aspect ratio | Av. surface defm. For last 500 passes (mm) | Overall Average Surface Deformation last 500 passes (mm) |
|---|---|---|---|---|---|---|---|---|---|
| 0200504A | PP-25% CaCO3 Masterbatch 75 PP-PP | 1mm/3.7mm/1mm | TX | 3.68 | 76 | 5.7 | 1.94 | 27.7 | 32.3 |
| 0200605A | PP-25% CaCO3 Masterbatch 75 PP-PP | 1mm/3.7mm/1mm | TX | 3.68 | 76 | 5.7 | 1.94 | 32.7 | |
| 0200522A | PP-25% CaCO3 Masterbatch 75 PP-PP | 1mm/3.7mm/1mm | TX | 3.68 | 76 | 5.7 | 1.94 | 36.6 | |
| 0200617A | PP-25% CaCO3 Masterbatch 75 PP-PP | 1mm/3.7mm/1mm | Hexagonal | 3.68 | 79 | 5.7 | 1.76 | 22.8 | 24.6 |
| 0200520A | PP-25% CaCO3 Masterbatch 75 PP-PP | 1mm/3.7mm/1mm | Hexagonal | 3.68 | 79 | 5.7 | 1.76 | 24.2 | |
| 0200604A | PP-25% CaCO3 Masterbatch 75 PP-PP | 1mm/3.7mm/1mm | Hexagonal | 3.68 | 79 | 5.7 | 1.76 | 24.8 | |
| 0200612A | PP-25% CaCO3 Masterbatch 75 PP-PP | 1mm/3.7mm/1mm | Hexagonal | 3.68 | 79 | 5.7 | 1.76 | 26.4 | |

FIG. 50

| Trafficking test No. | Material | Sheet Configuration | Final pattern description | Punch Diameter (L for laser) (mm) | Final Aperture size (mm AF) | Sheet thickness (mm) | Rib aspect ratio | Av. surface defm. For last 500 passes (mm) | Overall Average Surface Deformation last 500 passes (mm) |
|---|---|---|---|---|---|---|---|---|---|
| 0200729A | Foam PP (Microcell 544)-PP-Foam PP (Microcell 544) | 2mm/2mm/2mm | Hexagonal | 3.68 | 78 | 6 | 1.69 | 23.4 | 30.9 |
| 0200806A | Foam PP (Microcell 544)-PP-Foam PP (Microcell 544) | 2mm/2mm/2mm | Hexagonal | 3.68 | 78 | 6 | 1.69 | 33.5 | |
| 0200820A | Foam PP (Microcell 544)-PP-Foam PP (Microcell 544) | 2mm/2mm/2mm | Hexagonal | 3.68 | 78 | 6 | 1.69 | 35.9 | |
| 0200831A | PP-M544-PP | 1mm/4.2mm/1mm | Hexagonal | 3.68 | 77 | 6.2 | 1.69 | 33.9 | 34.8 |
| 0200826A | PP-M544-PP | 1mm/4.2mm/1mm | Hexagonal | 3.68 | 79 | 6.2 | 1.48 | 29.2 | |
| 0200811A | PP-M544-PP | 1mm/4.2mm/1mm | Hexagonal | 3.68 | 79 | 6.2 | 1.48 | 29.5 | |
| 0200825A | PP-M544-PP | 1mm/4.2mm/1mm | Hexagonal | 3.68 | 79 | 6.2 | 1.48 | 30.5 | |
| 0200805A | PP-M544-PP | 1mm/4.2mm/1mm | Hexagonal | 3.68 | 79 | 6.2 | 1.48 | 32.8 | |
| 0200827A | PP-M544-PP | 1mm/4.2mm/1mm | Hexagonal | 3.68 | 79 | 6.2 | 1.48 | 34.4 | |
| 0200212A | PP-Foam PP (Microcell 544)-PP | 1mm/4.2mm/1mm | Hexagonal | 3.68 | 79 | 6.2 | 1.85 | 36.2 | |
| 0200214A | PP-Foam PP (Microcell 544)-PP | 1mm/4.2mm/1mm | Hexagonal | 3.68 | 79 | 6.2 | 1.85 | 51.6 | |

FIG. 52

| Trafficking test No. | Material | Sheet Configuration | Final pattern description | Punch Diameter (L for laser) (mm) | Final Aperture size (mm AF) | Sheet thickness (mm) | Rib aspect ratio | Av. surface defm. For last 500 passes (mm) | Overall Average Surface Deformation last 500 passes (mm) |
|---|---|---|---|---|---|---|---|---|---|
| 0200921A | 25% CaCO3 Masterbatch 75% PP-PP-25% CaCO3 Masterbatch 75% PP | 1mm/4.2mm/1mm | Hexagonal | 3.68 | 79 | 6.2 | 1.83 | 24.6 | 29.8 |
| 0200929A | 25% CaCO3 Masterbatch 75% PP-PP-25% CaCO3 Masterbatch 75% PP | 1mm/4.2mm/1mm | Hexagonal | 3.68 | 79 | 6.2 | 1.83 | 31.0 | |
| 0200908A | 25% CaCO3 Masterbatch 75% PP-PP-25% CaCO3 Masterbatch 75% PP | 1mm/4.2mm/1mm | Hexagonal | 3.68 | 79 | 6.2 | 1.53 | 33.8 | |
| 0200916A | PP-M544-PP-M544-PP | 0.2mm/1.5mm /2.8mm/1.5mm /0.2mm | Hexagonal | 3.68 | 81 | 6.2 | 1.53 | 29.5 | 32.0 |
| 0200928A | PP-M544-PP-M544-PP | 0.2mm/1.5mm /2.8mm/1.5mm /0.2mm | Hexagonal | 3.68 | 81 | 6.2 | 1.53 | 30.1 | |
| 0200907A | PP-M544-PP-M544-PP | 0.2mm/1.5mm /2.8mm/1.5mm /0.2mm | Hexagonal | 3.68 | 81 | 6.2 | 1.53 | 36.5 | |
| 0190724A | PP | 6.2mm | Hexagonal | 3.68 L | 80 | 6.2 | 2.66 | 45.8 | 45.4 |
| 0190711A | PP | 6.3mm | Hexagonal | 3.68 CNC | 80 | 6.3 | 2.89 | 45.0 | |

FIG. 54

| Trafficking test No. | Material | Sheet Configuration | Final pattern description | Punch Diameter (L for laser) (mm) | Final Aperture size (mm AF) | Sheet thickness (mm) | Rib aspect ratio | Av. surface defm. For last 500 passes (mm) | Overall Average Surface Deformation last 500 passes (mm) |
|---|---|---|---|---|---|---|---|---|---|
| 0200921A | 25% CaCO3 Masterbatch 75% PP-PP-25% CaCO3 Masterbatch 75% PP | 1mm/4.2mm/1mm | Hexagonal | 3.68 | 79 | 6.2 | 1.83 | 24.6 | 29.6 |
| 0200929A | 25% CaCO3 Masterbatch 75% PP-PP-25% CaCO3 Masterbatch 75% PP | 1mm/4.2mm/1mm | Hexagonal | 3.68 | 79 | 6.2 | 1.83 | 31.0 | |
| 0200908A | 25% CaCO3 Masterbatch 75% PP-PP-25% CaCO3 Masterbatch 75% PP | 1mm/4.2mm/1mm | Hexagonal | 3.68 | 79 | 6.2 | 1.83 | 33.8 | |
| 0201111A | 25% CaCO3 Masterbatch 75% PP-PP-25% CaCO3 Masterbatch 75% PP | 1.25mm/5mm/1.25mm | Hexagonal | 3.68 | 79 | 7.5 | 1.92 | 22.8 | |
| 0201104A | 25% CaCO3 Masterbatch 75% PP-PP-25% CaCO3 Masterbatch 75% PP | 1.25mm/5mm/1.25mm | Hexagonal | 3.68 | 79 | 7.5 | 1.92 | 32.5 | |
| 0201130A | 25% CaCO3 Masterbatch 75% PP-PP-25% CaCO3 Masterbatch 75% PP | 1.25mm/5mm/1.25mm | Hexagonal | 3.68 | 79 | 7.5 | 1.92 | 33.2 | |
| 0180502A | PP | 8.5mm | TX160 Mod | 3.7 | 80 | 8.5 | 2.95 | 39.0 | 39.9 |
| 0180411A | PP | 8.5mm | TX160 Mod | 5.5 | 80 | 8.5 | 6.26 | 39.2 | |
| 0180510A | PP | 8.5mm | TX160 Mod | 3.68 | 80 | 8.5 | 2.75 | 39.5 | |
| 0180518A | PP | 8.5mm | TX160 Mod | 4 | 80 | 8.5 | 2.33 | 41.7 | |
| 0180417A | PP | 8.5mm | TX160 Mod | 4.7 | 82 | 8.5 | 3.46 | 40.2 | |

FIG. 56

MULTILAYER INTEGRAL GEOGRIDS HAVING A CELLULAR LAYER STRUCTURE, AND METHODS OF MAKING AND USING SAME

CROSS-REFERENCE TO RELATED APPLICATIONS

This application is related to and claims the benefit of priority to U.S. patent application Ser. No. 17/355,843 entitled "Multi-Axial Integral Geogrid and Methods of Making and Using Same" filed Jun. 23, 2021, and International Patent Application No. PCT/US2021/038863 entitled "Multi-Axial Integral Geogrid and Methods of Making and Using Same" filed Jun. 24, 2021; both applications which further are related to and claim priority to U.S. Provisional Application for Patent No. 63/043,627 entitled "Multi-Axial Integral Geogrid and Methods of Making and Using Same" filed Jun. 24, 2020, U.S. Provisional Application for Patent No. 63/154,209 entitled "Multilayer Integral Geogrids Having a Cellular Layer Structure, and Methods of Making and Using Same" filed Feb. 26, 2021, and U.S. Provisional Application for Patent No. 63/154,588 entitled "Horizontal Mechanically Stabilizing Geogrid with Improved Geotechnical Interaction" filed Feb. 26, 2021. This application is also related to a patent application entitled "Horizontal Mechanically Stabilizing Geogrid with Improved Geotechnical Interaction" being filed concurrently herewith. The disclosures of said applications are incorporated herein by reference in their entireties.

BACKGROUND OF THE INVENTION

1. Field of the Invention

The present invention relates generally to integral geogrids and other oriented grids used for structural or construction reinforcement and stabilization, and other geotechnical purposes. More particularly, the present invention relates to such integral geogrids having a multilayer construction, including one or more layers having a cellular structure, that provides enhanced vertical compressibility and enhanced frictional characteristics of the integral geogrid. The present invention also relates to such integral geogrids having the ability to engage with and stabilize a greater variety and range of quality of aggregates, and, as well as other desirable characteristics as disclosed herein. The present invention also relates to soil constructions incorporating the integral geogrid of the present invention which are characterized by enhanced engineering behavior and properties, such as, for example, density, stiffness, strength, and ductility.

This invention also relates to the method of producing such multilayer integral geogrids having one or more cellular layers. Lastly, the present invention relates to the use of such multilayer integral geogrids for soil and particulate reinforcement and stabilization, and methods of such reinforcement and stabilization.

For the purpose of this invention, the term "integral geogrid" is intended to include integral geogrids and other integral grid structures made by orienting (i.e., stretching) a polymeric starting material in the form of a sheet or a sheet-like shape of a requisite thickness and having holes or depressions made or formed therein.

2. Description of Related Art

Polymeric integral grid structures having mesh openings defined by various geometric patterns of substantially parallel, oriented strands and junctions therebetween, such as integral geogrids, have been manufactured and sold for over 35 years. Such grids are manufactured by extruding and forming an integrally cast starting sheet having a specified pattern of holes or depressions which is followed by the controlled uniaxial or biaxial stretching and orientation of the sheet into highly oriented strands (also sometimes hereinafter referred to as ribs) and partially oriented junctions defining mesh openings formed by the holes or depressions. Such stretching and orienting of the sheet in either a uniaxial or a biaxial direction develops strand tensile strength and modulus. These integral oriented polymer grid structures can be used for retaining or stabilizing particulate material of any suitable form, such as soil, earth, sand, clay, gravel, etc. and in any suitable location, such as on the side of a road or other cutting or embankment, beneath a road surface, runway surface, etc.

Various shapes and patterns of holes have been experimented with to achieve higher levels of strength to weight ratio, or to achieve faster processing speeds during the manufacturing process. Orientation is accomplished under controlled temperatures and strain rates. Some of the variables in this process include draw ratio, molecular weight, molecular weight distribution, and degree of branching or cross linking of the polymer.

The manufacture and use of such integral geogrids and other integral grid structures can be accomplished by well-known techniques. As described in detail in U.S. Pat. No. 4,374,798 to Mercer, U.S. Pat. No. 4,590,029 to Mercer, U.S. Pat. No. 4,743,486 to Mercer and Martin, U.S. Pat. No. 4,756,946 to Mercer, and U.S. Pat. No. 5,419,659 to Mercer, a starting polymeric sheet material is first extruded and then punched to form the requisite defined pattern of holes or depressions. The integral geogrid is then formed by the requisite stretching and orienting of the punched sheet material.

Such integral geogrids, both uniaxial integral geogrids and biaxial integral geogrids (collectively "integral geogrids," or separately "uniaxial integral geogrid(s)" or "biaxial integral geogrid(s)") were invented by the aforementioned Mercer in the late 1970s and have been a tremendous commercial success over the past 35 years, totally revolutionizing the technology of reinforcing soils, roadway underpavements and other civil engineering structures made from granular or particulate materials.

Mercer discovered that by starting with a relatively thick, substantially uniplanar polymer starting sheet, preferably on the order of 1.5 mm (0.059055 inch) to 4.0 mm (0.15748 inch) thick, having a pattern of holes or depressions whose centers lie on a notional substantially square or rectangular grid of rows and columns, and stretching the starting sheet either unilaterally or biaxially so that the orientation of the strands extends into the junctions, a totally new substantially uniplanar integral geogrid could be formed. As described by Mercer, "uniplanar" means that all zones of the sheet-like material are symmetrical about the median plane of the sheet-like material.

In U.S. Pat. No. 3,252,181 to Hureau, U.S. Pat. No. 3,317,951 to Hureau, U.S. Pat. No. 3,496,965 to Hureau, U.S. Pat. No. 4,470,942 to Beretta, U.S. Pat. No. 4,808,358 to Beretta and U.S. Pat. No. 5,053,264 to Beretta, the starting material with the requisite pattern of holes or depressions is formed in conjunction with a cylindrical polymer extrusion and substantial uniplanarity is achieved by passing the extrusion over an expanding mandrel. The expanded cylinder is then slit longitudinally to produce a flat substantially uniplanar starting sheet.

Another integral geogrid is described in U.S. Pat. No. 7,001,112 to Walsh (hereinafter the "Walsh '112 patent"), assigned to Tensar International Limited, an associated company of the assignee of the instant application for patent, Tensar International Corporation, Inc. (hereinafter "Tensar") of Atlanta, Ga. The Walsh '112 patent discloses oriented polymer integral geogrids including a biaxially stretched integral geogrid in which oriented strands form triangular mesh openings with a partially oriented junction at each corner, and with six highly oriented strands meeting at each junction (hereinafter sometimes referred to herein as "triaxial integral geogrid"). The triaxial integral geogrids of the Walsh '112 patent have been commercialized by Tensar to substantial success.

Still another integral geogrid is disclosed in U.S. Pat. No. 9,556,580 to Walsh, U.S. Pat. No. 10,024,002 to Walsh, and U.S. Pat. No. 10,501,896 to Walsh, all of which are assigned to Tensar Technologies Limited, another associated company of the assignee of the instant application for patent. The aforementioned Walsh U.S. Pat. Nos. 9,556,580, 10,024,002, and 10,501,896 disclose an integral geogrid having what is known to one skilled in the art as a high aspect ratio, i.e., a ratio of the thickness or height of the strand cross section to the width of the strand cross section, that is greater than 1.0. While it has been shown that the performance of multiaxial integral geogrids can be improved by using a geogrid structure that has ribs with an aspect ratio greater than 1.0, the increase in aspect ratio comes with increases in the overall amount of polymer required, thus increasing the weight and cost of the geogrid.

Traditionally, the polymeric materials used in the production of integral geogrids have been high molecular weight homopolymer or copolymer polypropylene, and high density, high molecular weight polyethylene. Various additives, such as ultraviolet light inhibitors, carbon black, processing aids, etc., are added to these polymers to achieve desired effects in the finished product and/or manufacturing efficiency.

And, also traditionally, the starting material for production of such integral geogrids has typically been a substantially uniplanar sheet that has a monolayer construction, i.e., a homogeneous single layer of a polymeric material.

While an integral geogrid produced from the above-described conventional starting materials exhibits generally satisfactory properties, it is structurally and economically advantageous to produce integral geogrids which when incorporated in soil constructions provide a relatively higher degree of stiffness suitable for the demands of certain applications such as geosynthetic reinforcement or having other properties desirable for a particular geosynthetic application.

Thus, a need has existed for a starting material not only that is suitable for the process constraints associated with the production of integral geogrids, but also that once the integral geogrid has been produced and is in service, provides a higher degree of soil construction stiffness than that associated with conventional geogrid starting materials, or provides other desirable properties not available with current monolayer integral geogrids, such as, for example, density, strength, and ductility.

Furthermore, while an integral geogrid produced from the above-described conventional starting materials and in conventional configurations may exhibit generally satisfactory properties, it is structurally and economically advantageous to produce an integral geogrid having a structure and geometry with the ability to engage with and stabilize a greater variety and range of quality of aggregates that is suitable for the demands of particular service applications, such as geosynthetic reinforcement or having other properties desirable for particular geosynthetic applications.

It is intended that the present invention be applicable to all integral grids regardless of the method of starting sheet formation or the method of orienting the starting material into the integral geogrid or grid structure. The subject matter of the foregoing U.S. Pat. Nos. 3,252,181, 3,317,951, 3,496,965, 4,470,942, 4,808,358, 5,053,264, 7,001,112, 9,556,580, 10,024,002, and 10,501,896, is expressly incorporated into this application by reference as if the disclosures were set forth herein in their entireties. These patents are cited as being illustrative, and are not considered to be inclusive, or to exclude other techniques known in the art for the production of integral polymer grid materials.

Despite the functional characteristics available with current monolayer integral geogrids, there are performance improvements that have yet to be attained over prior art integral geogrids. One such enhancement is disclosed in U.S. application Ser. No. 15/766,960 (hereinafter "the '960 application"; published as U.S. Patent Application Publication No. 2018/0298582 A1), also assigned to Tensar International Limited. The '960 application discloses various embodiments for coextruded multilayer polymer sheets as the starting material for fabrication of integral geogrids. By virtue of the coextruded multilayer starting material construction, the coextruded multilayer sheet components, after extrusion and orientation, produce integral geogrids having enhanced material properties that provide performance benefits in soil geosynthetic reinforcement.

One of the embodiments disclosed in the '960 application is a three-layer integral geogrid produced from a coextruded three-layer starting sheet in which the middle layer of the oriented integral geogrid has an expanded or "foamed" structure. According to the '960 application, the only advantages of the expanded or foamed multilayer structure are reduced raw material cost and reduced geogrid weight and "may include desirable physical and chemical properties of the foamed layer per se." No other benefits associated with the expanded or foamed multilayer structure are disclosed. The subject matter of the '960 application is expressly incorporated into this application by reference as if the disclosure was set forth herein in its entirety.

To date, current integral geogrid products manufactured from current production/process technologies can generate multiaxial geogrid products with desirable attributes and features; however, current process/production technology does not allow for changes in material type within the cross section of the overall geogrid. As a result, to enhance the desired physical, mechanical, and geometrical properties that improve performance, significant increases in the amount of polymer is required.

Additionally, current process/production technology limits the ability to increase or enhance certain parameters that drive performance, while concurrently controlling or not changing other parameters that, if changed, reduce performance.

Furthermore, current process/production technology does not address the use of differing polymer materials in different portions of the geogrid structure as a means of maximizing performance.

Accordingly, a need exists for integral geogrids that allow for better "initial compatibility" between the aggregate and the geogrid, thus maximizing the aggregate density after compaction is complete, and thereby minimizing any possible remaining aggregate movement or repositioning that would normally occur after compaction and upon initial phases of "in service" loadings. Even more specifically, a need exists for an integral geogrid having the aforementioned attributes by providing for increased layer compressibility under load. The term "initial compatibility" is used herein to mean a maximizing of the aggregate density after compaction is complete to thereby minimize potential movement or positioning of the aggregate that would normally occur after compaction and upon initial phases of the "in service" loadings.

SUMMARY OF THE INVENTION

The object of the instant invention, therefore, is to deliver improved functional performance from multiaxial integral geogrids by enhancing certain physical, mechanical, and geometrical properties of the multiaxial integral geogrid structure that improves functional performance, such as by modifying and/or incorporating other new physical, mechanical, and geometrical properties. By careful physical positioning and manipulating of the amount of different polymeric materials that have the desired mechanical and physical properties in specific locations of integral geogrid structures, and by optimizing all other physical parameters of the geogrid structure, significant performance improvements can be achieved.

Another object of the instant invention is to provide a multilayer integral geogrid in which layers thereof are modified to reduce the amount of polymer required by converting the polymer in those layers from a solid, i.e., continuous, structure to a cellular structure, i.e., a structure having dispersed therein a plurality of voids, cavities, pores, fissures, bubbles, holes, or other types of openings, i.e., cellular openings, produced according to the methods described herein.

More specifically, subsequent to the filing of the '960 application, it has been surprisingly discovered that improved initial compatibility between the aggregate and layers of the multilayer integral geogrid having the cellular structure can be achieved if certain parameters for the layers with the cellular structure are included in the geogrid, as disclosed herein. These parameters include the following:
1. the minimum rib thickness or height of the multilayer integral geogrid having one or more cellular layers in accordance with the present invention is preferably from about 0.5 mm to about 6 mm, and more preferably from about 1.15 mm to about 4 mm.
2. the aspect ratio of the ribs of the multilayer integral geogrid having one or more cellular layers in accordance with the present invention is preferably from about 0.75 to about 3.0, and more preferably from about 1 to about 2.
3. the initial height or thickness of the one or more cellular layers at their thinnest height (likely the midpoint of the strands or ribs) after stretching is from about 0.1 mm to about 4 mm, and more preferably from about 0.5 to about 3 mm;
4. the cellular openings of the one or more cellular layers comprise at least 20% by volume of the one or more cellular layers, and preferably from about 30% to about 50%;
5. the one or more cellular layers have a minimum "crushability" or height reduction under load of at least 20% and preferably from about 30% to about 50%; and
6. the one or more cellular layers have a height or thickness that is at least 10% of the overall height of the final integral geogrid, and preferably from about 20% to about 35%.

By including the above physical properties in the multilayer integral geogrid having the one or more cellular layers in accordance with the present invention, the initial compatibility between the aggregate and the geogrid is improved after compaction is complete. And, by improving the initial compatibility, any possible remaining aggregate movement or repositioning that would normally occur during and after compaction in the initial phases of "in service" loading is reduced. Thus, the roadway or other transporting surface, or aggregate or soil layer, is better stabilized and improved at the time of construction, and any deformation or movements that occur during in service use or loadings is reduced.

More specifically, by virtue of using the multilayer integral geogrid having the one or more cellular layers, the instant invention provides for improved micro-interaction as the layers of compressible polymer serve to nest aggregate particles and facilitate and maintain maximum properties of the aggregate.

In addition, by carefully modifying the polymer to reduce the density and/or volume of polymer used in one or more of the layers of the extruded sheet used to manufacture the multilayer integral geogrid, an integral geogrid structure can be created that has equivalent physical dimensions to traditional integral geogrids, but with less polymer material use and thus less cost.

Accordingly, to attain the aforementioned objects, the present invention is directed to integral geogrids having a multilayer construction, with at least one layer thereof having a cellular structure. These multilayer geogrids are often referred to herein as integral geogrids having at least one layer thereof with a cellular structure, or, more simply, a "multilayer integral geogrid having one or more cellular layers" or "multilayer integral geogrids having one or more cellular layers." By virtue of the multilayer integral geogrids having one or more cellular layers, the multilayer integral geogrids of the present invention provide for increased layer compressibility under load, and other desirable characteristics.

More specifically, the layer or layers having the cellular structure contain a distribution of a plurality of cellular openings, i.e., voids, cavities, pores, fissures, bubbles, holes, or other types of openings therein. The cellular structure may be associated with a foamed construction of the layer, or may be associated with a particulate filler that is distributed throughout the layer, or may be any other method of creating cellular openings in the cellular layer.

And, for an embodiment of the present invention having three or more layers, the compressible layers thereof having a cellular structure are preferably positioned at least as the two outer (or exterior or "cap") layers of the multilayer integral geogrid. There are unique geo-mechanical advantages to having the two outer layers be compressible. One important advantage: the compressible outer layers allow for the aggregate to not only strike through the apertures and be confined in the apertures, but also to become embedded in the outer layers of the integral geogrid surface, thereby creating what is sometimes referred to herein as a "crush-fit" phenomenon. With the aggregate being "crush-fit" into the surface of the cellular outer layers of the integral geogrid, the integral geogrid is able to provide enhanced lateral restraint of the aggregate under loading by resisting movement of the aggregate via enhanced frictional characteristics of the surface of the cellular outer layers, and by the binding action that occurs by the aggregate particles partially crushing into the surface of the cellular outer layers.

Because the crushable character of the cellular outer layers provides both plastic and elastic deformation, the aggregate pushes into the outer layer and binds into the surface thereof. At the same time, the surface of the outer layer pushes back, enhancing the bond and "crush-fit" between the aggregate and the multilayer integral geogrid. And, according to certain embodiments of the invention, the crushable character of the cellular outer layers may have the potential to create a chemical bond with the surrounding soils. By combining an improved geometry as described herein with an enhanced engineered outer layer structure, the multilayer integral geogrid according to the present invention provides for enhanced performance via improved confinement and lateral restraint of the aggregate.

A primary attribute of the multilayer integral geogrid according to the present invention is the compressibility or crushability of the cellular layer or layers. For example, in the above-described three-layer embodiment, the compressibility of the two outer cellular layers is important to allowing the aggregate to bed into the surface of the integral geogrid. Ideally, each compressible layer is durable enough to tolerate the process of being embedded in particulate matter (i.e., in that it will resist delamination from other layers, or shred), and will compress at least about 20% under load. Additionally, the compressible layer will rebound by at least about 85%. A fundamental concept of the present invention is that the cellular layer be compressible enough to accommodate the aggregate during embedding, but also then to "rebound," as the compressible cellular layer pushes back against the aggregate to "bind" the multilayer integral geogrid in place. The crushing and the rebound are believed to improve performance via frictional and binding attributes that result in improved lateral restraint of the aggregate.

Furthermore, the construction of the multilayer integral geogrids having one or more cellular layers may include layers that are coextruded, or layers that are laminated. The creation of the cellular openings in the layer with the cellular structure may occur during extrusion/lamination or stretching/orientation, or both.

And, the resulting multilayer integral geogrids having a layer or layers with a cellular structure and having the plurality of oriented multilayer strands interconnected by the partially oriented multilayer junctions and having an array of openings therebetween may be configured in any of a variety of repeating geometric patterns, such as described herein.

According to the present invention, a starting material for making multilayer integral geogrids having one or more cellular layers includes a multilayer polymer starting sheet having holes or depressions therein that provide an array of shaped openings when the starting material is biaxially stretched. The multilayer polymer starting sheet includes one or more layers that are capable of forming the cellular structure. Two preferred embodiments are described in detail herein. In the first preferred embodiment according to the present invention, the layer capable of forming the cellular structure includes a foaming agent which upon extrusion of the layer and/or stretching/orientation of the starting sheet forms the cellular layer as part of the final multilayer geogrid (hereinafter sometimes "the foamed embodiment").

In the second preferred embodiment according to the present invention, the layer capable of forming the cellular structure includes a particulate filler dispersed in the layer which upon stretching/orientation of the starting sheet creates the cellular structure in the layer as part of the final multilayer geogrid (hereinafter sometimes "the filler embodiment"). According to preferred embodiments, the layers of the multilayer polymer starting sheet may be coextruded, or may be laminated to one another.

In addition to the two preferred embodiments described in detail herein, the present invention also contemplates other methods of creating the cellular openings for the cellular layer or layers which may be devised by those skilled in the art, such as gas injection or the like, so long as the cellular openings that are in the cellular layer comport with the parameters set forth herein.

According to specific embodiments of the present invention, the multilayer integral geogrids having one or more cellular layers include a plurality of oriented multilayer strands interconnected by partially oriented multilayer oriented junctions and having an array of openings therebetween. According to one embodiment, a three-layer integral geogrid has a non-cellular layer interposed between two outer layers with cellular structures. According to another embodiment, a multilayer integral geogrid has a repeating pattern of a non-cellular layer interposed between two layers with cellular structures. According to still another embodiment, the multilayer integral geogrid has a non-cellular layer associated with an adjacent layer having a cellular structure.

According to one embodiment, the multilayer integral geogrid having one or more cellular layers is a rectangular geogrid having a repeating geometric pattern of partially oriented junctions interconnecting oriented strands which define rectangular openings. According to another embodiment, the multilayer integral geogrid having one or more cellular layers is a triaxial geogrid having a repeating hexagonal geometric pattern of partially oriented junctions interconnecting oriented strands which define triangular openings. And, according to yet another embodiment, the multilayer integral geogrid having one or more cellular layers is a geogrid having a repeating geometric pattern of partially oriented junctions interconnecting oriented strands which form outer hexagons, each of which outer hexagons surrounds and supports six inner interconnected oriented strands formed into the shape of an inner hexagon and defining a smaller hexagonal opening, referred to herein as a "repeating floating hexagon within a hexagon pattern." This embodiment of the present invention that has the "repeating floating hexagon within a hexagon pattern" is also sometimes referred to herein as the "hexagonal" embodiment.

According to still another embodiment of the present invention, a soil construction includes a mass of particulate material strengthened and stabilized by embedding therein a multilayer integral geogrid having one or more cellular layers, and having a repeating geometric pattern of the type described in the preceding paragraph.

According to yet another embodiment of the present invention, a method of making a starting material for a multilayer integral geogrid having one or more cellular layers includes providing a multilayer polymer starting sheet having one or more layers that are capable of forming such layers with a cellular structure as part of the final multilayer geogrid, and providing holes or depressions therein that provide a repeating geometric pattern of partially oriented multilayer junctions interconnecting oriented multilayer strands, and defining openings when the starting material is biaxially stretched.

According to another embodiment of the present invention, a method of making a multilayer integral geogrid having one or more cellular layers includes providing a multilayer polymer starting sheet having one or more layers that are capable of forming such layers with a cellular structure as part of the final multilayer geogrid, providing holes or depressions therein, and biaxially stretching the multilayer polymer sheet having the holes or depressions therein so as to provide a repeating geometric pattern of partially oriented multilayer junctions interconnecting oriented multilayer strands, and defining openings therein.

And, according to yet another embodiment of the present invention, a method of strengthening a mass of particulate material includes embedding in the mass of particulate material a multilayer integral geogrid having one or more cellular layers and having a repeating geometric pattern of partially oriented multilayer junctions interconnecting oriented multilayer strands defining openings.

Accordingly, it is an object of the present invention to provide a multilayer integral geogrid having one or more cellular layers, so as to provide an integral geogrid having increased layer compressibility under load. The multilayer integral geogrid having one or more cellular layers may have a non-cellular layer interposed between two layers with a cellular structure, may have a repeating pattern of a non-cellular layer interposed between two layers with a cellular structure, or may have a non-cellular layer associated with an adjacent layer having a cellular structure.

Thus, another object of the present invention to provide a starting material for making a multilayer integral geogrid having one or more cellular layers. The multilayer polymer starting sheet includes one or more layers that are capable of forming the cellular structure. In a first embodiment, i.e., the foamed embodiment, according to the present invention, the layer capable of forming the cellular structure includes a foaming agent which upon extrusion of the layer and/or stretching/orientation of the starting sheet forms the cellular layer as part of the final multilayer geogrid. In a second embodiment, i.e., the filler embodiment, according to the present invention, the layer capable of forming the cellular structure includes a particulate filler dispersed in the layer which upon stretching/orientation of the starting sheet creates the cellular structure in the layer as part of the final multilayer geogrid.

Another object of the present invention is to provide multilayer integral geogrids having one or more cellular layers and having a plurality of oriented multilayer strands interconnected by partially oriented multilayer junctions and having an array of openings therebetween that is produced from a multilayer polymer starting sheet. The multilayer integral geogrid having one or more cellular layers may be a rectangular geogrid having a repeating geometric pattern of partially oriented multilayer junctions interconnecting oriented multilayer strands defining rectangular openings, a triaxial geogrid having a repeating geometric pattern of partially oriented multilayer junctions interconnecting oriented multilayer strands defining triangular openings, or a geogrid having a repeating geometric pattern of partially oriented multilayer junctions interconnecting oriented multilayer strands defining outer hexagons, each of which surrounds and supports an inner oriented hexagon, i.e., the "repeating floating hexagon within a hexagon pattern."

An associated object of the present invention is to provide a geometry that can engage with and stabilize a greater variety and range of quality of aggregates than geometries associated with prior geogrid structures, while at the same time providing an enhanced compressibility, and other desirable characteristics.

Still another object of the present invention is to provide a soil construction that includes a mass of particulate material strengthened and stabilized by embedding therein a multilayer integral geogrid having one or more cellular layers and having a repeating geometric pattern as described herein.

Yet another object of the present invention is to provide a method of making a starting material for multilayer integral geogrids having one or more cellular layers that includes providing a multilayer polymer starting sheet having one or more layers that are capable of forming such layers with a cellular structure as part of the final multilayer geogrid, and providing holes or depressions therein that provide a repeating geometric pattern of partially oriented multilayer junctions interconnecting oriented multilayer strands, and defining openings when the starting material is biaxially stretched.

The multilayer polymer starting sheet may be produced by coextruding the plurality of layers, or by laminating the plurality of layers to one another.

Another object of the present invention is to provide a method of making multilayer integral geogrids having one or more cellular layers, which includes providing a multilayer polymer starting sheet having one or more layers that are capable of forming such layers with a cellular structure as part of the final multilayer geogrid, providing holes or depressions therein, and biaxially stretching the multilayer polymer starting sheet so as to provide a repeating geometric pattern of partially oriented multilayer junctions interconnecting oriented multilayer strands, and openings. The method of making the above-described rectangular opening or triangular opening integral geogrids can employ known geogrid fabrication methods, such as those described in the aforementioned U.S. Pat. Nos. 4,374,798, 4,590,029, 4,743,486, 5,419,659, 7,001,112, 9,556,580, 10,024,002, and 10,501,896 as well as in other patents. The method of making the above-described integral geogrid having a repeating geometric pattern of partially oriented multilayer junctions interconnecting oriented multilayer strands, and defining outer hexagons, each of which surrounds and supports an oriented inner hexagon, can employ a fabrication method as described hereinafter.

More specifically, it is an object of the present invention to provide a method of making multilayer integral geogrids having one or more cellular layers in which the layer with the cellular structure is produced by first providing a foamed construction in a layer of the multilayer polymer starting sheet capable of forming such layers, and then orienting the multilayer polymer starting sheet so as to stretch the foamed material and create the cellular structure.

Correspondingly, it is another object of the present invention to provide a method of making multilayer integral geogrids having one or more cellular layers in which the layer with the cellular structure is produced by first dispersing a particulate filler in a layer of the multilayer polymer starting sheet capable of forming such layers, and then orienting the multilayer polymer starting sheet so as to stretch the dispersion of particulate filler and create the cellular structure as the particulate filler partially separates from the polymeric layer material.

And, still another object of the present invention is to provide a method of strengthening a mass of particulate material that includes embedding in the mass of particulate material a multilayer integral geogrid having one or more cellular layers, and having a repeating geometric pattern of partially oriented multilayer junctions interconnecting oriented multilayer strands and openings.

The numerous advantages associated with the multilayer integral geogrid having one or more cellular layers according to the present invention are varied in nature.

By virtue of the multilayer integral geogrids having one or more cellular layers of the present invention having not only a multilayer construction, but with at least one layer thereof having a cellular structure, the integral geogrids provide for increased compressibility of the multilayer integral geogrid under load.

Furthermore, the multilayer nature of the multilayer integral geogrids having one or more cellular layers of the present invention provides for overall greater aggregate engagement by the integral geogrid relative to that of prior monolayer integral geogrids. In addition, by virtue of the one or more cellular layers, the multilayer integral geogrids of the present invention are characterized by a structural compliance, i.e., initial give or flexibility, that leads to better compaction and higher density, yet with a final integral geogrid composite stiffness when incorporated in a soil construction that is greater as a result of the initial give of the multilayer integral geogrid.

In addition, certain embodiments of the multilayer integral geogrids having one or more cellular layers of the present invention provide higher aspect ratios on all strands compared to those of prior integral geogrids. Because the higher aspect ratio associated with certain embodiments of the integral geogrids of the present invention increases aggregate interlock, the multilayer integral geogrids having one or more cellular layers of the present invention can better accommodate the varying aspect ratios of aggregate.

In summary, the cellular layers of the multilayer integral geogrid according to the present invention create unique physical and mechanical properties and behaviors in the integral geogrid product. During placement and compaction of aggregate in the multilayer integral geogrid it is believed that the nature of the compressible, cellular outer layers in the ribs and nodes, along with other scientifically engineered aspects of the geogrid, provides for better initial compatibility between the aggregate and the geogrid, thus improving the aggregate density after compaction is complete, and lessening any possible remaining aggregate movement or repositioning that would normally occur after compaction and upon initial phases of in service loadings. While not intending to be bound, it is presently believed that the aforementioned initial compatibility of the multilayer integral geogrid according to the present invention is a key contributor to lessening the amount of deformation that occurs as the geogrid is in use. The benefit of the initial compatibility associated with the present invention is evidenced, for example, by the testing results on a laboratory trafficking device where significantly fewer passes are required to achieve a stabilized condition of the multilayer integral geogrid according to the present invention. In addition, various embodiments of the multilayer integral geogrid according to the present invention are characterized by enhanced rib heights being achieved with less material than with prior art geogrids, and increased aspect ratio being achieved with less material than with prior art geogrids. By virtue of increased in-plane rib flexibility and pliability and increased out-of-plane stiffness, the multilayer integral geogrid of the present invention provide for improved geogrid/aggregate interaction, and thus engagement.

Thus, by virtue of the one or more cellular layers, the multilayer integral geogrids of the present invention provide not only for increased layer compressibility under load, but for increased aggregate engagement and restraint as an aggregate stabilization product.

These together with other objects and advantages which will become subsequently apparent reside in the details of construction and operation as more fully hereinafter described, reference being had to the accompanying drawings forming a part hereof, wherein like reference numbers refer to like parts throughout. The accompanying drawings are intended to illustrate the invention, but are not necessarily to scale.

BRIEF DESCRIPTION OF THE DRAWINGS

FIG. 27 is a table summarizing the effect of increased rib height on surface deformation associated with the test results presented in FIGS. 25 and 26.

FIG. 31 is a table summarizing the structural data associated with the hexagonal three-layer integral geogrid having compressible, cellular outer layers and the hexagonal solid monolayer geogrid utilized in the test results presented in FIG. 30.

FIG. 33 is a table summarizing the structural data associated with the hexagonal three-layer integral geogrid having compressible, cellular outer layers and the hexagonal solid monolayer geogrid utilized in the test results presented in FIG. 32.

FIG. 35 is a table summarizing the force required to produce a certain compressibility associated with the hexagonal three-layer integral geogrid having compressible, cellular outer layers according to the present invention and the hexagonal solid monolayer geogrid utilized in the test results presented in FIG. 34.

FIG. 37 is a table summarizing the stress and strain associated with the hexagonal three-layer integral geogrid having compressible, cellular outer layers and the hexagonal solid monolayer geogrid utilized in the test results presented in FIG. 36.

FIG. 50 presents a table illustrating a comparison of the benefits of base geometry in similarly compressible integral geogrids.

FIG. 52 presents a table illustrating a comparison, for a single base geometry, of the effect on surface deformation of the position of the layer with a cellular structure in multilayer integral geogrids.

FIG. 54 presents another table illustrating a comparison, for the single base geometry associated with FIG. 52, of the effect on surface deformation of the position of the layer with a cellular structure in multilayer integral geogrids.

FIG. 56 presents a table illustrating a comparison, for the integral geogrid according to the present invention having the single base geometry associated with FIG. 52 and a prior art geogrid not having a layer with a cellular structure, of the effect on surface deformation of the layer with a cellular structure.

DETAILED DESCRIPTION OF THE PREFERRED EMBODIMENTS

Figure 1:
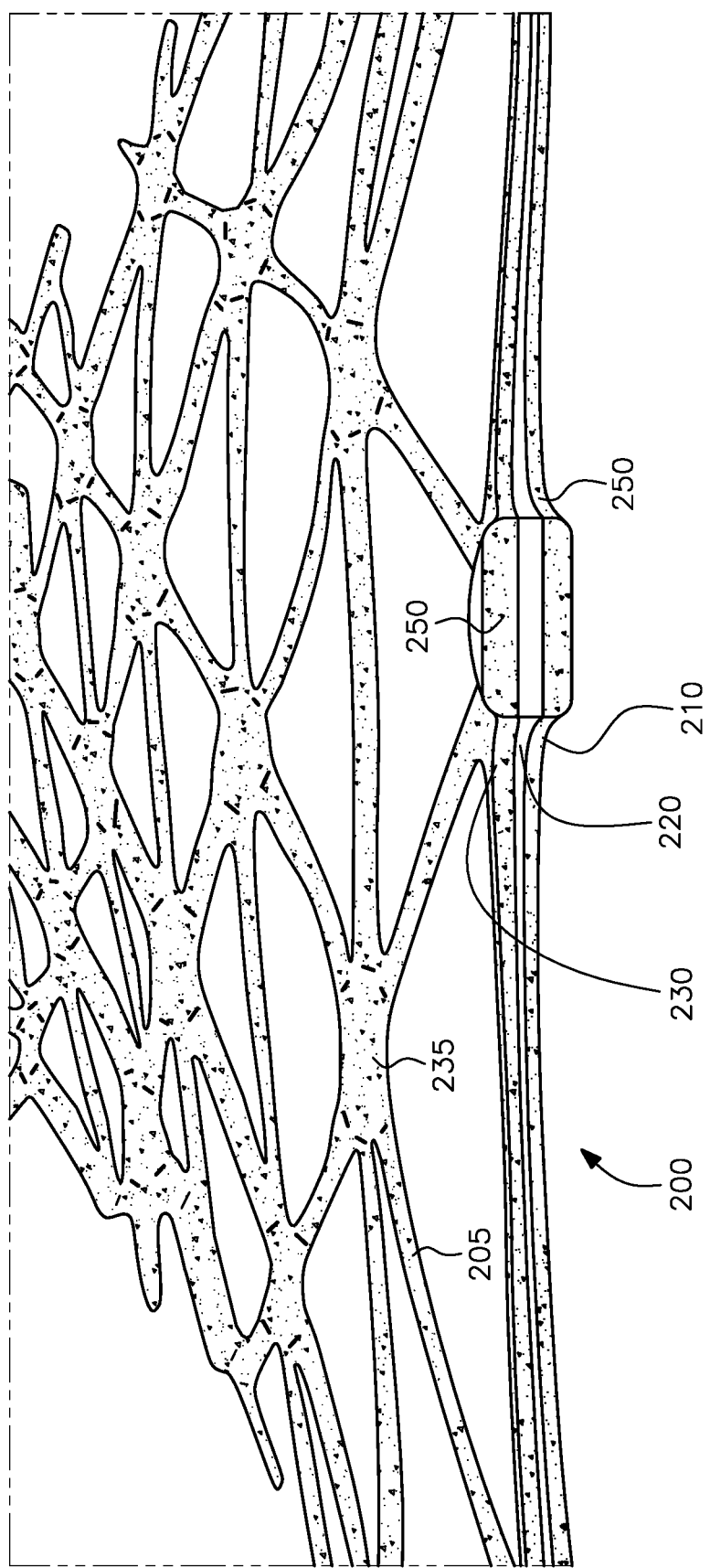
FIG. 1 is a perspective view of a section of a triaxial three-layer integral geogrid having two outer layers with a cellular structure according to one embodiment of the present invention, with a cross-sectional view thereof emphasized in the foreground.

Although only preferred embodiments of the present invention are explained in detail, it is to be understood that the invention is not limited in its scope to the details of construction and arrangement of components set forth in the following description or illustrated in the drawings. As described hereinafter, the present invention is capable of other embodiments and of being practiced or carried out in various ways.

Also, in describing the preferred embodiments, terminology will be resorted to for the sake of clarity. It is intended that each term contemplates its broadest meaning as understood by those skilled in the art, and includes all technical equivalents which operate in a similar manner to accomplish a similar purpose.

As used herein, the term "cellular" is used according to a commonly accepted definition, i.e., pertaining to a material having dispersed therein a plurality of voids, cavities, pores, fissures, bubbles, holes, or other types of openings produced according the methods described herein. Similarly, the term "non-cellular" means a material not containing the voids, cavities, pores, bubbles, holes, or other types of openings produced according the methods described herein, i.e., so as to have a structure that is generally continuous or solid in nature. The aforementioned voids, cavities, pores, fissures, bubbles, holes, or other types of openings produced according the methods described herein that provide the cellular structure are sometimes herein referred to as "cellular openings."

And, as used herein, the terms "coextruded," "coextruding," and "coextrusion" are used according to their commonly accepted definition, i.e., pertaining to a process starting with two or more polymeric materials that are extruded together and shaped in a single die to form a multilayer sheet.

As also used herein, the terms "laminated," "laminating," and "lamination" are used according to their commonly accepted definition, i.e., pertaining to a process starting with two or more polymeric material sheets that are produced individually in one manufacturing process, and then are joined or bonded to each other in another manufacturing step to thereby create a multilayer sheet of two or more layers.

And, as used herein, the term "crush fit" is used to describe a material that is sufficiently compressible such that it will conform, physically adapt, and reshape to match the shape and texture of any stronger and/or stiffer material above or on top of it once sufficient force is applied.

According to one preferred embodiment of the present invention, the multilayer integral geogrid having one or more cellular layers has a non-cellular layer interposed between two outer layers with a cellular structure to form a three-layer integral geogrid. According to another embodiment of the present invention, the multilayer integral geogrid having one or more cellular layers has a repeating pattern of a non-cellular layer interposed between two layers with cellular structures. According to still another embodiment of the present invention, the multilayer integral geogrid having one or more cellular layers has a non-cellular layer associated with an adjacent single layer having a cellular structure.

More specifically, the multilayer integral geogrids having one or more cellular layers include a plurality of oriented multilayer strands interconnected by partially oriented multilayer junctions and having an array of openings therebetween, with each of the oriented multilayer strands and each of the partially oriented multilayer junctions having a plurality of layers including one or more cellular layers, and with the plurality of layers being in contact both along each of the oriented multilayer strands and each of the partially oriented multilayer junctions.

Even more specifically, the one or more cellular layers contain a distribution of a plurality of voids, cavities, pores, bubbles, holes, or other types of openings therein. This cellular structure may be associated with a foamed construction of the layer, or may be associated with a particulate filler that is distributed throughout the layer in order to create expansion of the cellular layer in the final multilayer integral geogrid.

And, as also used herein, the term "expansion" when used to describe the aforementioned one or more cellular layers refers to the ability of the cellular layer to expand during the various stages of forming the multilayer integral geogrid according to the present invention. The term "expanded" when used to describe the aforementioned one or more cellular layers means the structure of the cellular layer after the formation of the multilayer integral geogrid via stretching to orient the geogrid, including the associated deformation (including an expansion in size) of the plurality of voids, cavities, pores, fissures, bubbles, holes, or other types of openings present in the cellular layer, i.e., the cellular openings.

Furthermore, the multilayer construction may include layers that are coextruded, or layers that are laminated. The expansion of the layer with the cellular structure may occur during extrusion/lamination or stretching/orientation, or both. And, the resulting multilayer integral geogrid having one or more cellular layers and having the plurality of oriented multilayer strands interconnected by the partially oriented multilayer junctions and having an array of openings therebetween may be configured in any of a variety of repeating geometric patterns, such as described herein.

As shown in FIG. 1, a three-layer integral geogrid 200 according to one embodiment of the present invention (here a triaxial integral geogrid) includes, disposed between a first cellular outer layer 210 and a second cellular outer layer 230, a third layer, i.e., a non-cellular inner layer 220.

As indicated above, the first cellular outer layer 210 and the second cellular outer layer 230 contain a distribution of cellular openings 250 therein. The cellular openings 250 may be associated with a foamed construction of the first cellular outer layer 210 and the second cellular outer layer 230, with the cellular openings having been formed initially during coextrusion of the starting sheet and subsequently deformed in shape, i.e., expanded in size, by the stretching of the perforated starting sheet during the formation of the integral geogrid. Or, the cellular openings 250 may be associated with a particulate filler that is distributed in the first cellular outer layer 210 and the second cellular outer layer 230, with the cellular openings having been created adjacent to the particulate filler by the stretching of the perforated starting sheet during the formation of the integral geogrid.

According to the foamed embodiment of the first cellular outer layer 210 and the second cellular outer layer 230, the instant invention can include the use of a foaming agent to provide an expanded first cellular outer layer 210 and an expanded second cellular outer layer 230, i.e., each having a cellular foamed structure. That is, according to an embodiment of the invention that produces the layers of the integral geogrid via coextrusion (discussed below), one possible process is to mix a chemical foaming agent with the polymer that is extruded to form the expanded first cellular outer layer 210 and the expanded second cellular outer layer 230. The heat that is generated to melt the polymer decomposes the chemical foaming agent, which results in the liberation of a gas. The gas is then dispersed in the polymer melt, and expands upon exiting the die. As a result, the first outer layer 210 and the second outer layer 230 are foamed to create the cellular layers, i.e., layers that have a plurality of cellular openings. Similar to chemical foaming, the injection of a gas that results in formation of the first cellular outer layer 210 and the second cellular outer layer 230 is also considered a foaming process according to this embodiment of the invention.

According to the particulate filler embodiment of the first cellular outer layer 210 and the second cellular outer layer 230, the instant invention employs a dispersion of a particulate filler to provide expanded first cellular outer layer 210 and second cellular outer layer 230, i.e., each having a cellular structure. The inclusion of such a particulate filler in the first cellular outer layer 210 and the second cellular outer layer 230 creates a product having a thicker, i.e., loftier, profile, which can lead to enhanced performance of the integral geogrid in certain service applications. Depending upon the service application in which the multilayer integral geogrid is to be employed, such particulate fillers, may include, for example, one or more of $CaCO_3$ (calcium carbonate), hydrous magnesium silicates (talc), $CaSiO_3$ (wollastonite), calcium sulphate (gypsum), diatomaceous earth, titanium dioxide, nano-fillers (such as nano clay), multi-wall carbon nanotube ("MWCNT"), single wall carbon nanotube ("SWCNT"), natural or synthetic fibers, metal fibers, glass fibers, dolomite, silica, mica, and aluminum hydrate.

According to both the foamed embodiment and the filler embodiment, the material of construction of the first cellular outer layer 210 and the material of construction of the second cellular outer layer 230 may be the same as each other, or may be different from one another, although the same material is preferred. In general, the material of construction of the non-cellular inner layer 220 is different from the material of construction of the first cellular outer layer 210 and the material of construction of the second cellular outer layer 230.

Contemplated embodiments of the invention include one in which one or more of the foamed layers are used in conjunction with one or more solid layers, one in which one or more of the filler layers are used in conjunction with one or more solid layers, and one in which one or more of the foamed layers and one or more of the filler layers are used in conjunction with one or more solid layers.

Figure 2:
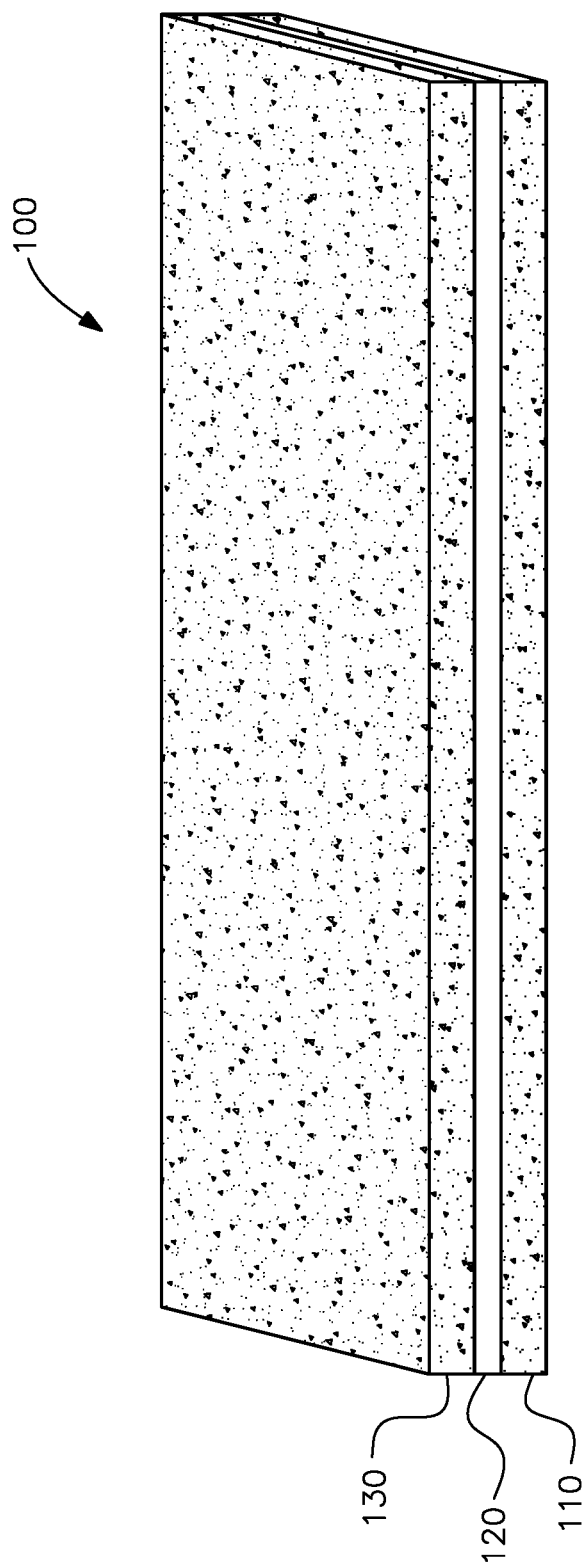
FIG. 2 illustrates a uniplanar three-layer polymer starting sheet for the triaxial multilayer integral geogrid as shown in FIG. 1, before holes or depressions are formed therein.

FIG. 2 illustrates a uniplanar three-layer polymer starting sheet 100 for the three-layer integral geogrid having one or more cellular layers 200 shown in FIG. 1, before holes or depressions are formed therein.

As shown in FIG. 2, the multilayer polymer starting sheet 100 is a three-layer sheet embodiment of the invention. That is, preferably, sheet 100 includes a first expansion outer layer 110, a second expansion outer layer 130, and a non-cellular inner layer 120. The first expansion outer layer 110 and the second expansion outer layer 130 are arranged on opposite planar surfaces of the non-cellular inner layer 120, preferably in a uniplanar or substantially uniplanar configuration. Furthermore, while the three-layer configuration of sheet 100 is shown for purposes of illustration, the invention contemplates the use of a sheet having multiple layers arranged in various configurations, multiple layers having various combinations of thicknesses, and multiple layers having various materials of construction, all as dictated by the particular application in which the integral geogrid is to be employed. For example, while the three-layer configuration of sheet 100 is shown for purposes of illustration, the invention also contemplates the use of sheets having more than three layers. In general, the layer configuration, the layer thicknesses, and the materials of construction of the layers are selected to provide not only ease of fabrication of the integral geogrid, but also an integral geogrid having the desired degree of compressibility, stiffness, and other performance properties.

Furthermore, according to another embodiment of the present invention, the multilayer integral geogrid may have two layers, i.e., a non-cellular layer associated with a single adjacent layer having a cellular structure. Geogrids are typically installed on top of a soil formation such as clay, silt or sand. All of the aforementioned materials are "fine grained" materials, i.e., materials characterized by particle sizes that are a very small fraction of the size of the geogrid apertures. And then, typically, "large" (i.e., 0.25 inch to 3 inch diameter) particle granular aggregates are installed on top of the geogrid. It is hypothesized that the compressible, i.e., cellular, layer is best situated such that the granular aggregates are placed on top of the compressible layer. It is believed to be less important to have compressible layers in contact with the fine grained soils. Accordingly, such a two-layer integral geogrid would have a solid layer on the bottom and a compressible layer on top when installed.

Figure 13:
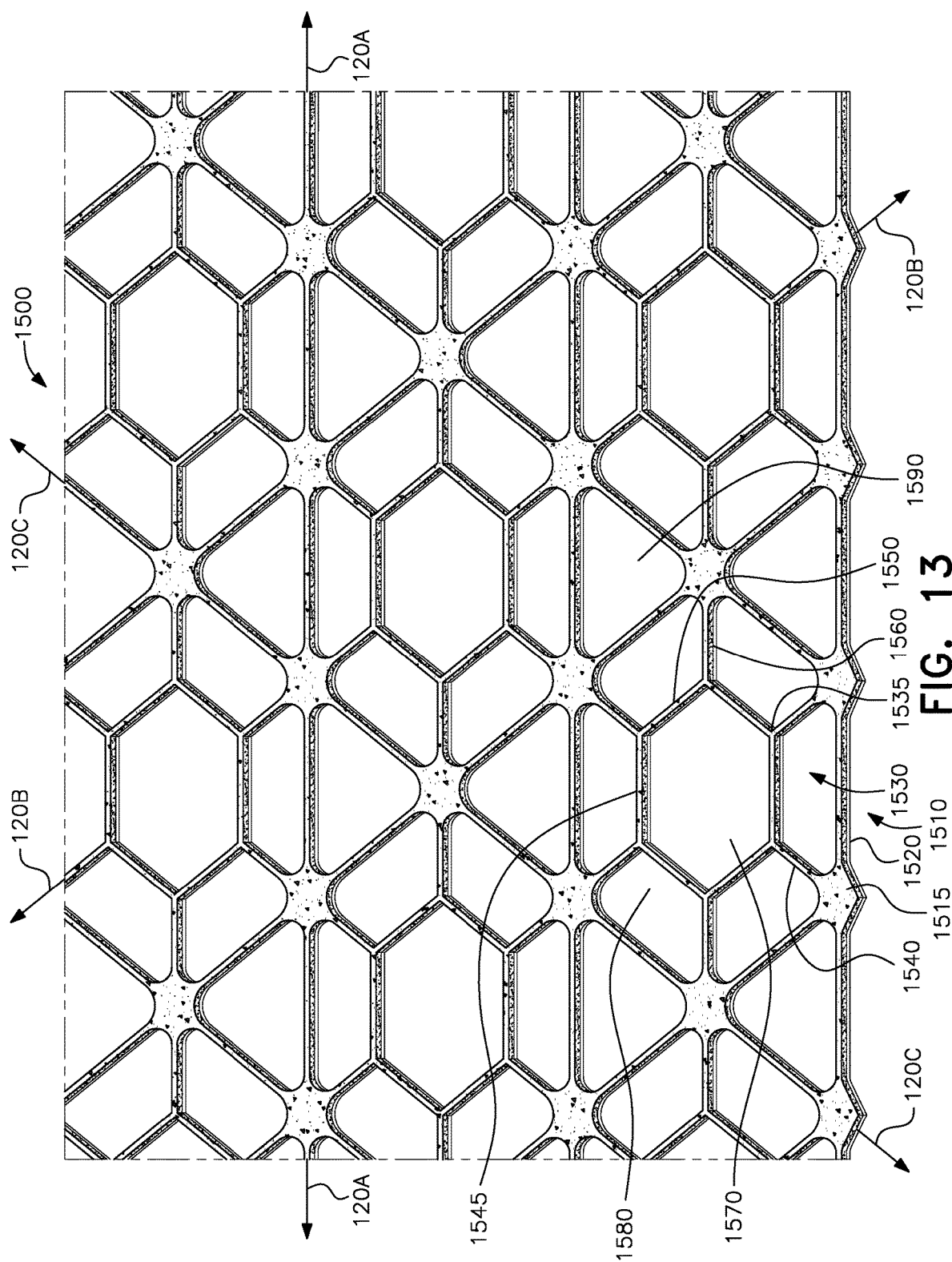
FIG. 13 is a perspective view of a hexagonal two-layer integral geogrid having one cellular layer and one non-cellular layer.
Figure 14:
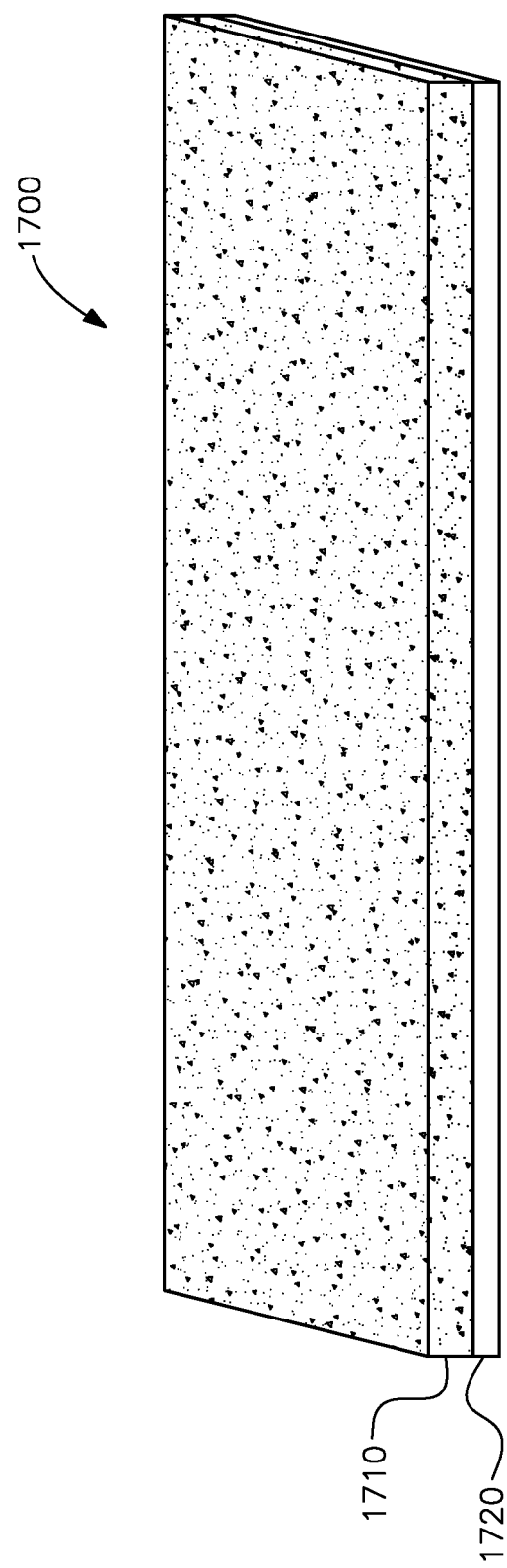
FIG. 14 illustrates a uniplanar two-layer polymer starting sheet for the hexagonal two-layer integral geogrid as shown in FIG. 13, before holes or depressions are formed therein.

As shown in FIG. 13 (described in detail below), the multilayer integral geogrid 1500 according to the present invention has the above-described non-cellular layer associated with a single adjacent layer having a cellular structure. That is, instead of having a non-cellular layer disposed between two cellular layers, a two-layer integral geogrid 1500 in accordance with the present invention has one cellular layer 1510 and one non-cellular layer 1520. As shown in FIG. 14, the two-layer polymer starting sheet 1700 associated with the two-layer integral geogrid embodiment of the invention includes an expansion outer layer 1710 and a non-cellular layer 1720.

As described above, the three-layer polymer starting sheet 100 used as the starting material for a three-layer integral geogrid according to the present invention is preferably through-punched, although it may be possible to use depressions formed therein instead. According to the embodiment in which depressions are formed in the sheet, the depressions are provided on each side of the sheet 100, i.e., on both the top and the bottom of the sheet. Furthermore, the depressions extend into each layer of the multilayer sheet.

According to a preferred embodiment of the present invention, the overall thickness of the three-layer polymer starting sheet 100 is from about 2 mm to about 12 mm and, according to a more preferred embodiment of the invention, the overall thickness of the sheet 100 is from about 4 mm to about 10 mm.

With regard to the individual thicknesses of the sheet layers, according to a preferred embodiment of the invention, the thickness of the first expansion outer layer 110 is from about 0.5 mm to about 4 mm, the thickness of the non-expanded inner layer 120 is from about 0.5 mm to about 4 mm, and the thickness of the second expansion outer layer 130 is from about 0.5 mm to about 4 mm, keeping in mind that the overall thickness of the starting sheet 100 is from about 2 mm to about 12 mm. And, according to a more preferred embodiment of the invention, the thickness of the first expansion outer layer 110 is from about 1 mm to about 3 mm, the thickness of the non-expanded inner layer 120 is from about 1 mm to about 3 mm, and the thickness of the second expansion outer layer 130 is from about 1 mm to about 3 mm.

In general, the layers of the starting sheet are polymeric in nature. The polymer material of the first expansion outer layer 110, the non-cellular inner layer 120, and the second expansion outer layer 130 may be the same as each other, or may be different from one another. Preferably, the material of construction of the first expansion outer layer 110 and the material of construction of the second expansion outer layer 130 are the same as each other. More preferably, the material of construction of the non-cellular inner layer 120 is different from the material of construction of both the first expansion outer layer 110 and the material of construction of the second expansion outer layer 130.

For example, the materials of construction may include high molecular weight polyolefins, and broad molecular weight distribution polymers. As is known to one skilled in the art of polymer science, the term "high molecular weight" polyolefin means a resin with a Melt Flow Rate ("MFR"; also known as Melt Flow Index ("MFI")) as determined by ASTM D 1238-20 of less than 1. As is also known, the term "broad molecular weight distribution" polymer means a resin having molecular chains that vary in size and are depicted by a wide binomial distribution curve on a molecular weight distribution graph. Furthermore, the polymeric materials may be virgin stock, or may be recycled materials, such as, for example, post-industrial or post-consumer recycled polymeric materials. And, the use of one or more polymeric layers having a lower cost than that of the aforementioned high molecular weight polyolefins and broad specification polymers is also contemplated. According to a preferred embodiment of the invention, the material of construction of the first expansion outer layer 110 and the material of construction of the second expansion outer layer 130 is a broad specification polymer, such as, for example, a virgin polypropylene ("PP"), or a recycled PP, such as, for example, a post-industrial PP or other recycled PP. As used herein, the term broad specification polymer means a polymer having an MFR (or MFI) as measured by ASTM D 1238-20, of from 1 to 6, and an ash content as measured by ASTM D 4218-20 of less than 6%. And, according to the same preferred embodiment, the material of construction of the non-cellular inner layer 120 is a high molecular weight polyolefin, such as, for example, a PP. However, depending upon the particular application of the integral geogrid, polymeric components having a material of construction other than polypropylene may be included in the multilayer polymer starting sheet 100.

According to the present invention, the multilayer polymer starting sheet 100 may be produced by coextrusion of the layers, such as is disclosed in the aforementioned '960 application, or by lamination of separately produced layers. For example, lamination of separately produced layers can be accomplished by reheating and softening one surface of each of the separately produced layers, layering one upon the other such that the reheated and softened surfaces are adjacent one another, and then applying pressure resulting in the fusion of the separately produced sheets to one another.

Figure 3:
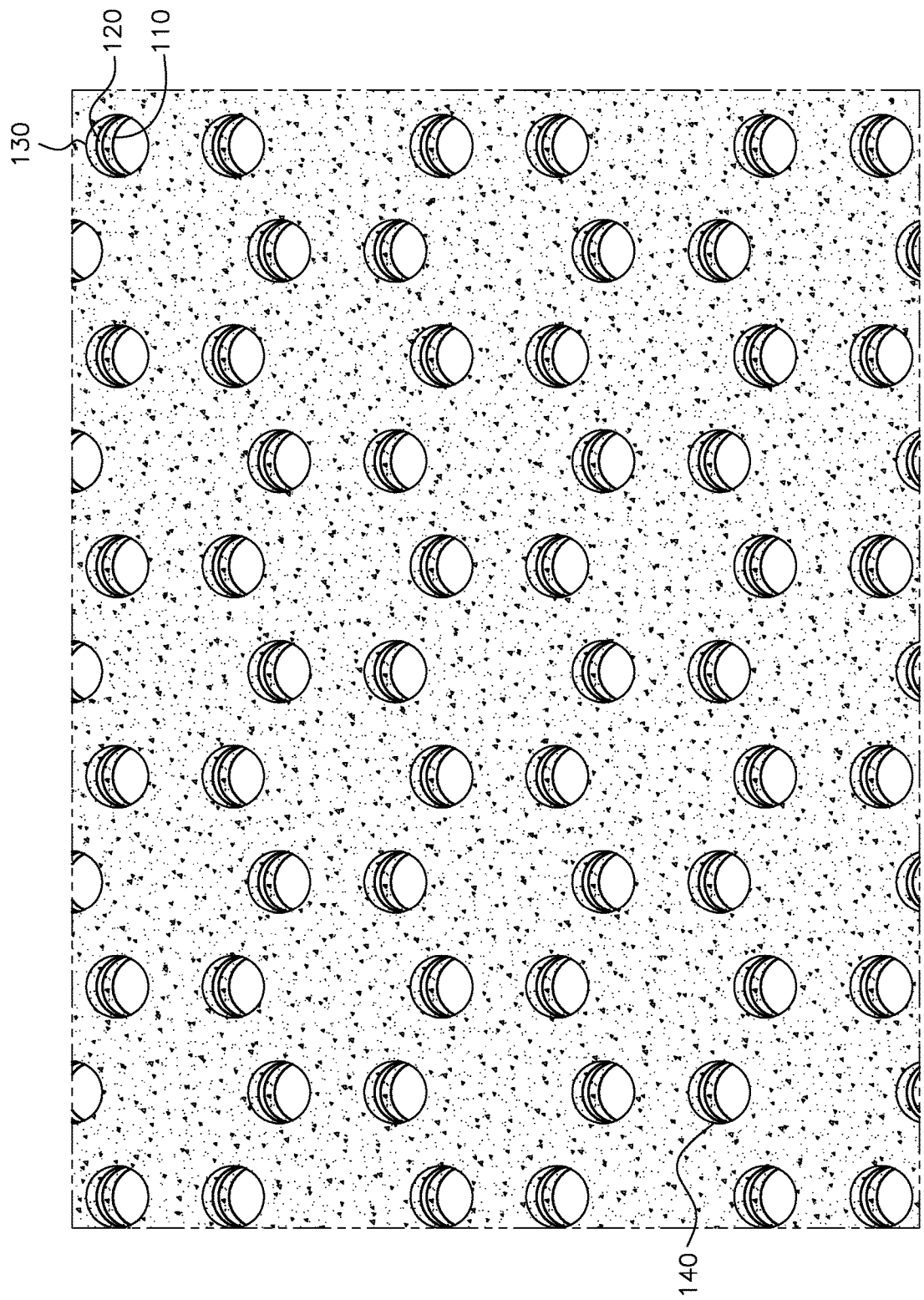
FIG. 3 is a top perspective plan view of the starting sheet shown in FIG. 2 that has holes punched therein for forming the triaxial three-layer integral geogrid as shown in FIG. 1.
Figure 4:
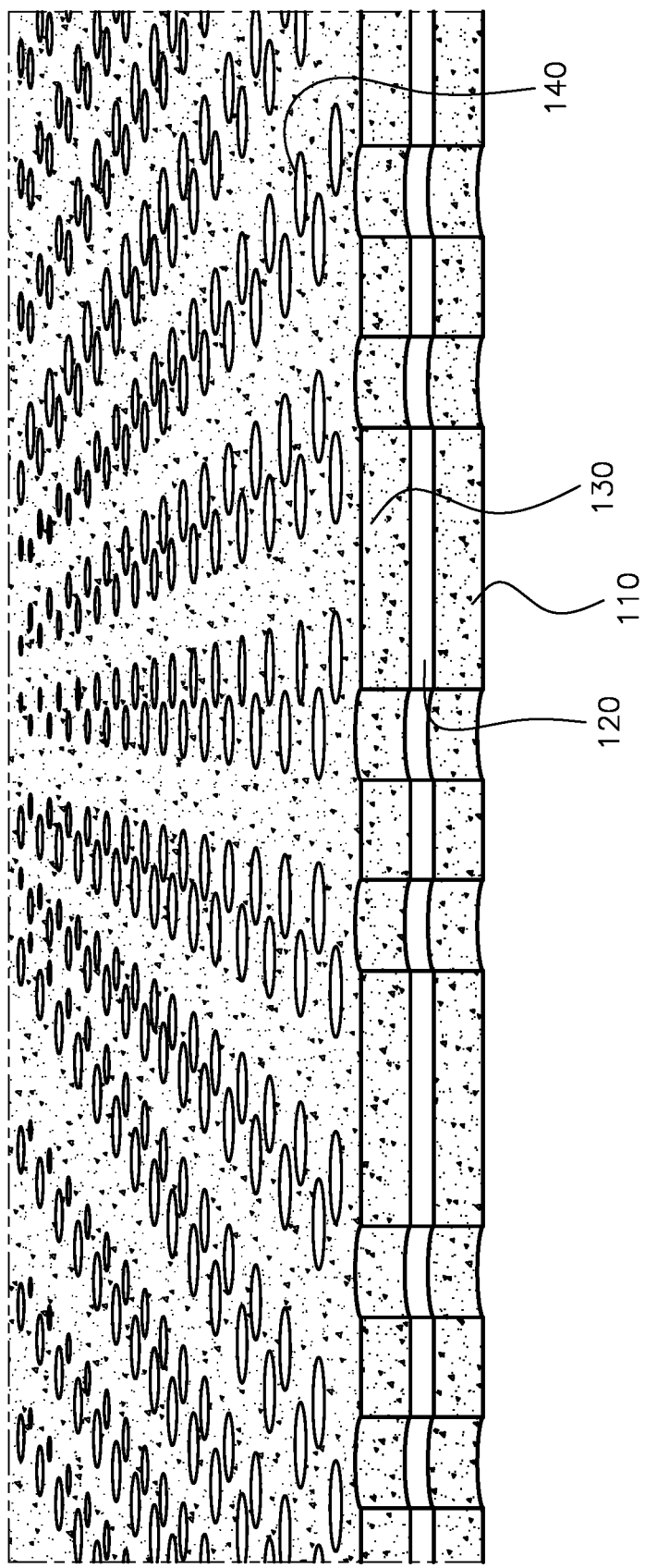
FIG. 4 is a perspective cross-sectional view of a section of the starting sheet shown in FIG. 3.

FIG. 3 is a top perspective plan view of the multilayer polymer starting sheet 100 shown in FIG. 2 that has holes 140 punched therein for forming the triaxial three-layer integral geogrid 200 shown in FIG. 1. FIG. 4 is a perspective cross-sectional view of a section of the three-layer polymer starting sheet 100 shown in FIG. 3.

The size and spacing of the holes 140 shown in FIG. 4 are as disclosed in the Walsh '112 patent. Per FIG. 1, the triaxial three-layer integral geogrid 200 having one or more cellular layers includes highly oriented strands 205 and partially oriented junctions 235, also as disclosed in the Walsh '112 patent. The second expansion outer layer 130 of the three-layer polymer starting sheet 100 (shown in FIG. 3) has been stretched and oriented into the second cellular outer layer 230 of the strands 205 and junctions 235. Similarly, the first expansion outer layer 110 of the three-layer polymer starting sheet 100 has been stretched and oriented into the second cellular outer layer 210 of the strands 205 and junctions 235. As the second expansion outer layer 130 and first expansion outer layer 110 are being stretched and oriented, the non-cellular inner layer 120 is also being stretched and oriented into middle layer 220 of both the strands 205 and junctions 235.

As indicated above, while the three-layer configuration of multilayer polymer starting sheet 100 has been shown for purposes of illustration, the present invention also contemplates multilayer integral geogrids with one or more cellular layers which have more than three layers, and the use of starting sheets having more than three layers.

Figure 5:
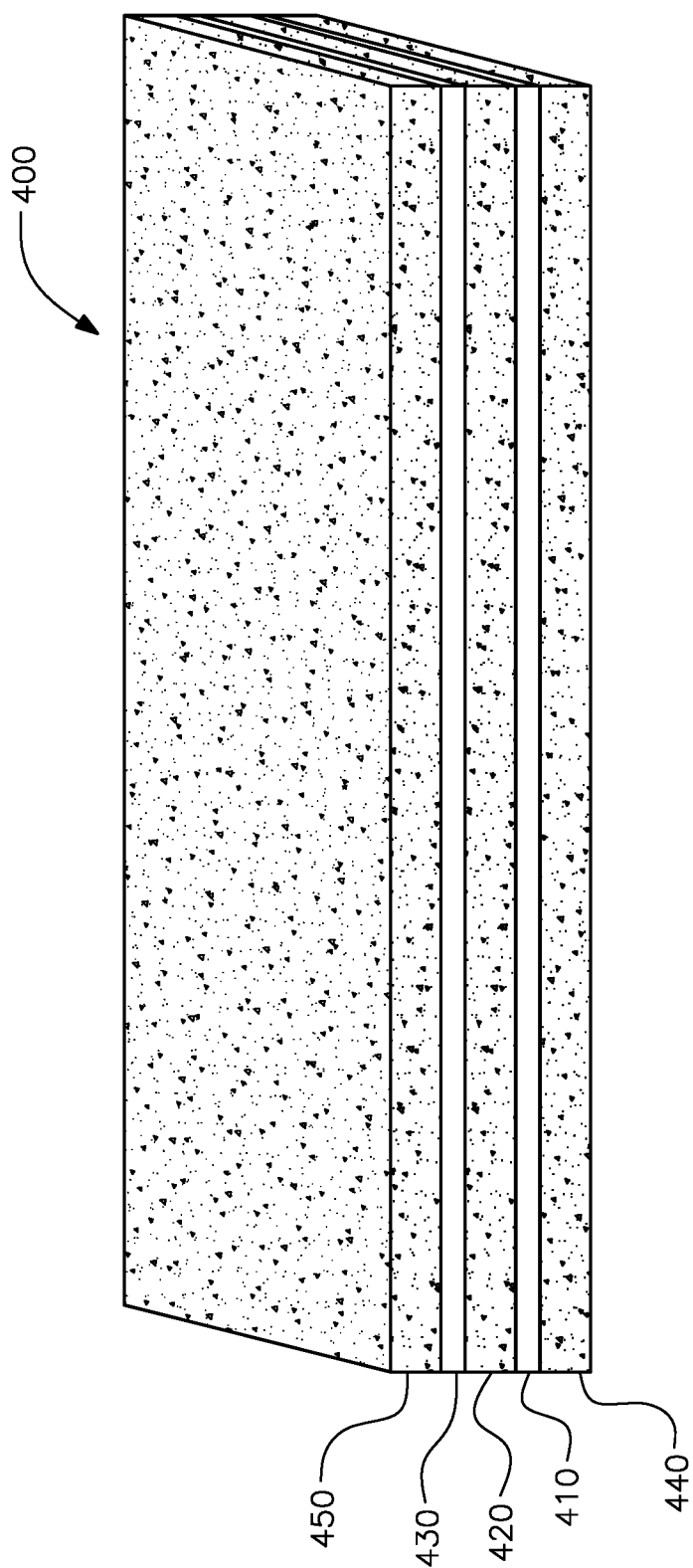
FIG. 5 illustrates a uniplanar five-layer polymer starting sheet for a triaxial five-layer integral geogrid having two outer layers and the innermost layer with a cellular structure, before holes or depressions are formed therein according to another embodiment of the present invention.

For example, the starting sheet can be a five-layer configuration, such as multilayer polymer starting sheet 400 shown in FIG. 5. Starting sheet 400 includes a middle expansion layer 420, a first non-cellular inner layer 410, a second non-cellular inner layer 430, a first expansion outer layer 440, and a second expansion outer layer 450. The first non-cellular inner layer 410 and the second non-cellular inner layer 430 are arranged on opposite planar surfaces of middle expansion layer 420, preferably in a uniplanar or substantially uniplanar configuration. The first expansion outer layer 440 and the second expansion outer layer 450 are arranged on opposite planar surfaces of, respectively, first non-cellular inner layer 410 and second non-cellular inner layer 430, preferably in a uniplanar or substantially uniplanar configuration.

In the particular embodiment of the invention shown in FIG. 5, the multilayer polymer starting sheet 400 is made by coextruding or laminating a first material that forms the middle expansion layer 420, a second material that forms the first non-cellular inner layer 410, a third material that forms the second non-cellular inner layer 430, a fourth material that forms the first expansion layer 440, and a fifth material that forms the second expansion outer layer 450.

In general, the polymeric material of the middle expansion layer 420, the first non-cellular inner layer 410, the second non-cellular inner layer 430, the first expansion outer layer 440, and the second expansion outer layer 450 may be the same as each other, or may be different from one another. For example, the middle expansion layer 420 may have a first material of construction, the first non-cellular inner layer 410 and the second non-cellular inner layer 430 may have a second material of construction, and the first expansion outer layer 440 and the second expansion outer layer 450 may have a third material of construction. In summary, depending upon the particular service application in which the five-layer integral geogrid having a layer or layers with a cellular structure made from the sheet 400 is to be employed, various combinations of materials of construction for the above-described five layers may be used.

Figure 6:
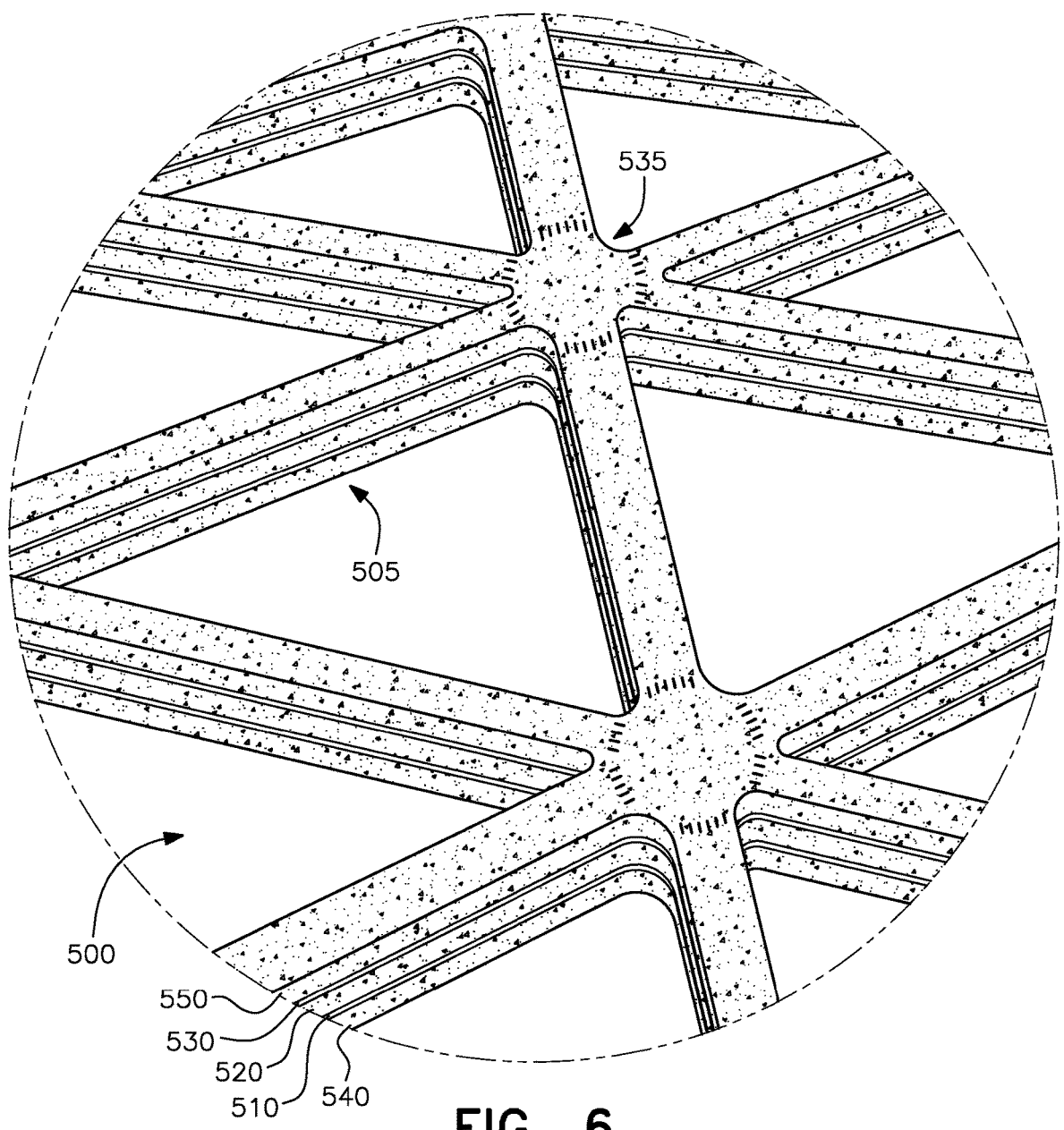
FIG. 6 is a perspective cross-sectional view of a section of a triaxial five-layer integral geogrid having two outer layers and the innermost layer with a cellular structure associated with the starting sheet shown in FIG. 5.

FIG. 6 is a perspective view of a section of a triaxial five-layer integral geogrid 500 having three or more cellular layers associated with the five-layer polymer starting sheet 400 shown in FIG. 5. The triaxial five-layer integral geogrid 500 having three or more cellular layers includes highly oriented multilayer strands 505 and partially oriented multilayer junctions 535. After holes have been punched in sheet 400, the first expansion outer layer 440 and the second expansion outer layer 450 of sheet 400 have been stretched and oriented into, respectively, the first cellular outer layer 540 and the second cellular outer layer 550 of the multilayer strands 505 and multilayer junctions 535. Similarly, the first non-cellular inner layer 410 and the second non-cellular inner layer 430 of sheet 400 have been stretched and oriented into, respectively, the first non-cellular inner layer 510 and the second non-cellular inner layer 530 of the strands 505 and junctions 535. And, as the first expansion outer layer 440 and the second expansion outer layer 450, and the first non-cellular inner layer 410 and the second non-cellular inner layer 430 are being stretched and oriented, the middle expansion layer 420 is also being simultaneously stretched and oriented into middle cellular layer 520 of both the multilayer strands 505 and multilayer junctions 535. And again, as with multilayer polymer starting sheet 100 (i.e., the three-layer embodiment), multilayer polymer starting sheet 400 having five layers may have expansion layers that are foamed or that have filler, and may be formed by coextrusion or lamination.

According to a preferred embodiment of the present invention, the overall thickness of the five-layer integral geogrid 500 is from about 1 mm to about 6 mm and, according to a more preferred embodiment of the invention, the overall thickness of the five-layer integral geogrid 500 is from about 1.5 mm to about 3.5 mm.

With regard to the individual thicknesses of the layers of the five-layer integral geogrid 500, according to a preferred embodiment of the invention, the thickness of the first cellular outer layer 540 is from about 0.1 mm to about 2 mm, the thickness of the second cellular outer layer 550 is from about 0.1 mm to about 2 mm, the thickness of the first non-cellular inner layer 510 is from about 0.1 mm to about 2 mm, the thickness of the second non-cellular inner layer 530 is from about 0.1 mm to about 2 mm, and the thickness of the middle non-cellular layer 520 is from about 0.1 mm to about 2 mm.

Now, turning to the geometry of the multilayer integral geogrids having one or more cellular layers, the invention contemplates at least three general categories: triangular (such as "triaxial"), rectangular, and hexagonal.

The geometry of the triaxial expanded multilayer integral geogrid 200 is as shown in FIGS. 1 (three-layer) and 6 (five-layer).

Figure 7:
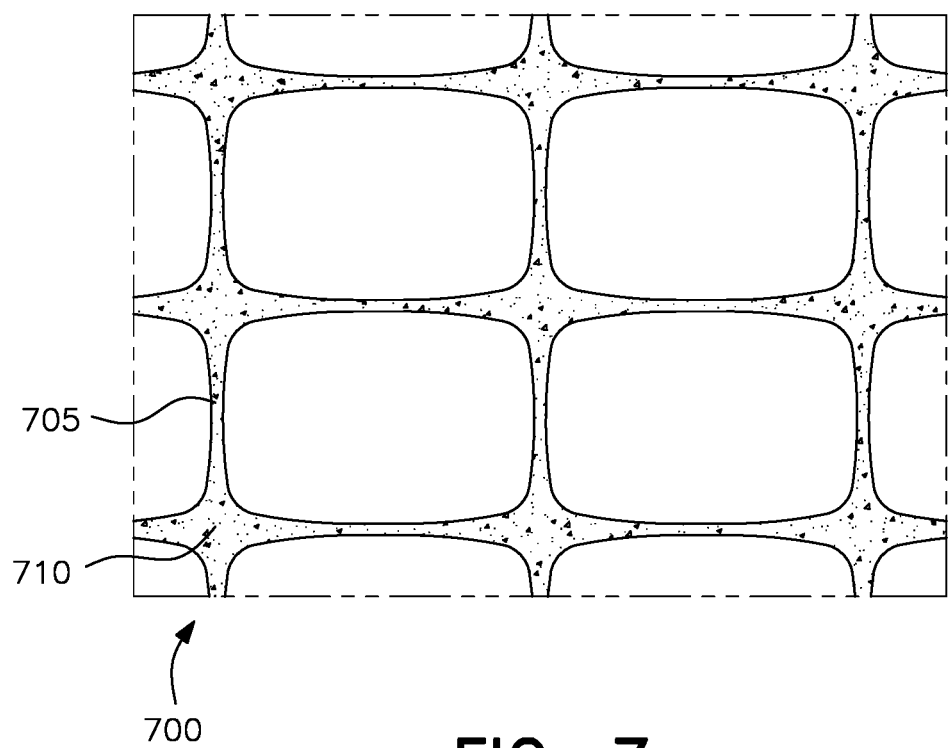
FIG. 7 is a plan view of a rectangular three-layer integral geogrid having two outer layers with a cellular structure according to still another embodiment of the present invention.
Figure 8:
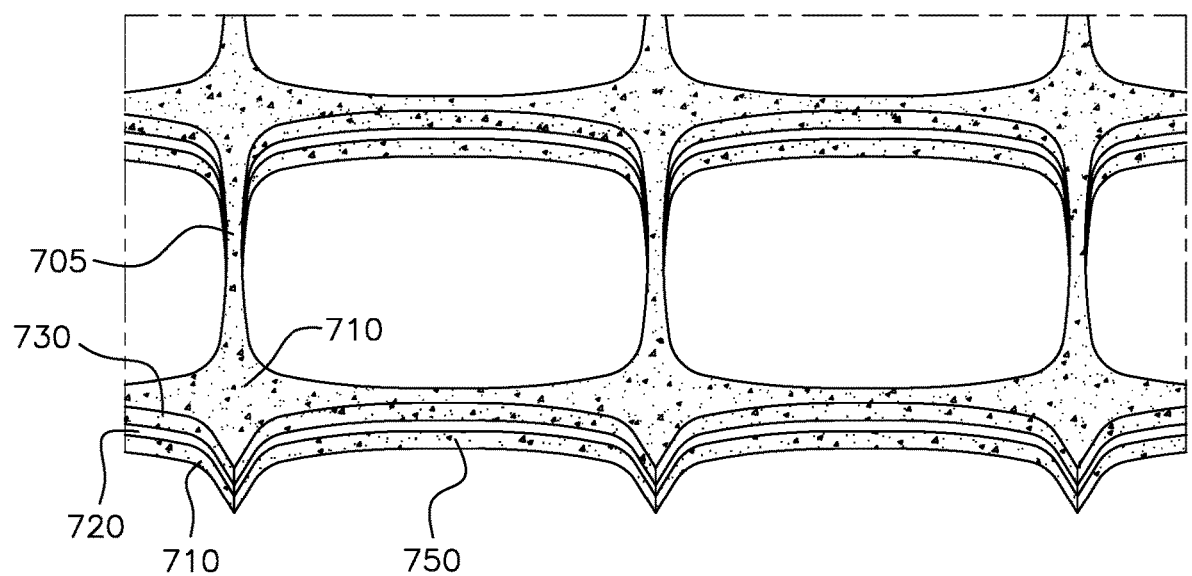
FIG. 8 is a perspective view of the rectangular three-layer integral geogrid having two outer layers with a cellular structure shown in FIG. 7.

The geometry of a rectangular multilayer integral geogrid 700 having one or more cellular layers is shown in FIG. 7. The rectangular multilayer integral geogrid 700 having one or more cellular layers includes highly oriented multilayer strands 705 and partially oriented multilayer junctions 710. As shown in FIG. 8, a rectangular three-layer integral geogrid 700 having two or more cellular layers includes, disposed between a first cellular outer layer 710 and a second cellular outer layer 730, a third layer, i.e., a non-cellular inner layer 720. As with the triangular geometry described herein, the first cellular outer layer 710 and the second cellular outer layer 730 contain a distribution of cellular openings 750 therein. The cellular openings 750 may be associated with a foamed construction of the first cellular outer layer 710 and the second cellular outer layer 730, or may be associated with a particulate filler that is distributed in the first cellular outer layer 710 and the second cellular outer layer 730.

The second expansion outer layer 630 of a three-layer polymer starting sheet 600 (described below) has been stretched and oriented into the second cellular outer layer 730 of the multilayer strands 705 and multilayer junctions 740. Similarly, the first expansion outer layer 610 of the multilayer polymer starting sheet 600 has been stretched and oriented into the first cellular outer layer 710 of the multilayer strands 705 and multilayer junctions 740. As the second cellular outer layer 730 and first cellular outer layer 710 are being stretched and oriented, the non-cellular inner layer 620 is also being simultaneously stretched and oriented into non-cellular inner layer 720 of both the multilayer strands 705 and multilayer junctions 740.

Figure 9:
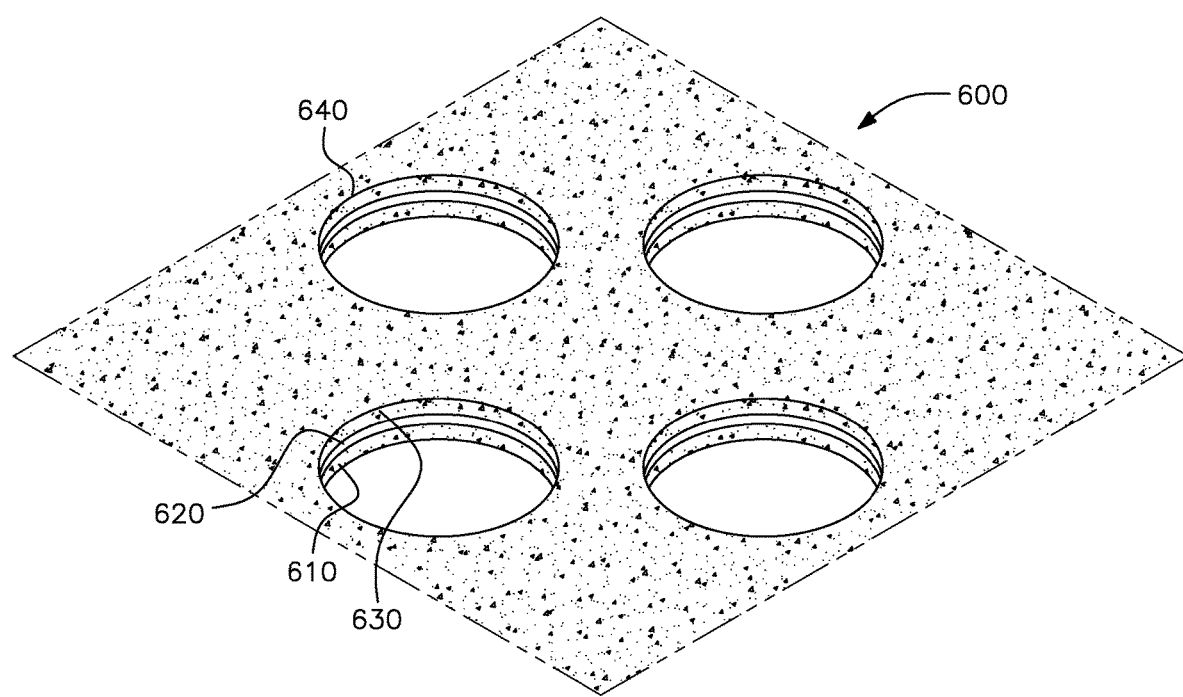
FIG. 9 is a top perspective plan view of a starting sheet having holes formed therein for forming the rectangular three-layer integral geogrid having two outer layers with a cellular structure shown in FIG. 7.

FIG. 9 is a top perspective plan view of a three-layer polymer starting sheet section 600 that has holes 640 punched therein for forming the rectangular three-layer integral geogrid 700 shown in FIGS. 7 and 8. The multilayer polymer starting sheet 600 includes, disposed between a first expansion outer layer 610 and a second expansion outer layer 630, a third layer, i.e., a non-cellular inner layer 620. As with the triangular geometry described herein, the first expansion outer layer 610 and the second expansion outer layer 630 form a distribution of cellular openings 650 in the final integral geogrid 700 shown in FIGS. 7 and 8.

And, as with the triangular geometry embodiment of the multilayer integral geogrid having one or more cellular layers, the rectangular embodiment of the multilayer integral geogrid one or more cellular layers has a cellular layer that is either foamed or contains a particulate filler. And, the starting sheet of the rectangular embodiment of the multilayer integral geogrid having one or more cellular layers is the same as previously disclosed herein for the triangular embodiment, and may be formed by coextrusion or lamination.

Figure 10:
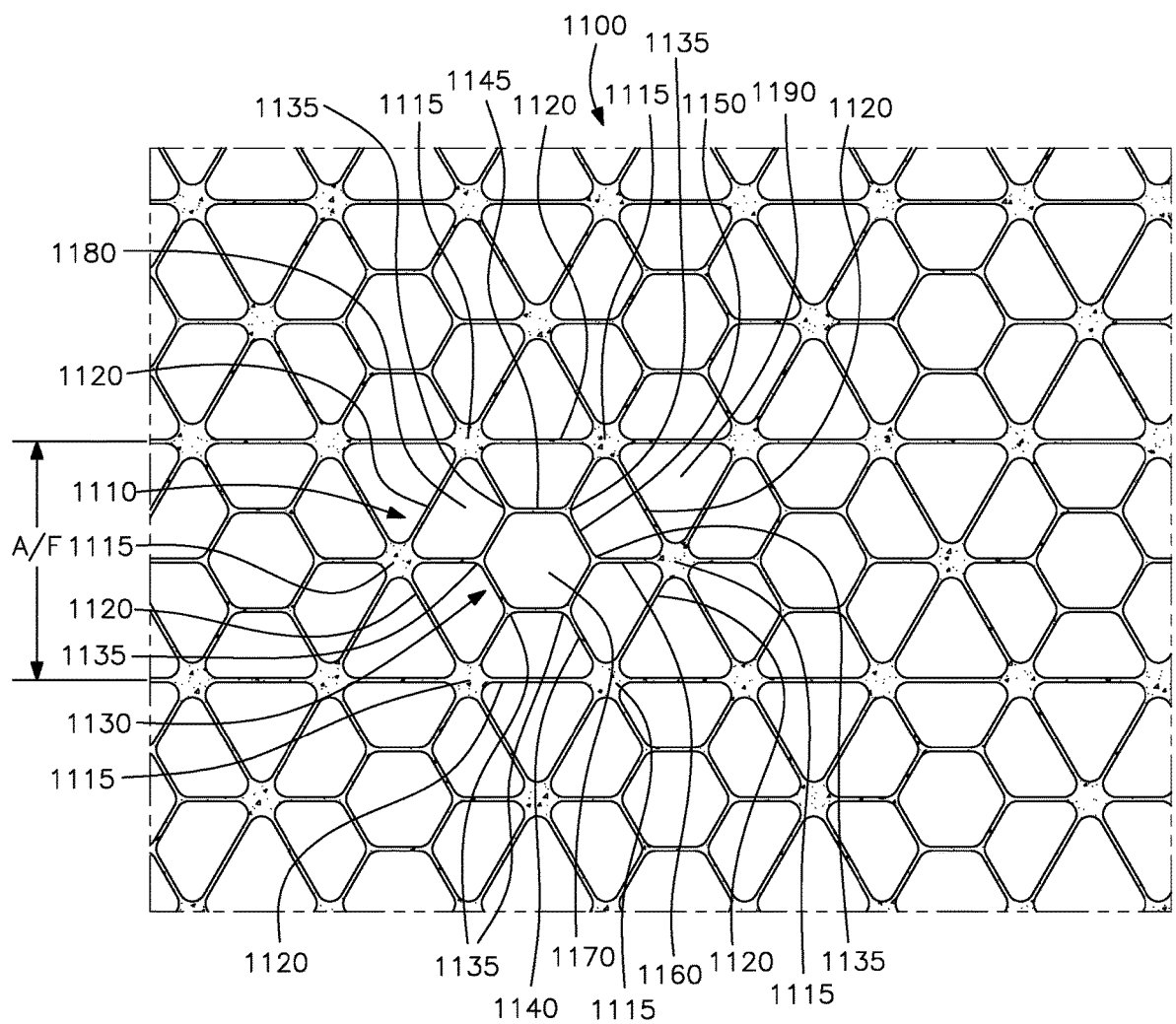
FIG. 10 is a plan view of a hexagonal three-layer integral geogrid having two outer layers with a cellular structure according to yet another embodiment of the present invention.
Figure 11:
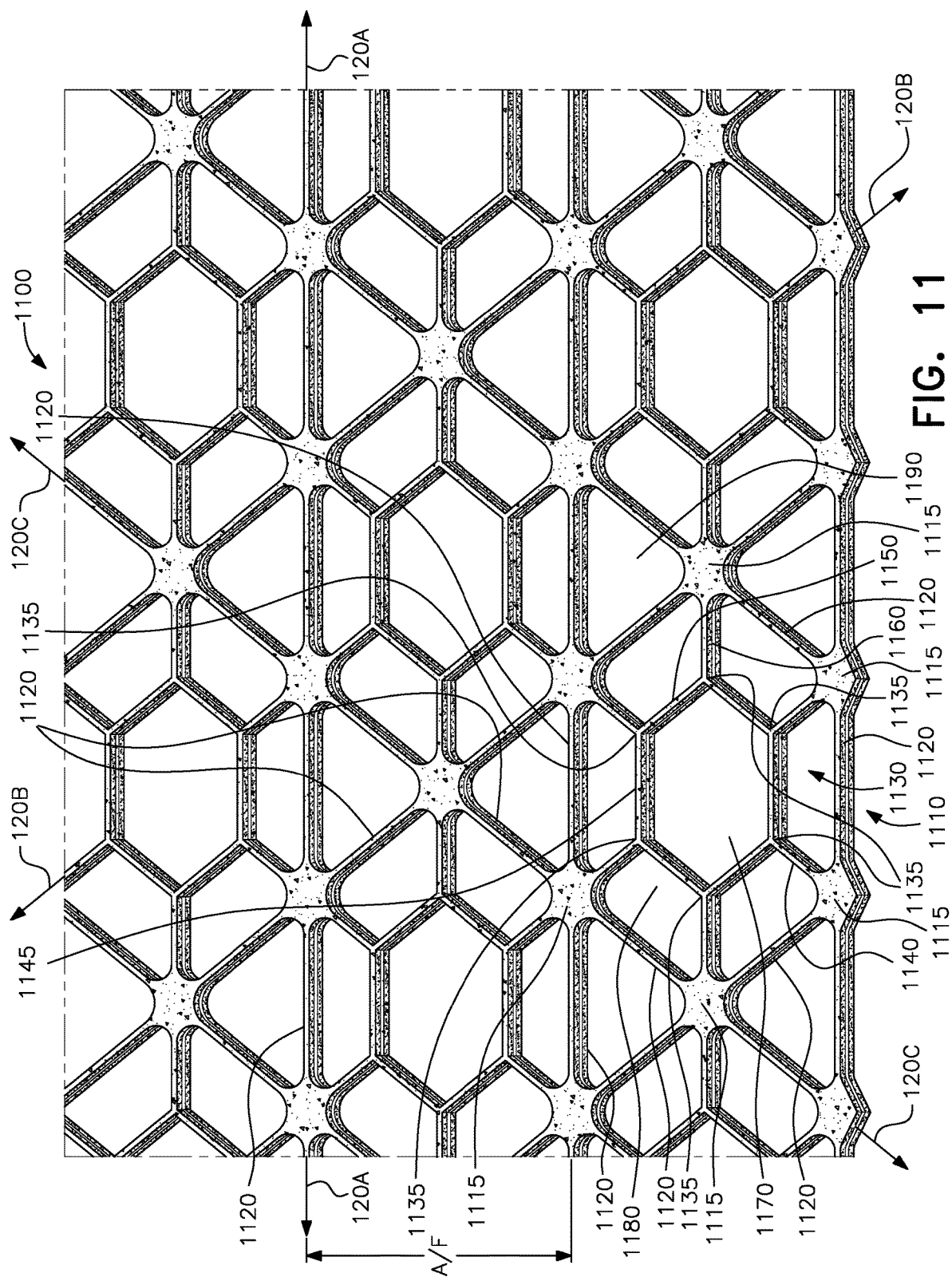
FIG. 11 is a perspective view of the hexagonal three-layer integral geogrid having two outer layers with a cellular structure shown in FIG. 10.

And finally, the geometry of a hexagonal multilayer (here, three-layer) integral geogrid 1100 having one or more cellular layers is as shown in FIGS. 10 and 11. The impetus for the development of the hexagonal multilayer integral geogrid having one or more cellular layers is that it is structurally and economically advantageous to produce an integral geogrid having a structure and geometry with the ability to engage with and stabilize a wide variety and range of quality of aggregates that is suitable for the demands of service applications such as geosynthetic reinforcement or having other properties desirable for particular geosynthetic applications.

The hexagonal multilayer integral geogrid having one or more cellular layers is designed to improve upon a triaxial integral geogrid by retaining the isotropic properties of the triaxial geometry while substantially enhancing aggregate support and interaction. The key improvements of the hexagonal multilayer integral geogrid over the triaxial geometry and other prior art geometries relate to at least two key design features. First, with respect to geometry, the hexagonal multilayer integral geogrid retains the 360-degree properties of the triaxial geometry by retaining every other rib in each of three rib directions as continuous ribs. However, the hexagonal multilayer integral geogrid converts every other node along the non-continuous ribs from a non-functional element (a node) into a functional feature—a new open hexagon that comprises six new rib elements. These six new rib elements are now functional features rather than one non-functional node. The open hexagon and the six rib elements substantially increase the degree to which the hexagonal multilayer integral geogrid can interact with and support aggregate. In addition, the hexagonal multilayer integral geogrid geometry provides continuous ribs in three directions, which provides 360-degree strength and stability properties. This is done in a variety of ways including, as described above, converting non-functional nodes to functional elements, and improving macro-interaction by incorporating higher ribs.

Second, according to one embodiment of the invention, the coextruded hexagonal multilayer integral geogrid utilizes the multilayer construction and the foam or filler enhancements described herein. That is, by virtue of the coextruded multilayer construction and the cellular structures of the outer two layers, the invention provides for micro-interaction associated with top and bottom layers of compressible polymer designed to nest aggregate particles and facilitate and maintain maximum properties of the aggregate. This advanced coextrusion process technology also yields other benefits in production and manufacturing, such as improved adhesion between layers due to simultaneous extrusion, controlled creation of cellular structure while maintaining appropriate relative velocity and shear rate between the layers, and cost reduction due to the single step process of making the multilayer sheet. In short, the combining together of these design features into the hexagonal multilayer integral geogrid results in significantly better performance than a triaxial geogrid, and yields various production and manufacturing benefits that allow this new and novel geogrid to be produced with only minor incremental cost increase.

To attain the aforementioned ability to engage with and stabilize a greater variety and range of quality of aggregates than geometries associated with prior geogrid structures, while simultaneously providing a variety of degrees of localized out-of-plane and in-plane stiffness, the hexagonal multilayer integral geogrid having one or more cellular layers of the present invention has a repeating pattern of interconnected oriented multilayer strands and partially oriented multilayer junctions which form a repeating pattern of outer hexagons, each of which supports and surrounds an oriented multilayer inner hexagon to define three different shaped openings of a multi-axial integral geogrid. To provide additional strength and stability, the geometry of the outer hexagons forms linear strands that extend continuously throughout the entirety of the multi-axial integral geogrid in three different directions.

As so formed, the inner multilayer hexagon is comprised of six oriented multilayer strands and is supported by six oriented multilayer connecting strands which extend from the partially oriented multilayer junctions of the outer hexagon to a respective corner of the inner hexagon to form oriented multilayer tri-nodes. The multilayer tri-nodes have a much higher level of orientation than the multilayer junctions, and tend towards being fully oriented. This configuration creates an inner multilayer hexagon that is suspended, i.e., floating, relative to the outer multilayer hexagon structure. This structure allows the inner multilayer hexagon to shift up or down so as to "float" or flex (i.e., deform) relative to the primary plane of the integral geogrid, during placement and compaction of the aggregate, which enhances the integral geogrid's ability to engage and stabilize the aggregate. As noted above, the foregoing integral geogrid structure is herein referred to as a multilayer integral geogrid having a "repeating floating hexagon within a hexagon pattern or simply a "hexagonal" multilayer integral geogrid.

Referring now to FIGS. 10 and 11, the hexagonal three-layer integral geogrid 1100 having one or more cellular layers includes a plurality of interconnected, oriented multilayer strands having an array of openings therein, a repeating floating hexagon within a hexagon pattern of the interconnected, oriented multilayer strands and the openings, and including linear multilayer strands that extend continuously throughout an entirety of the multi-axial integral geogrid. These linear multilayer strands that extend continuously throughout an entirety of the multi-axial integral constitute strong axis strands. More specifically, the hexagonal three-layer integral geogrid 1100 having one or more cellular layers includes a repeating pattern of floating inner hexagons 1130 within each outer hexagon 1110. The outer hexagon 1110 includes a plurality of outer oriented multilayer strands or ribs 1120 interconnected by partially oriented multilayer junctions 1115. The inner hexagon 1130 includes a plurality of oriented multilayer connecting strands 1145 and 1150 interconnected by multilayer tri-nodes 1135, and defines a hexagon-shaped center opening 1170. The outer hexagon

1110 is connected to the smaller inner hexagon 1130 by a plurality of multilayer supporting strands 1140 and 1160, which define a plurality of trapezoid-shaped openings 1180. At the center of each pattern of three adjacent outer hexagons 1110 is a triangular shaped opening 1190. As shown, junctions 1115 are much larger than tri-nodes 1135.

In another aspect of the hexagonal geometry embodiment of the instant invention, the supporting strands 1140 and 1160, which extend inwardly from the partially oriented junctions 1115 and connect with the tri-nodes 1135 of the floating inner hexagon 1130 (or such other inner geometric configurations described herein), which is supported by such supporting strands, constitute "engineered discontinuities" or "floating engineered discontinuities."

As is evident from FIG. 10, another feature of the hexagonal three-layer integral geogrid 1100 having one or more cellular layers of the present invention is the linearly continuous nature of the outer multilayer strands 1120 of the repeating outer hexagon pattern. That is, the oriented multilayer strands 1120 are linearly continuous, via partially oriented multilayer junctions 1115, as they extend continuously throughout the entirety of the multi-axial integral geogrid in three different directions separated from each other by approximately 120°, and indicated by arrows 120A, 120B, and 120C in FIGS. 10 and 11. These linear multilayer strands that extend continuously throughout an entirety of the multi-axial integral constitute strong axis strands. Those skilled in the art will appreciate that different orientations of the same basic geometry are possible after stretching, if an appropriate corresponding rotation of the punched starting sheet geometry is made. The linearly continuous nature of the multilayer strands 1120 provides both enhanced strength and in-plane stiffness to the hexagonal multilayer integral geogrid having one or more cellular layers of the present invention.

Preferably, the thickness of the hexagonal three-layer integral geogrid 1100 having two outer cellular layers at its thickest dimension (at junctions 1115) is from about 1.5 mm to about 10 mm and, more preferably, such thickness of the multi-axial expanded three-layer integral geogrid 1100 is from about 4 mm to about 8 mm.

Figure 20:
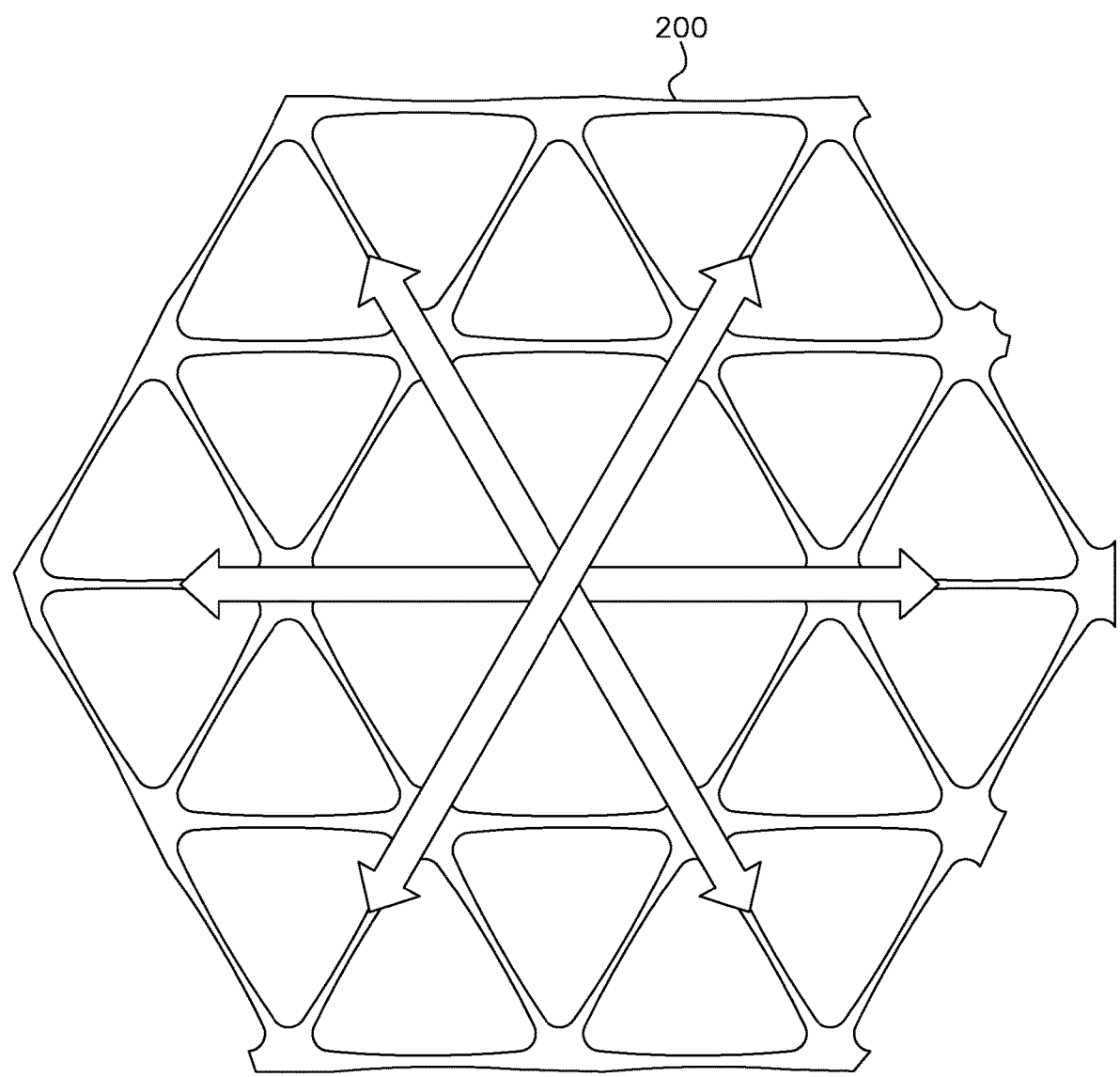
FIG. 20 illustrates the isotropic properties associated with the triangular geometric features of a triaxial multilayer integral geogrid such as that depicted in FIGS. 1 and 6.

With regard to the geometry of the integral geogrid, FIG. 20 illustrates the isotropic properties associated with the triangular geometric features of a triaxial multilayer integral geogrid such as that depicted in FIGS. 1 and 6. And, FIG. 21 illustrates the isotropic properties associated with the continuous ribs in three directions, which is a structural geometric feature of a hexagonal multilayer integral geogrid such as that depicted in FIGS. 10, 11, and 13.

Figure 22:
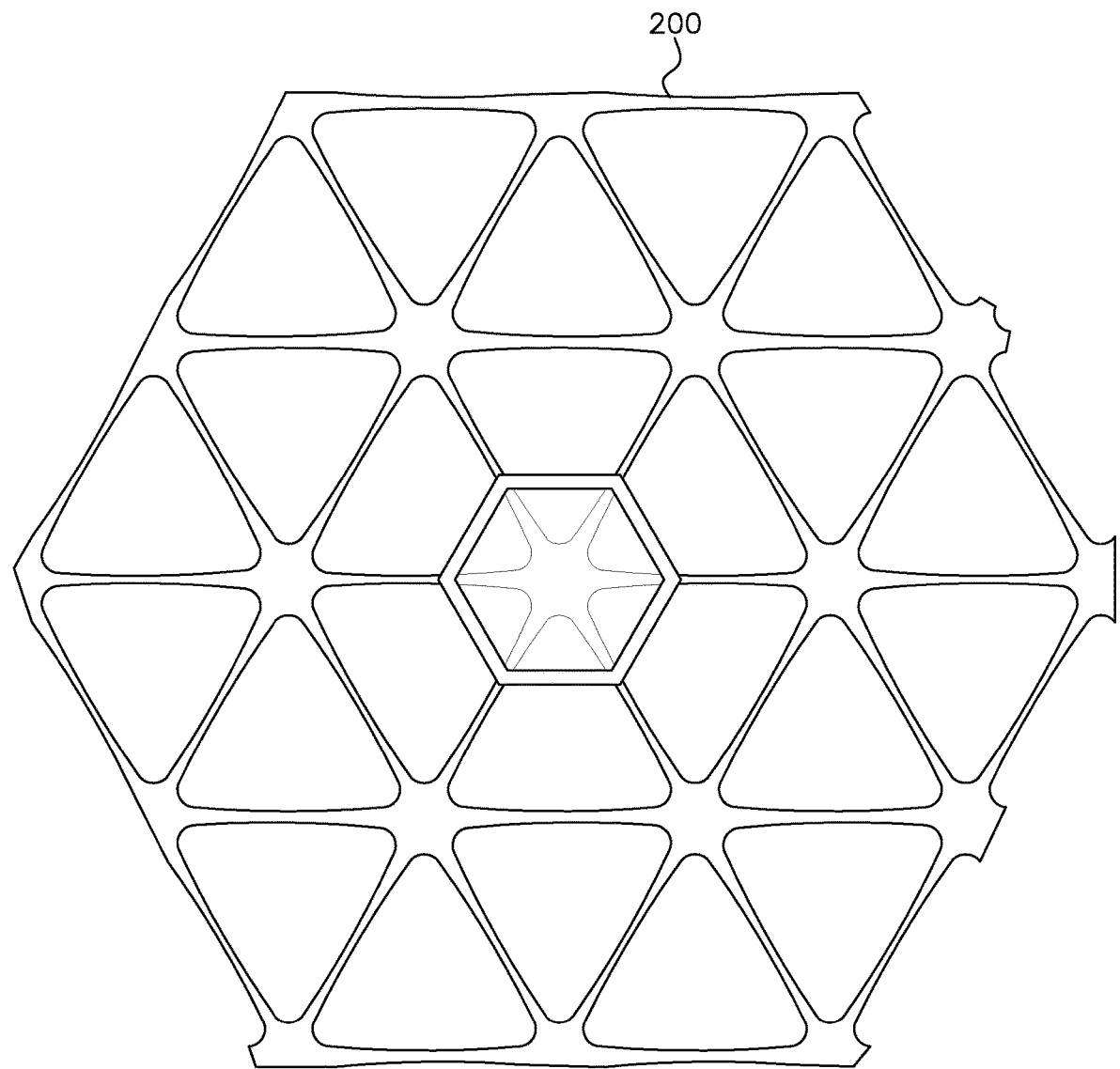
FIG. 22 illustrates on a triaxial geogrid an overlay of an open center hexagon associated with the hexagonal multilayer integral geogrid such as that depicted in FIGS. 10, 11, and 13.
Figure 23:
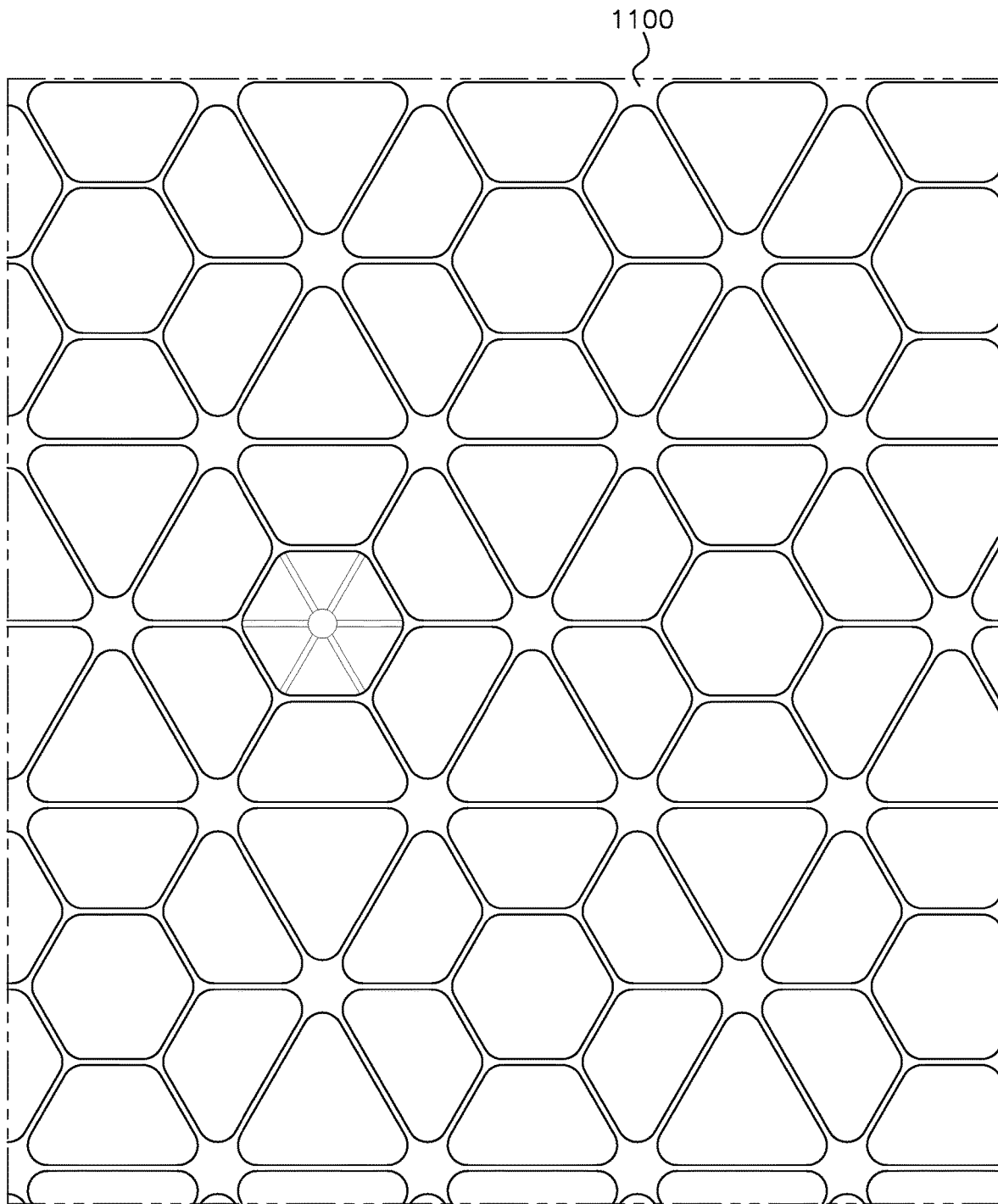
FIG. 23 illustrates the open center hexagon and six rib elements associated with the hexagonal multilayer integral geogrid such as that depicted in FIGS. 10, 11, and 13.

Additionally, FIG. 22 illustrates on a triaxial geogrid an overlay of an open center hexagon associated with the hexagonal multilayer integral geogrid such as that depicted in FIGS. 10, 11, and 13. And, FIG. 23 illustrates the open center hexagon and six rib elements associated with the hexagonal multilayer integral geogrid such as that depicted in FIGS. 10, 11, and 13.

Figure 24:
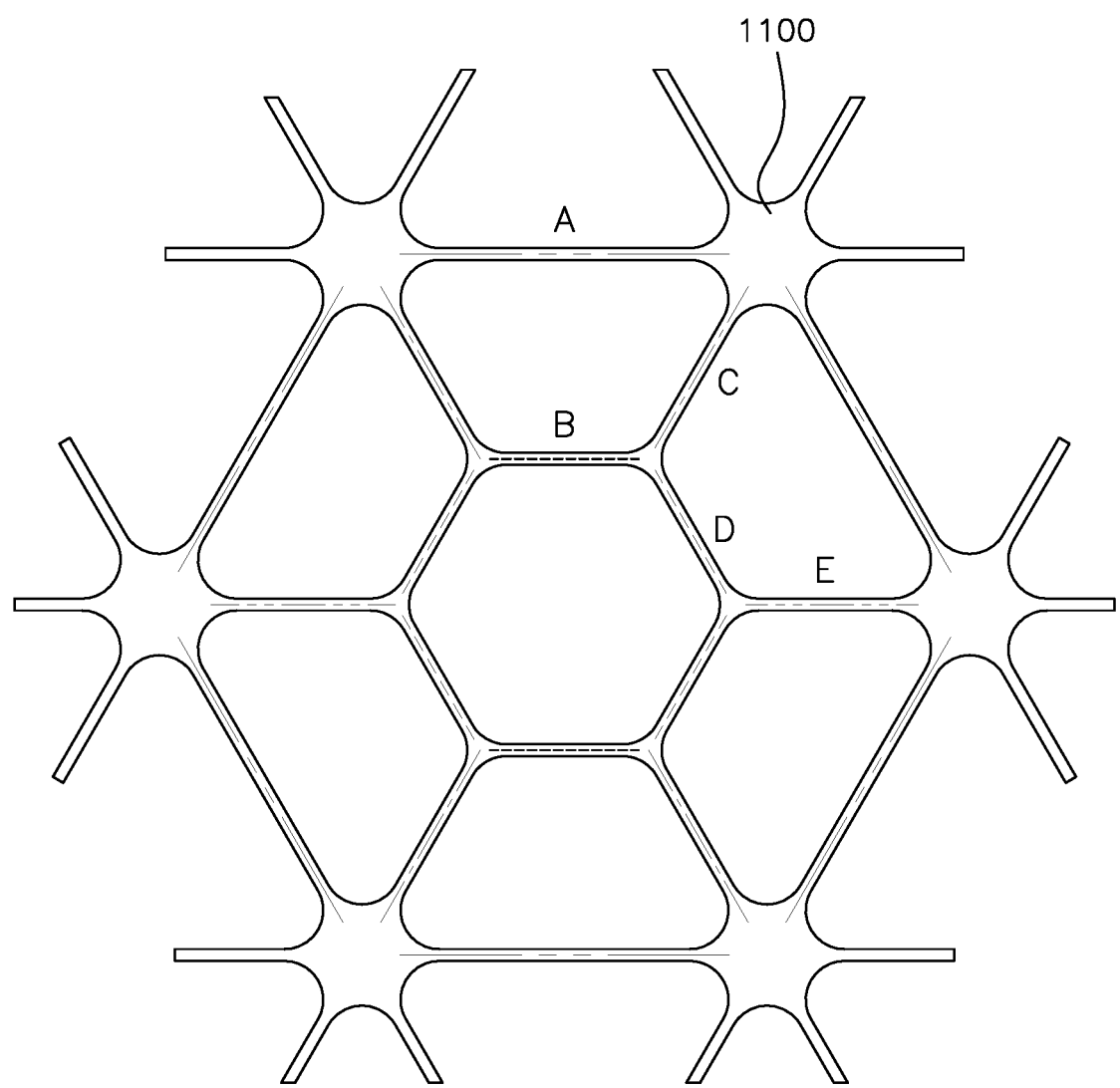
FIG. 24 is a partial plan view that illustrates the various strand lengths of the hexagonal multilayer integral geogrid such as that depicted in FIGS. 10, 11, and 13.

FIG. 24 is a partial plan view that illustrates the various strand lengths of the hexagonal multilayer integral geogrid such as that depicted in FIGS. 10, 11, and 13.

Figure 21:
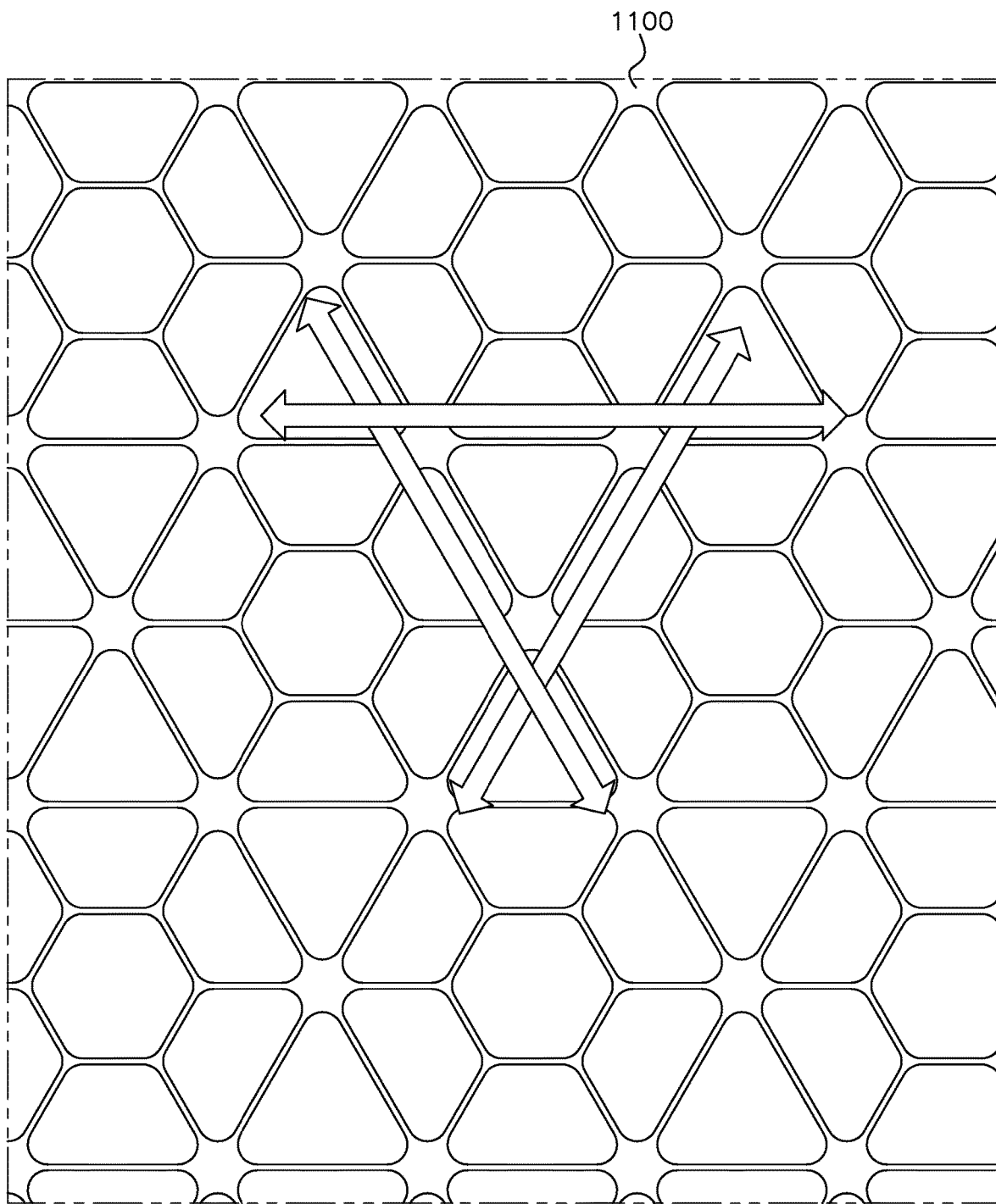
FIG. 21 illustrates the isotropic properties associated with the continuous ribs in three directions, which is a structural geometric feature of a hexagonal multilayer integral geogrid such as that depicted in FIGS. 10, 11, and 13.
Figure 38:
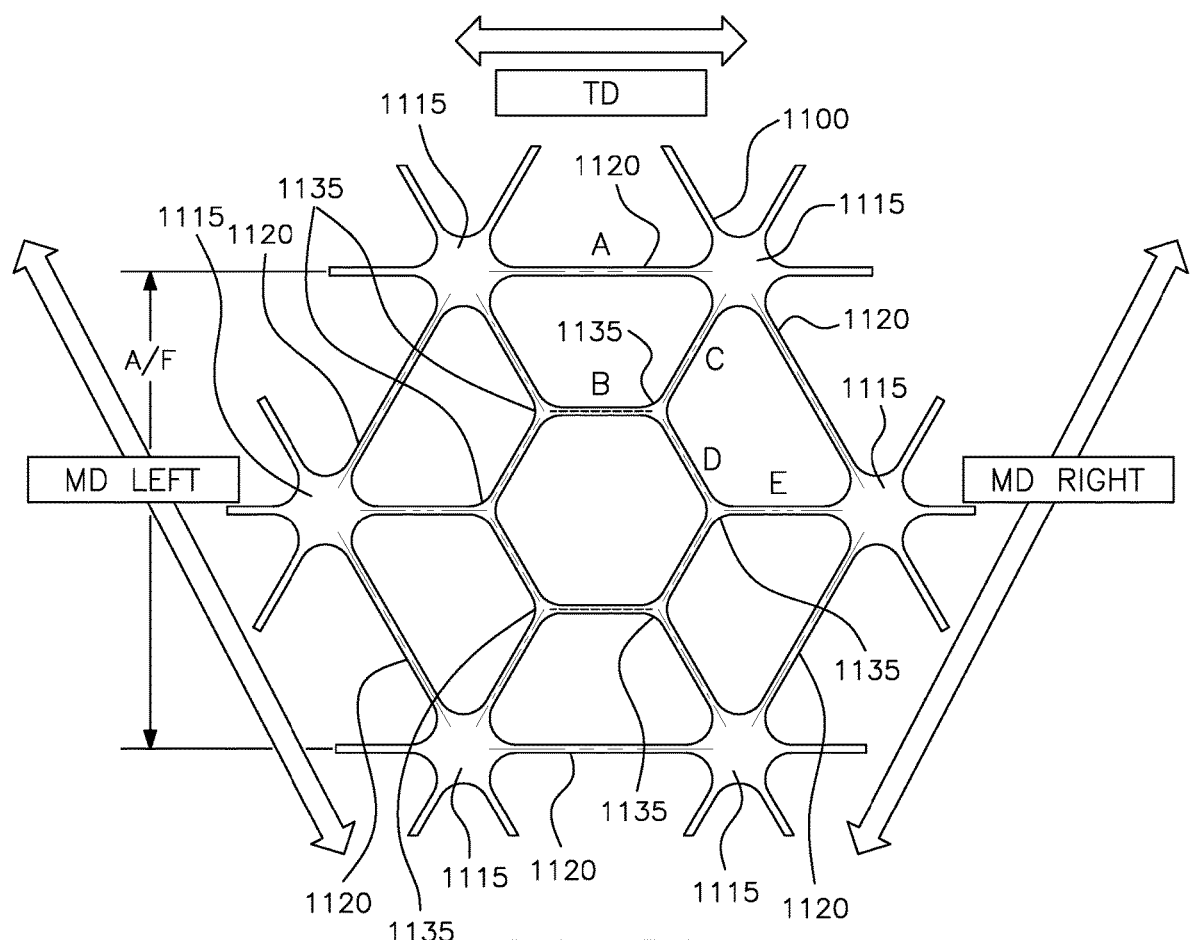
FIG. 38 is a partial plan view that illustrates the various strand lengths of the hexagonal three-layer integral geogrid such as that depicted in FIGS. 10 and 11, and the continuous ribs associated with the left machine direction, the right machine direction, and the transverse direction, similar to that shown in FIG. 21.
Figure 39:
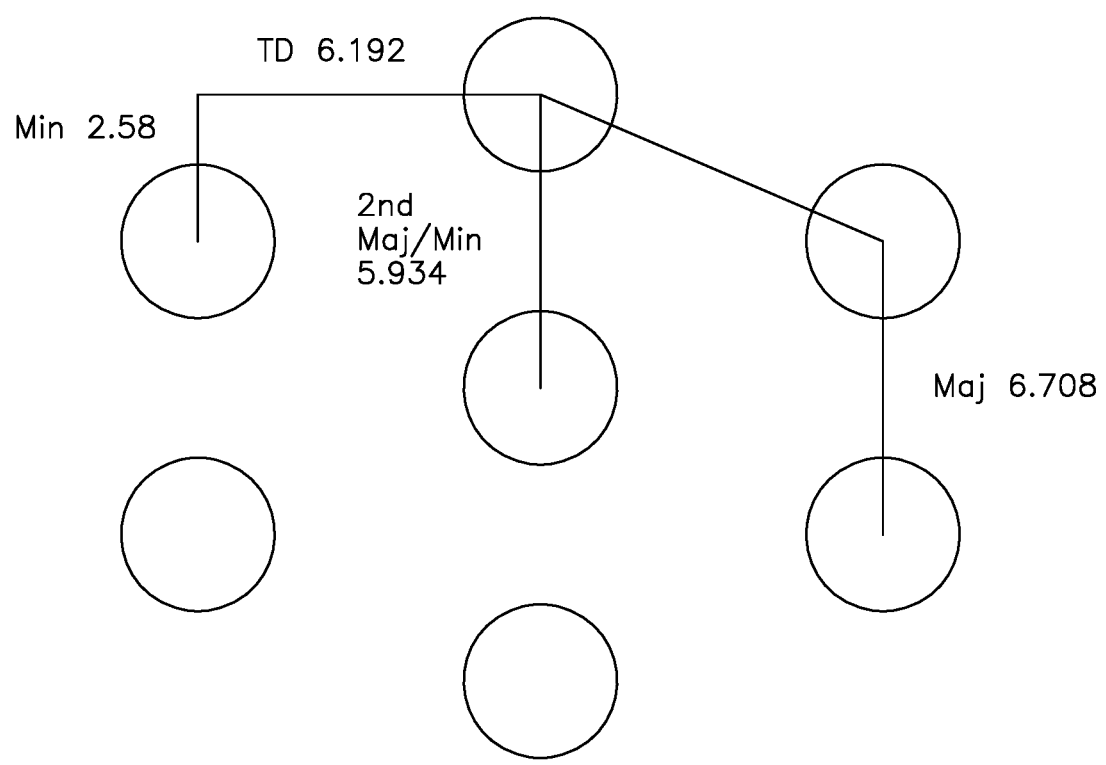
FIG. 39 is a plan view of a possible size and spacing for the holes associated with the starting sheet utilized to produce the hexagonal three-layer integral geogrid shown in FIG. 38.
Figure 40:
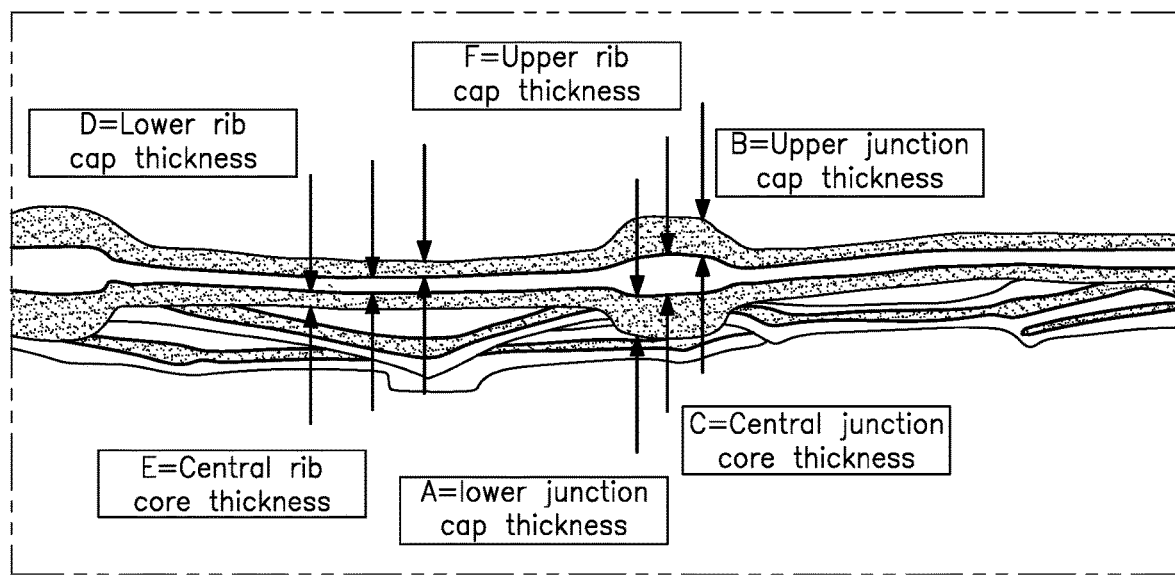
FIG. 40 is aside cross-sectional view of a partial section of a hexagonal three-layer integral geogrid having two outer layers with a cellular structure according to the embodiment of the present invention shown in FIG. 11.

Additionally, FIG. 38 is a partial plan view that illustrates the various strand lengths of the hexagonal three-layer integral geogrid such as that depicted in FIGS. 10 and 11, and the continuous ribs associated with the left machine direction, the right machine direction, and the transverse direction, similar to that shown in FIG. 21. FIG. 39 is a plan view of a possible size and spacing for the holes associated with the starting sheet utilized to produce the hexagonal three-layer integral geogrid shown in FIG. 38. And, FIG. 40 is aside cross-sectional view of a partial section of a hexagonal three-layer integral geogrid having two outer layers with a cellular structure according to the embodiment of the present invention shown in FIG. 11.

Now, more specifically, turning back to FIG. 24, for one embodiment of a hexagonal three-layer integral geogrid according to the present invention as shown in FIG. 24, the multilayer integral geogrid has a Rib A height having a broad range of from 1 mm to 4 mm, a preferred range of from 2 mm to 3 mm, and a preferred dimension of 1.97 mm. The Rib A width has a broad range of from 0.75 mm to 3 mm, a preferred range of from 1 mm to 2 mm, and a preferred dimension of 1.6 mm. The Rib A length has a broad range of from 30 mm to 45 mm, a preferred range of from 35 mm to 40 mm, and a preferred dimension of 37 mm. The Rib A aspect ratio has a broad range of from 1:1 to 3:1, a preferred range of from 1.5:1 to 1.8:1, and a preferred value of 1.7:1.

The Rib B height has a broad range of from 1 mm to 3 mm, a preferred range of from 1.5 mm to 2.5 mm, and a preferred dimension of 1.6 mm. The Rib B width has a broad range of from 0.75 mm to 3.5 mm, a preferred range of from 1 mm to 3 mm, and a preferred dimension of 1.8 mm. The Rib B length has a broad range of from 15 mm to 25 mm, a preferred range of from 18 mm to 22 mm, and a preferred dimension of 21 mm. The Rib B aspect ratio has a broad range of from 0.75:1 to 2:1, a preferred range of from 1.2:1 to 1.4:1, and a preferred value of 1.3:1.

The Rib C height has a broad range of from 1 mm to 4 mm, a preferred range of from 2 mm to 3 mm, and a preferred dimension of 2.7 mm. The Rib C width has a broad range of from 0.75 mm to 3.5 mm, a preferred range of from 1 mm to 2.5 mm, and a preferred dimension of 1.6 mm. The Rib C length has a broad range of from 15 mm to 30 mm, a preferred range of from 20 mm to 25 mm, and a preferred dimension of 23 mm. The Rib C aspect ratio has a broad range of from 1:1 to 3:1, a preferred range of from 1.5:1 to 2.5:1, and a preferred value of 1.7:1.

The Rib D height has a broad range of from 1.5 mm to 4 mm, a preferred range of from 2 mm to 3.5 mm, and a preferred dimension of 2.3 mm. The Rib D width has a broad range of from 1 mm to 4 mm, a preferred range of from 1.5 mm to 2.5 mm, and a preferred dimension of 1.5 mm. The Rib D length has a broad range of from 10 mm to 30 mm, a preferred range of from 15 mm to 25 mm, and a preferred dimension of 18 mm. The Rib D aspect ratio has a broad range of from 1:1 to 3:1, a preferred range of from 1.4:1 to 1.7:1, and a preferred value of 1.6:1.

The Rib E height has a broad range of from 1 mm to 4 mm, a preferred range of from 1.5 mm to 3.0 mm, and a preferred dimension of 1.9 mm. The Rib E width has a broad range of from 0.75 mm to 3.5 mm, a preferred range of from 1 mm to 3 mm, and a preferred dimension of 1.7 mm. The Rib E length has a broad range of from 15 mm to 30 mm, a preferred range of from 20 mm to 25 mm, and a preferred dimension of 22 mm. The Rib E aspect ratio has a broad range of from 0.75:1 to 2:1, a preferred range of from 1:1 to 1.5:1, and a preferred value of 1.3:1. The Major Node thickness has a broad range of from 1.5 mm to 10 mm, a preferred range of from 3 mm to 8 mm, and a preferred dimension of 5.1 mm.

And, as shown in FIG. 40, for one embodiment of the hexagonal three-layer integral geogrid according to the present invention, which has a first and a second compressible, cellular outer layer arranged on opposite surfaces of an inner non-cellular layer, the multilayer integral geogrid has a lower junction (i.e., junction 1115; see FIG. 11) cap thickness (dimension "A") having a broad range of from 1 mm to 3 mm, a preferred range of from 1.5 mm to 2.5 mm, and a preferred dimension of 1.7 mm; an upper junction cap thickness (dimension "B") having a broad range of from 1 mm to 3 mm, a preferred range of from 1.5 mm to 2.5 mm, and a preferred dimension of 1.7 mm; a central junction core thickness (dimension "C") having a broad range of from 1 mm to 3 mm, a preferred range of from 1.5 mm to 2.5 mm, and a preferred dimension of 1.7 mm; a rib A (see FIG. 24) lower cap thickness (dimension "D") having a broad range of from 0.4 mm to 1 mm, a preferred range of from 0.5 mm to 0.8 mm, and a preferred dimension of 0.7 mm; a rib A upper cap thickness (dimension "F") having a broad range of from 0.4 mm to 1 mm, a preferred range of from 0.5 mm to 0.8 mm, and a preferred dimension of 0.7 mm; and a rib A central core thickness (dimension "E") having a broad range of from 0.4 mm to 1 mm, a preferred range of from 0.5 mm to 0.8 mm, and a preferred dimension of 0.6 mm.

Figure 12:
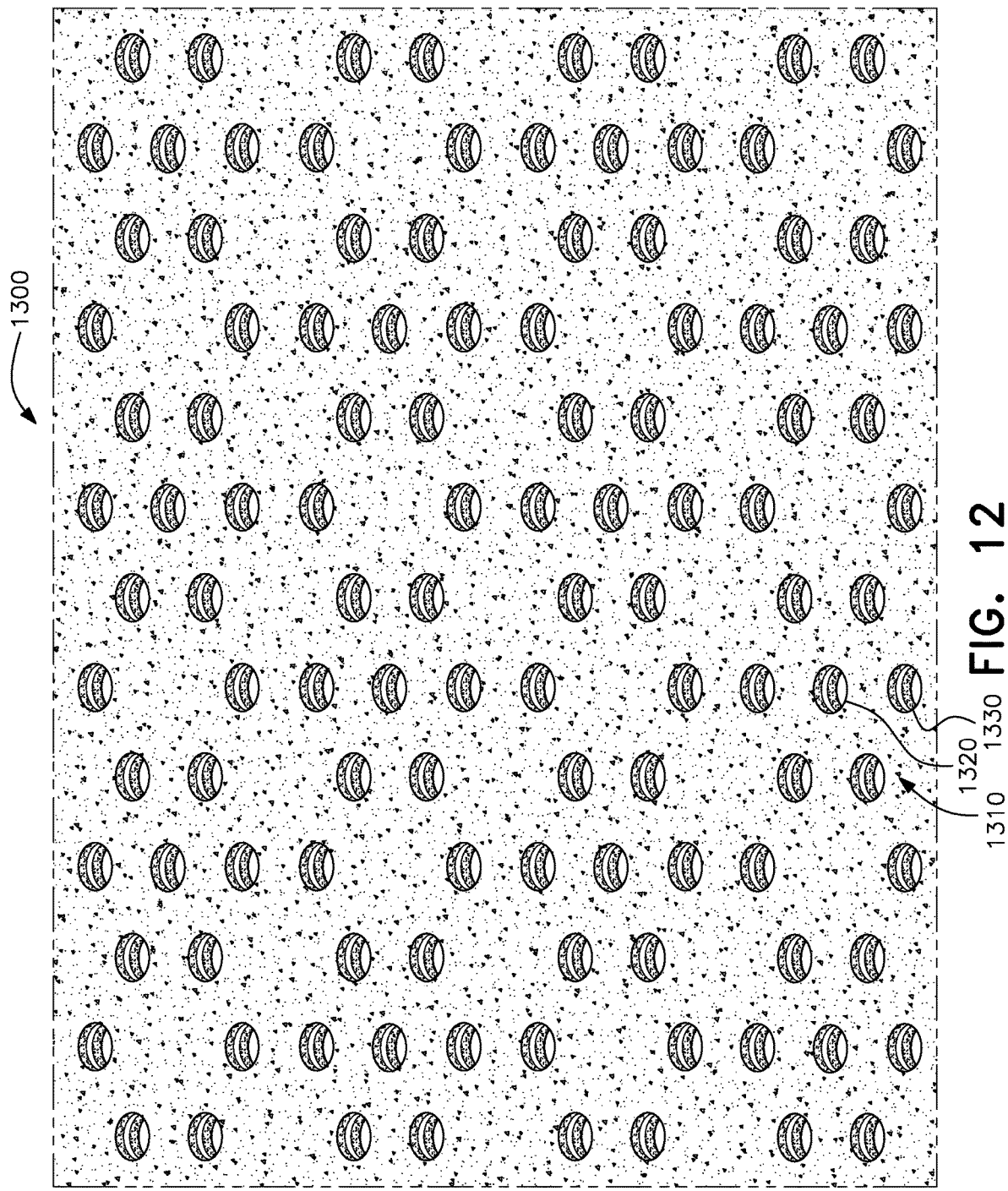
FIG. 12 is a top perspective view of a starting sheet having holes formed therein for forming the hexagonal three-layer integral geogrid having two outer layers with a cellular structure shown in FIG. 10.

FIG. 12 is a top perspective view of a three-layer polymer starting sheet 1300 having holes formed therein for forming the hexagonal three-layer integral geogrid 1100 having two outer cellular layers shown in FIGS. 10 and 11. The three-layer polymer starting sheet 1300 includes, disposed between a first expansion outer layer 1310 and a second expansion outer layer 1330, a third layer, i.e., a non-cellular inner layer 1320.

And, as with the triangular and rectangular geometry embodiments of the multilayer integral geogrid having one or more cellular layers, the hexagonal embodiment of the multilayer integral geogrid 1100 having one or more cellular layers has a cellular layer that is either foamed or contains a particulate filler. And, the starting sheet of the hexagonal embodiment of the multilayer integral geogrid having one or more cellular layers is the same as previously disclosed herein for the triangular and rectangular geometry embodiments, and may be formed by coextrusion or lamination.

The multilayer polymer starting sheet 1300 used as the starting material for a hexagonal multilayer integral geogrid 1100 having one or more cellular layers according to the present invention is preferably through-punched, although it may be possible to use depressions formed therein instead. According to the embodiment of the starting material in which depressions are formed in the sheet, the depressions are provided on each side of the sheet, i.e., on both the top and the bottom of the sheet.

As shown in FIG. 12, the three-layer polymer starting sheet 1300 includes a repeating pattern 1310 of holes 1320 and spacing 1330 that when oriented provide the floating hexagon within a hexagon pattern of the hexagonal expanded three-layer integral geogrid 1100 shown in FIGS. 10 and 11.

More specifically, a preferred hexagonal three-layer integral geogrid according to the present invention is as shown in FIG. 38, which also illustrates the continuous strands (or "ribs") associated with the left machine direction ("MD Left"), the right machine direction ("MD Right"), and the transverse direction ("TD"). As shown in FIG. 38, the "across the flats" (sometimes designated herein as "A/F") dimension of the outer hexagon repeating unit of the hexagonal embodiment of the integral geogrid according to the present invention is the distance between the parallel strong axis strands of the outer hexagon, i.e., the strong axis strands extending parallel to one another in each of the left machine direction, the right machine direction, and the transverse direction. Even more specifically, per the depiction of the hexagonal embodiment of the invention shown in FIGS. 10, 11, and 38, the A/F dimension is the distance between any of the parallel strands 1120, i.e., in each of the left machine direction, the right machine direction, and the transverse direction. According to one preferred embodiment of the hexagonal three-layer integral geogrid shown in FIG. 38, the A/F dimension, i.e., the distance from one multilayer junction 1115 associated with a strand 1120 of the outer hexagon (see also FIGS. 10 and 11) to the opposite multilayer junction 1115 associated with a parallel strand 1120 of the outer hexagon, is approximately 80 mm. And, for the same embodiment, the across the flats dimension, i.e., the distance from one multilayer tri-node 1135 of the inner hexagon (see FIG. 11) to the opposite multilayer tri-node 1135 of the inner hexagon, is approximately 33 mm. For this preferred embodiment of the multilayer integral geogrid according to the present invention, the total starting sheet thickness has a broad range of from 2 mm to 12 mm, a preferred range of from 4 mm to 8 mm, and a preferred dimension of 5.5 mm. The punch size/diameter has a broad range of from 2 mm to 7 mm, a preferred range of from 3 mm to 5 mm, and a preferred dimension of 3.68 mm. The major pitch in the first stretch direction has a broad range of from 5 mm to 9 mm, a preferred range of from 6 mm to 8 mm, and preferred dimension of 6.7088 mm. The minor pitch in the first stretch direction has a broad range of from 1 mm to 4 mm, a preferred range of from 2 mm to 3 mm, and a preferred dimension of 2.58 mm. The second major/minor pitch in the first stretch direction has a broad range of from 4 mm to 8 mm, a preferred range of from 5 mm to 7 mm, and a preferred dimension of 5.934 mm. The major pitch in the second stretch direction has a broad range of from 4 mm to 8 mm, a preferred range of from 5 mm to 7 mm, and a preferred dimension of 6.192 mm.

And, in general, the three-layer polymer starting sheet 1300 is polymeric in nature. For example, the material of construction may include high molecular weight polyolefins, and broad specification polymers. Furthermore, the polymeric materials may be virgin stock, or may be recycled materials, such as, for example, post-industrial or post-consumer recycled polymeric materials. And, the use of one or more polymeric layers having a lower cost than that of the aforementioned high molecular weight polyolefins and broad specification polymers is also contemplated. According to the preferred embodiment of the invention, the high molecular weight polyolefin is a polypropylene.

According to a preferred embodiment of the present invention, the multilayer strands 1120, 1140, 1145, 1150, and 1160 of the hexagonal three-layer integral geogrid 1100 have what is known to one skilled in the art as a high aspect ratio, i.e., a ratio of the thickness or height of the multilayer strand cross section to the width of the multilayer strand cross section that is greater than 1.0 in accordance with the aforesaid Walsh patents, i.e., U.S. Pat. Nos. 9,556,580, 10,024,002, and 10,501,896. While not absolutely necessary for the present invention, a high aspect ratio for the strands or ribs is preferred. Thus, the multi-axial integral geogrid of the present invention provides enhanced compatibility between geogrid and aggregate, which results in improved interlock, lateral restraint, and confinement of the aggregate.

As noted herein, instead of having the above-described embodiments with three or more layers, a multilayer integral geogrid having one or more cellular layers according to the present invention may have a non-cellular layer associated with a single adjacent cellular layer. That is, as shown in FIG. 13, a hexagonal two-layer integral geogrid 1500 in accordance with the present invention has one cellular layer 1510 and one non-cellular layer 1520. The remaining elements of the hexagonal two-layer integral geogrid 1500 are as described above, except that the multilayer structure has only the two layers, i.e., the cellular layer 1510 and the non-cellular layer 1520.

Figure 15:
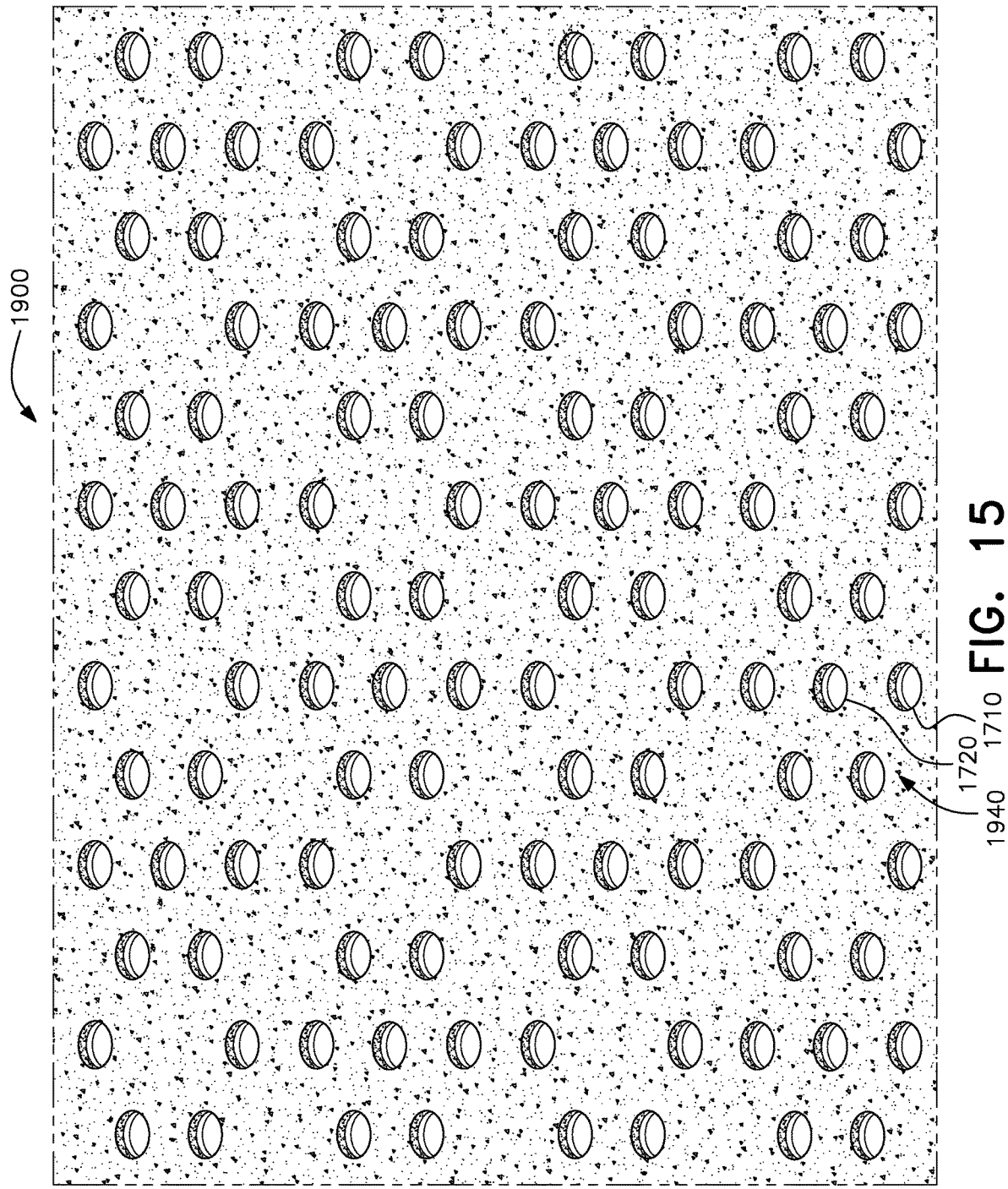
FIG. 15 is a top perspective plan view of the starting sheet having holes formed therein for forming the hexagonal two-layer integral geogrid shown in FIG. 13.
Figure 16:
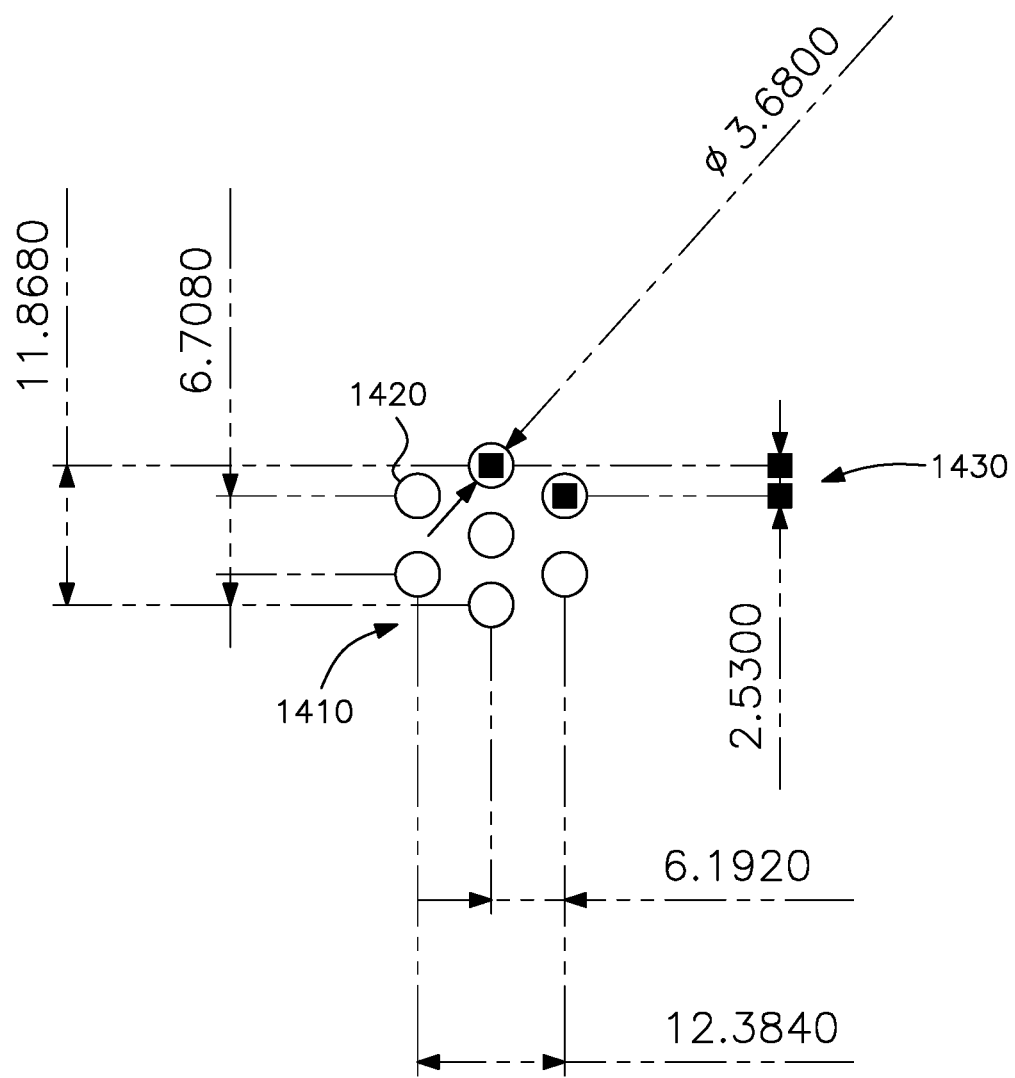
FIG. 16 is a plan view of a possible size and spacing for the holes shown in the starting sheet of FIG. 12.

As shown in FIG. 14, the two-layer polymer starting sheet 1700 associated with the two-layer integral geogrid embodiment of the invention includes an expansion layer 1710 and a non-cellular layer 1720. The expansion layer 1710 and the non-cellular layer 1720 are preferably arranged in a uniplanar or substantially uniplanar configuration. FIG. 15 is a top perspective plan view of a two-layer polymer starting sheet 1900 that has a pattern of holes 1940 punched therein for forming the hexagonal two-layer integral geogrid 1500 shown in FIG. 13.

More specifically, per FIG. 13, the hexagonal two-layer integral geogrid 1500 having one cellular layer includes a repeating pattern of floating inner hexagons 1530 within each outer hexagon 1510. The outer hexagon 1510 includes a plurality of outer oriented multilayer strands or ribs 1520 interconnected by partially oriented multilayer junctions 1515. The inner hexagon 1530 includes a plurality of oriented multilayer connecting strands 1545 and 1550 interconnected by multilayer tri-nodes 1535, and defines a hexagon-shaped center opening 1570. The outer hexagon 1510 is connected to the smaller inner hexagon 1530 by a plurality of multilayer supporting strands 1540 and 1560, which define a plurality of trapezoid-shaped openings 1580. At the center of each pattern of three adjacent outer hexagons 1510 is a triangular shaped opening 1590. As shown, junctions 1515 are much larger than tri-nodes 1535.

The present invention also relates to methods of making the above-described various embodiments of the multilayer integral geogrids having one or more cellular layers.

More specifically, it is an object of the present invention to provide a method of making multilayer integral geogrids having one or more cellular layers in which the layer with the cellular structure is produced by first providing a foamed construction, i.e., a plurality of the cellular openings in a layer of the multilayer polymer starting sheet, and then biaxially orienting the multilayer polymer starting sheet so as to stretch the foamed material and create a distribution of deformed cellular openings of the foamed material.

Correspondingly, it is another object of the present invention to provide a method of making multilayer integral geogrids having one or more cellular layers in which each layer with the cellular structure is produced by first dispersing a particulate filler in a layer of the multilayer polymer starting sheet, and then biaxially orienting the multilayer polymer starting sheet so as to stretch the dispersion of particulate filler and create a distribution of cellular openings as the particulate filler partially separates from the polymeric layer material.

For example, the method of making the above-described triaxial multilayer integral geogrid 200 having one or more cellular layers includes: providing the multilayer polymer starting sheet 100; forming a plurality of holes or depressions in the multilayer polymer starting sheet 100 in a selected pattern, such as in accordance with the disclosure of the Walsh '112 patent; and biaxially stretching and orienting the multilayer polymer starting sheet having the patterned plurality of holes or depressions therein to form a multilayer integral geogrid having one or more cellular layers and having a plurality of interconnected, oriented multilayer strands between partially oriented multilayer junctions and to configure the holes or depressions as grid openings.

In general, once the multilayer polymer starting sheet 100 has been prepared with holes or depressions, the triaxial multilayer integral geogrid 200 having one or more cellular layers can be produced from the sheet 100 according to the methods described in the above-identified patents and known to those skilled in the art.

Furthermore, with regard to the method of making the multiaxial "repeating floating hexagon within a hexagon pattern" embodiment of the multilayer integral geogrid having one or more cellular layers, the method includes providing a polymer sheet 1300; providing a patterned plurality of holes or depressions 1310 in the polymer sheet 1300; and orienting the polymer sheet 1300 having the patterned plurality of holes or depressions 1310 therein to provide a plurality of interconnected, oriented multilayer strands 1120, 1140, 1145, 1150, and 1160 having an array of openings 1170, 1180, and 1190 therein, a repeating floating hexagon 1130 within an outer hexagon 1110 pattern of the interconnected, oriented multilayer strands and the openings, including three linear multilayer strands that extend continuously throughout the entirety of the multi-axial multilayer integral geogrid having a layer or layers with a cellular structure 1100.

In general, once the starting sheet 1300 has been prepared with holes or depressions, the multi-axial multilayer integral geogrid 1100 having one or more cellular layers can be produced from the starting sheet 1300 according to the methods described in the above-identified patents and known to those skilled in the art.

With regard to laminating the layers of the multilayer integral geogrid instead of using coextrusion, an approximation of coextruding can be obtained by one of the following methods, although the resulting product in all likelihood will not have all the advantages associated with the preferred coextruded embodiment. First, separate layers of individually cast starting sheet can be extruded as individual mono-layers, each layer having the required extrusion material recipe. In a post-extrusion process, these layers can then be joined into an approximation of an integrally cast co-extruded material by one of the following processes. For example, a gluing/bonding process can be employed whereby a suitable adhesive is applied to the surfaces of the sheets to be bonded together, e.g., by a padding roller process, and the sheets are then forced together under suitable pressure and or heat to generate a bond. In another approach, a heating/laminating process can be employed whereby a suitable heat source is applied to the surfaces of the sheets to be bonded together, e.g., by an induction heated roller or a gas, and the sheets are then forced together under suitable pressure and or heat to generate a bond. In still another approach, a mechanical welding/bonding process can be employed whereby continuous localized welding is performed by, e.g., ultrasonic or friction welding. And, in still another approach, chemical welding/bonding process can be employed whereby a suitable solvent is introduced to the surfaces of the sheets to be bonded together, e.g., by a padding roller process, and the sheets are then forced together under suitable pressure and or heat to generate a bond.

As indicated above, the hexagonal geometric shape of the outer hexagon 1110 and smaller inner hexagon 1130 are a preferred embodiment for providing the floating geometric configuration of the present invention. However, other geometric shapes are possible within the scope of the present invention. For example, the geometric shapes could be rectangular or square with four supporting or connecting strands connecting each inner corner of the outer rectangle or square to the corresponding outer corner of the smaller inner rectangle or square. Or, the geometric shapes could be triangular with only three supporting or connecting strands between adjacent inner corners of the outer triangle and outer corners of the smaller inner triangle.

In the rectangular or square embodiment of the present invention, described in the preceding paragraph, there would preferably be two linear strands that extend continuously throughout the entirety of the geogrid for each outer rectangle or square, such continuous strands extending at an angle of approximately 90° from each other. In the triangular embodiment, there will likely be three linear strands for each outer triangle which extend from each other by approximately 120°, similar to linear strands 1120 of the preferred hexagon embodiment described in detail herein.

Also, different geometric shapes could be possible without departing from the present invention. For example, the inner geometric shape could be a circular ring supported within the preferred outer hexagon shape with six supporting strands similar to the preferred embodiment disclosed herein. Thus, it is intended that the geometric shapes of the outer repeating structure and the inner or interior floating structure not be limited to identical geometric forms.

Figure 17:
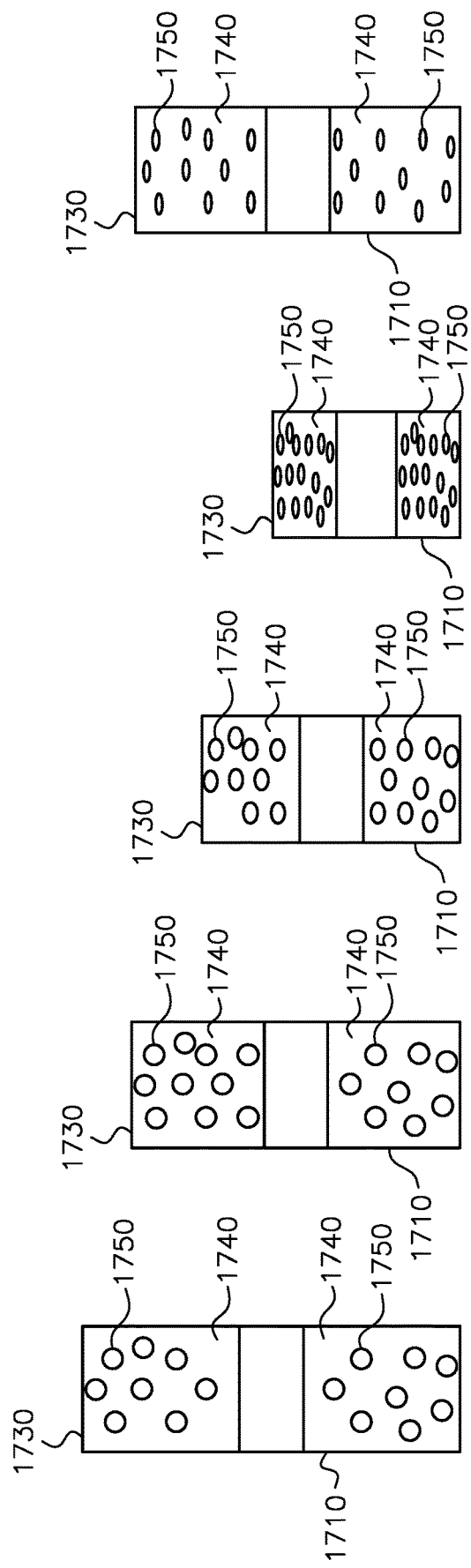
FIGS. 17A-17E illustrate a compression mechanism hypothesis of a three-layer integral geogrid having two outer layers with a cellular structure in accordance with the present invention that is under an applied load.

FIGS. 17A-17E illustrate a compression mechanism hypothesis of a three-layer integral geogrid having one or more cellular layers according to the present invention that is associated with cellular openings in the first cellular outer layer 1710 and the second cellular outer layer 1730 under an applied load. As shown in FIG. 17A, prior to an applied loading, the cellular openings 1750 and the polymer 1740 around it are undisturbed. As the loading begins (FIG. 17B), the polymer 1740 around the cellular openings 1750 begins to compress. As loading continues (FIG. 17C), the polymer 1740 around the cellular openings 1750 stops yielding, and the cellular openings 1750 begin to compress. As more loading continues (FIG. 17D), the cellular openings 1750 are even more compressed and the polymer 1740 around the cellular openings begins to yield again. And finally, as shown in FIG. 17E, as the loading is removed, the rib of the expanded multilayer integral geogrid is decompressed, with permanent cellular opening deformation remaining due to the cellular openings 1750 having collapsed to a certain degree, along with permanent deformation of the polymer 1740 around the cellular openings.

Figure 18:
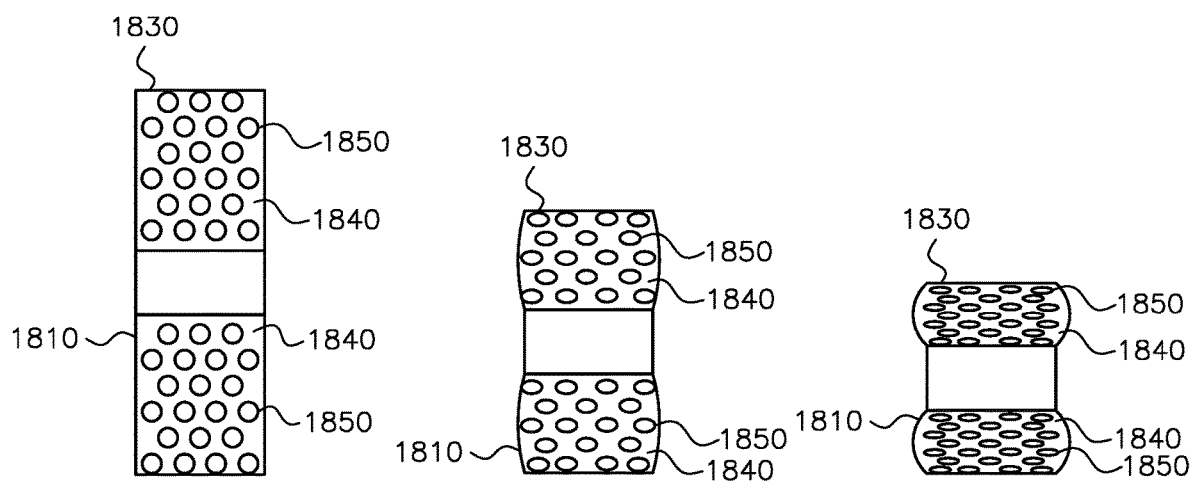
FIGS. 18A-18C illustrate a pliable rib mechanism hypothesis of the two outer layers of a three-layer integral geogrid having two outer layers with a cellular structure in accordance with the present invention that is under an applied load, and demonstrates both vertical and horizontal pliability of the integral geogrid.

FIGS. 18A-18C illustrate a pliable rib mechanism hypothesis of the expanded, cellular layers of a three-layer integral geogrid having one or more cellular layers. The pliable rib mechanism hypothesis is also associated with the presence of cellular openings in the first cellular outer layer 1810 and the second cellular outer layer 1830, and demonstrates both vertical and horizontal pliability of the integral geogrid under applied load. As shown in FIG. 18A, prior to an applied loading, the cellular openings 1850 and the polymer 1840 around the cellular openings 1850 are undisturbed. As a load is applied (FIG. 18B), the system begins to undergo elastic compression as the cellular openings 1850 begin to deform. Finally, as shown in FIG. 18C, the system stops yielding as the cellular openings 1850 begin to compress and densify. Thus, by virtue of the cellular openings 1850 present in the first cellular outer layer 1810 and the second cellular outer layer 1830 of the three-layer integral geogrid, both vertical and horizontal pliability of the integral geogrid under load is achieved.

Figure 19:
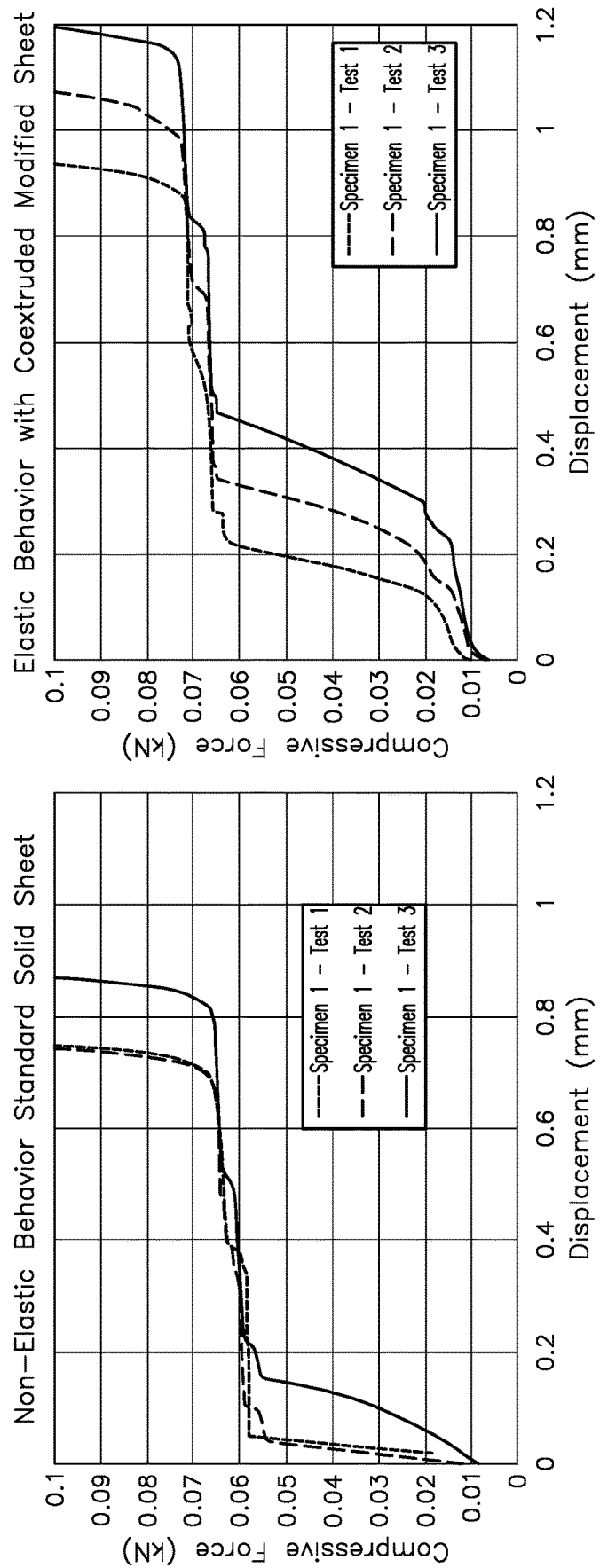
FIG. 19 presents graphs illustrating a comparison of the non-elastic rib behavior based on a starting sheet of a conventional monolayer integral geogrid, versus the elastic rib behavior of a starting sheet of the multilayer integral geogrid having two outer layers with a cellular structure according to the present invention.

FIG. 19 presents graphs illustrating a comparison of the non-elastic rib behavior based on a starting sheet of a conventional integral geogrid, with the elastic rib behavior of a starting sheet of the present multilayer integral geogrid having one or more cellular layers. As is evident, ribs of the multilayer integral geogrid having one or more cellular layers that are vertically and horizontally pliable facilitate more optimum aggregate positioning and densification. This feature of the expanded multilayer integral geogrid enables using "big" ribs without the ribs being "disrupters" of the aggregate system.

Figure 25:
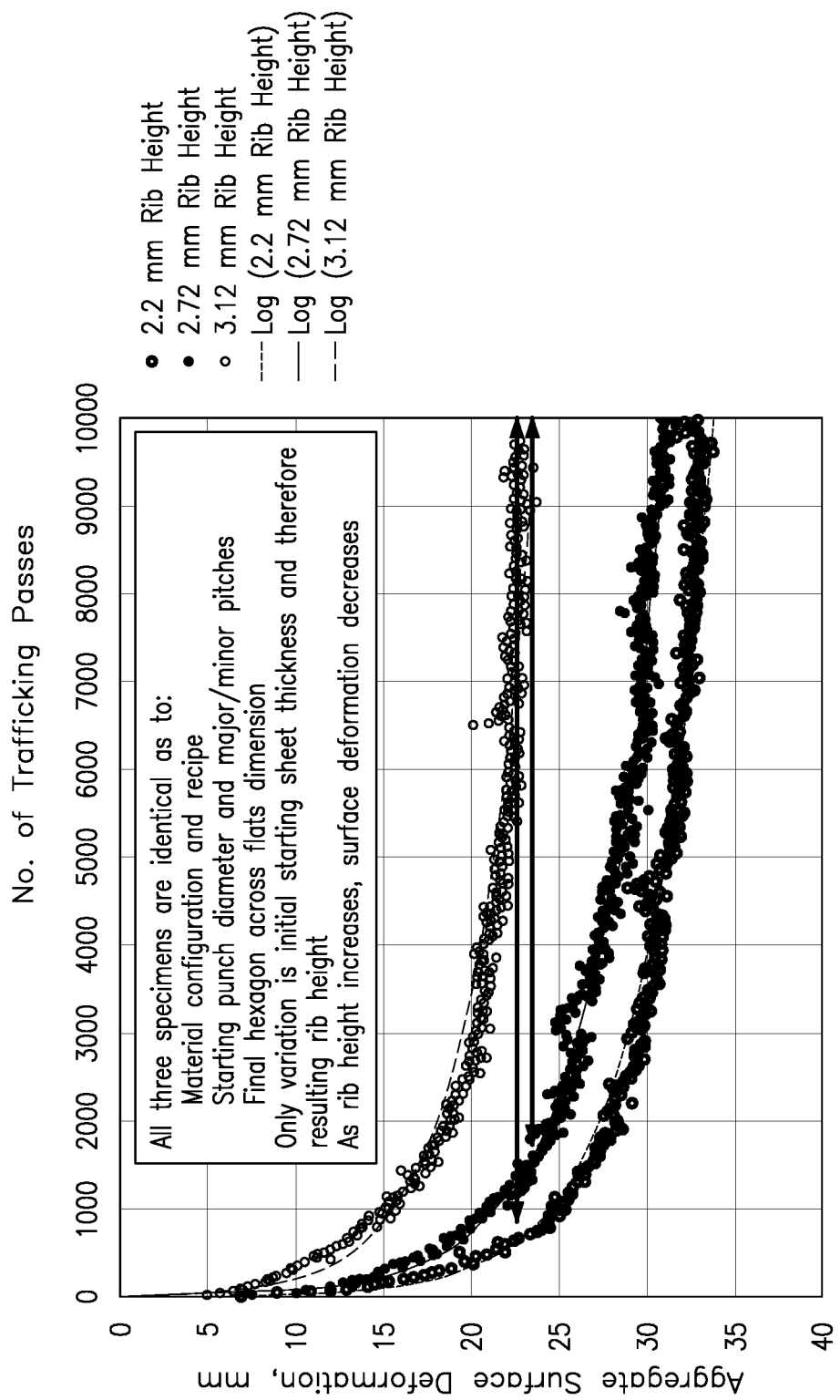
FIG. 25 illustrates for a hexagonal three-layer integral geogrid according to the present invention similar to that shown in FIGS. 10 and 11, the effect of increased rib height on surface deformation.
Figure 26:
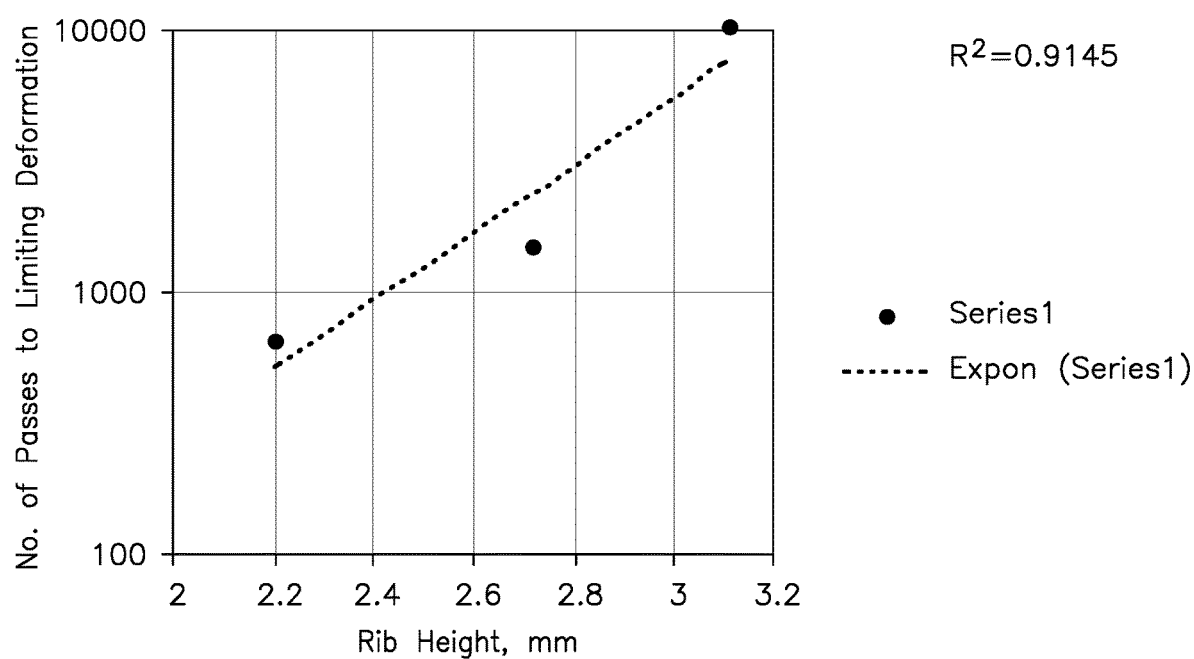
FIG. 26 is a plot of the effect of increased rib height on surface deformation associated with the test results presented in FIG. 25.

Now, turning to additional experimental results that demonstrate the performance benefits of the present invention, see FIGS. 25, 26, and 27. FIG. 25 illustrates, for a hexagonal three-layer integral geogrid according to the present invention similar to that shown in FIGS. 10 and 11, the effect of increased rib height on surface deformation during a tracking test. The only variation in each of the three specimens associated with FIG. 25 is the thickness of the starting sheet, which, of course, determines the resulting rib height of the integral geogrid. FIG. 26 is a plot of the effect of increased rib height on surface deformation associated with the test results presented in FIG. 25. And, FIG. 27 is a table summarizing the effect of increased rib height on surface deformation associated with the test results presented in FIGS. 25 and 26. As is evident from the trafficking test results shown in FIGS. 25, 26, and 27, as rib height increases, the surface deformation of the integral geogrid advantageously decreases.

Figure 28:
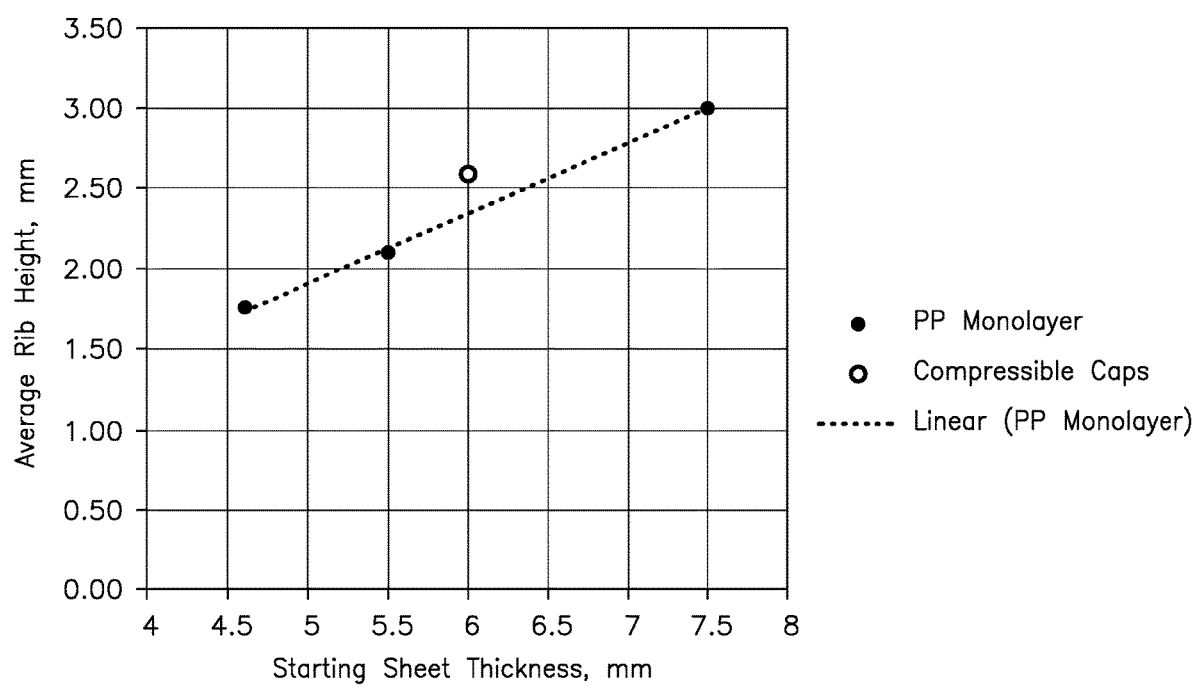
FIG. 28 is a plot of the increased rib height achievable with a hexagonal three-layer integral geogrid according to the present invention versus that achievable with a solid monolayer geogrid.
Figure 29:
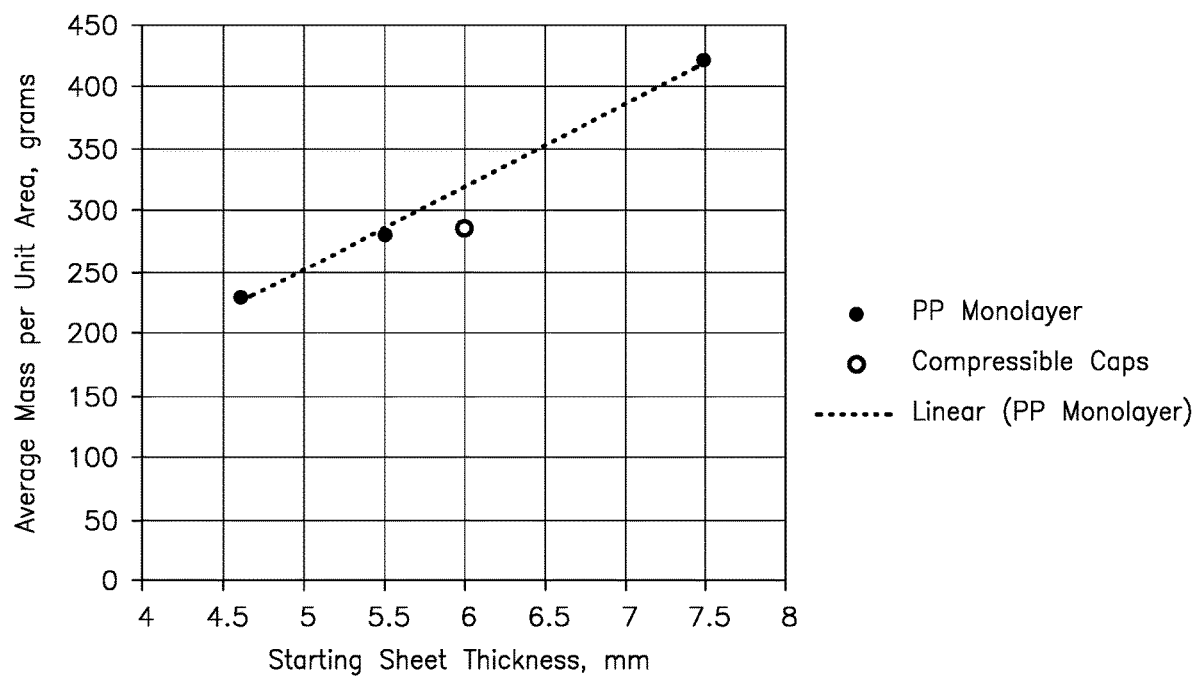
FIG. 29 is a plot of the reduced mass per unit area achievable with a hexagonal three-layer integral geogrid according to the present invention versus that achievable with a solid monolayer geogrid

Furthermore, the integral geogrid having the layers with the cellular structure according to the present invention has other advantageous characteristics. FIG. 28 is a plot of the increased rib height achievable with a hexagonal three-layer integral geogrid according to the present invention versus that achievable with a solid monolayer geogrid. And, for the same integral geogrids as are associated with the FIG. 28 results, FIG. 29 is a plot of the reduced mass per unit area achievable with a hexagonal three-layer integral geogrid according to the present invention versus that achievable with a solid monolayer geogrid. As is evident from FIGS. 28 and 29, the integral geogrid having the outer "cap" layers with the cellular structure according to the present invention has an average rib height of more than 10% of that which is achievable with a solid monolayer geogrid, while also having a unit weight that is 11% less than that of the solid monolayer geogrid.

Figure 30:
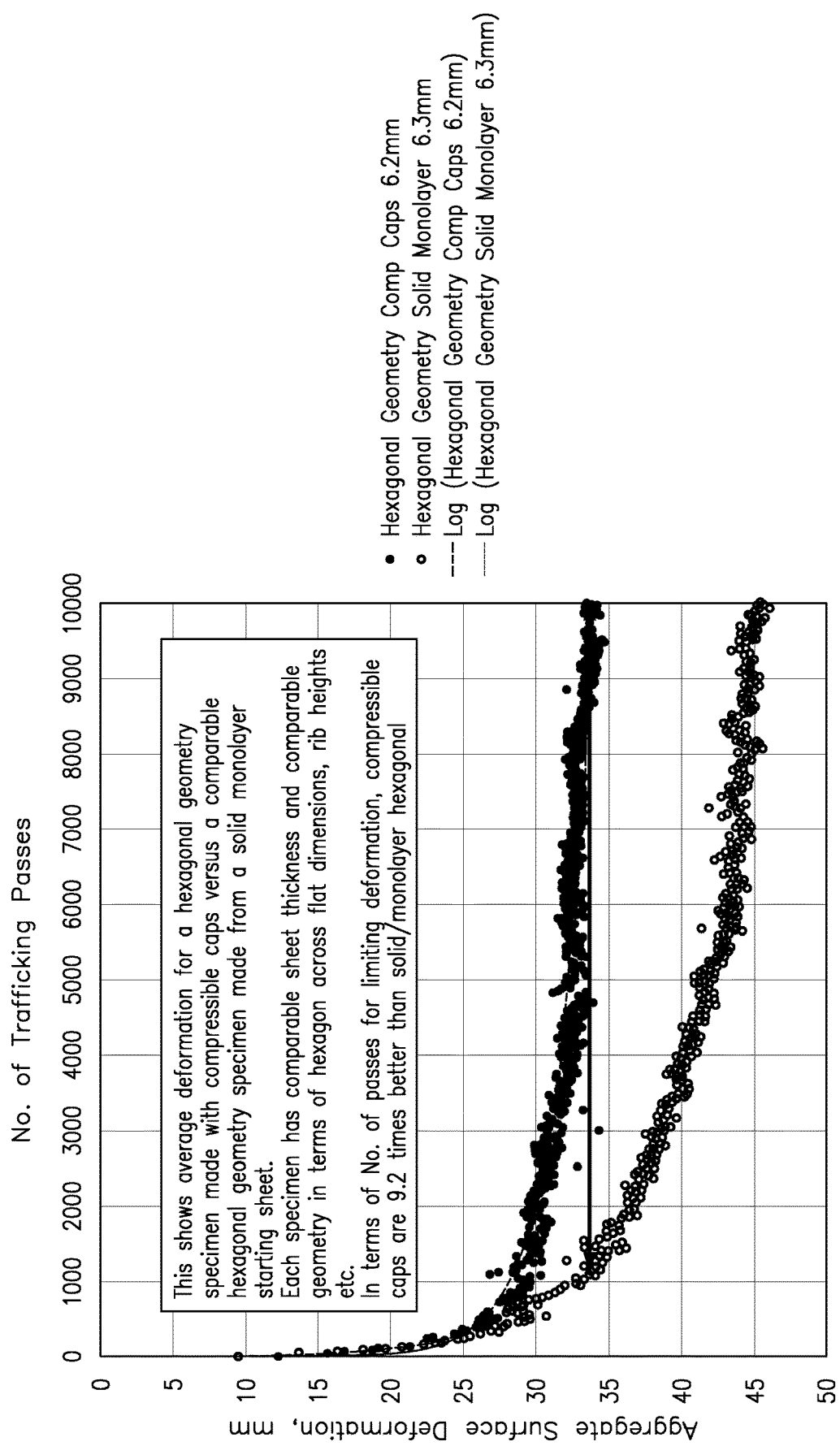
FIG. 30 is a plot of the improved performance achievable with a hexagonal three-layer integral geogrid having compressible, cellular outer layers according to the present invention versus that achievable with a hexagonal solid monolayer geogrid.

Now, turning to additional experimental trafficking results that demonstrate the performance benefits of the present invention, see FIGS. 30 and 31. FIG. 30 is a plot of the improved performance achievable with a hexagonal three-layer integral geogrid having compressible, cellular outer layers according to the present invention versus that achievable with a hexagonal solid monolayer geogrid. FIG. 31 is a table summarizing the structural data associated with the hexagonal three-layer integral geogrid having compressible, cellular outer layers and the hexagonal solid monolayer geogrid utilized in the test results presented in FIG. 30. The starting sheets associated with each specimen have a thickness of 6.2 mm for the three-layer integral geogrid having compressible, cellular outer layers, and 6.3 mm for the solid monolayer geogrid. As is evident from the trafficking test results shown in FIGS. 30 and 31, the three-layer integral geogrid having compressible, cellular outer layers advantageously has less surface deformation than of the solid monolayer geogrid. In fact, in terms of the number of trafficking test passes for limiting deformation, the present invention's three-layer integral geogrid having compressible, cellular outer layers is approximately 9 times better than the solid monolayer geogrid.

Figure 32:
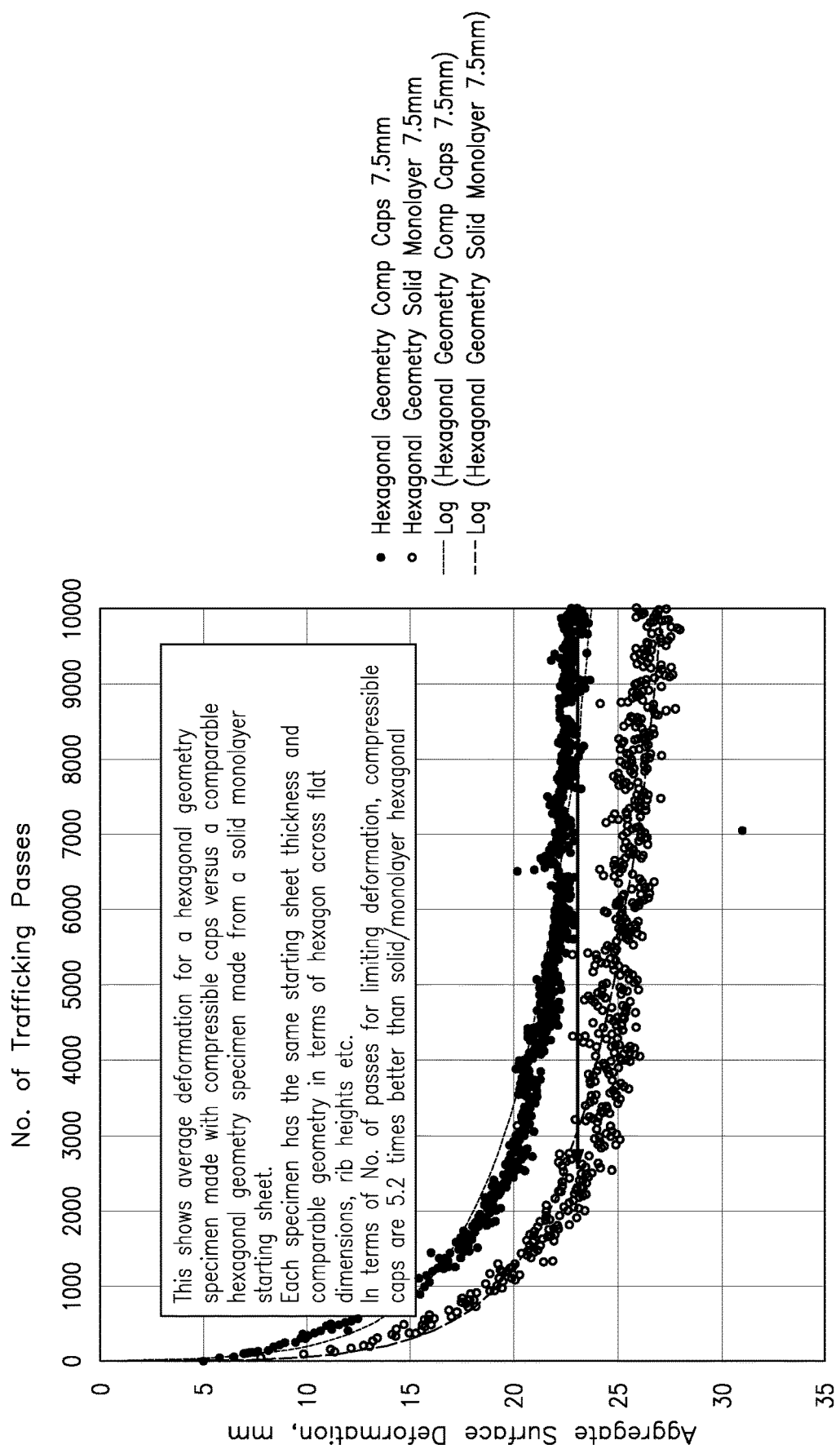
FIG. 32 is another plot of the improved performance achievable with a hexagonal three-layer integral geogrid having compressible, cellular outer layers according to the present invention versus that achievable with a hexagonal solid monolayer geogrid.

Similarly, FIGS. 32 and 33 present experimental trafficking results that demonstrate the performance benefits of the present invention. FIG. 32 is another plot of the improved performance achievable with a hexagonal three-layer integral geogrid having compressible, cellular outer layers according to the present invention versus that achievable with a hexagonal solid monolayer geogrid. FIG. 33 is a table summarizing the structural data associated with the hexagonal three-layer integral geogrid having compressible, cellular outer layers and the hexagonal solid monolayer geogrid utilized in the test results presented in FIG. 32. The starting sheets associated with each specimen in the FIGS. 32 and 33 results are thicker, with a thickness of 7.5 mm for the three-layer integral geogrid having compressible, cellular outer layers, and 7.5 mm for the solid monolayer geogrid. As is evident from the trafficking test results shown in FIGS. 32 and 33, the three-layer integral geogrid having compressible, cellular outer layers advantageously has less surface deformation than of the solid monolayer geogrid. In fact, in terms of the number of trafficking test passes for limiting deformation, the present invention's three-layer integral geogrid having compressible, cellular outer layers is approximately 5 times better than the solid monolayer geogrid.

Figure 34:
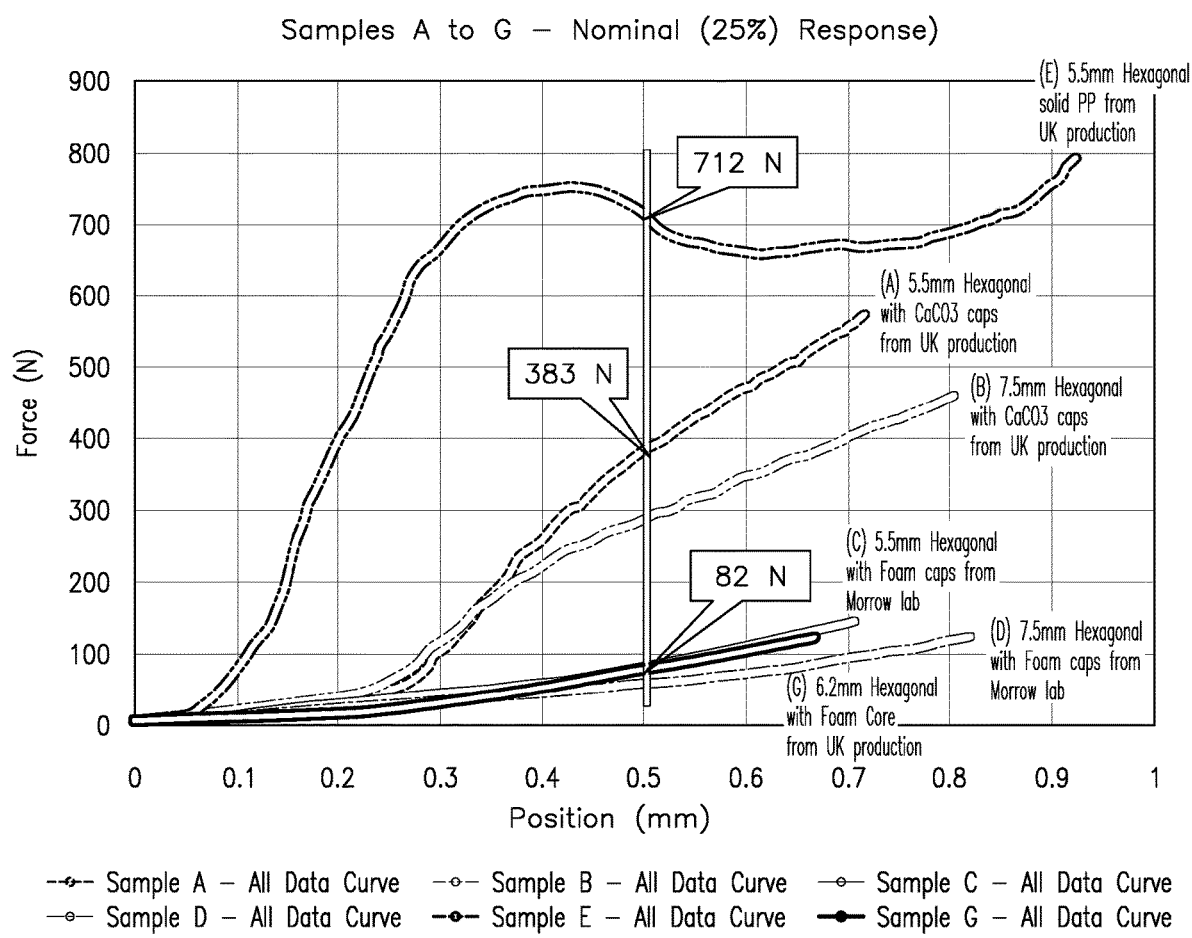
FIG. 34 is a plot of the improved compressibility achievable with a hexagonal three-layer integral geogrid having compressible, cellular outer layers according to the present invention versus that achievable with a hexagonal solid monolayer geogrid.

Now, turning to the compressibility of the inventive integral geogrid, FIG. 34 is a plot of the improved compressibility achievable with a hexagonal three-layer integral geogrid having compressible, cellular outer layers according to the present invention versus that achievable with a hexagonal solid monolayer geogrid. And, FIG. 35 is a table summarizing the force required to produce a certain compressibility associated with the hexagonal three-layer integral geogrid having compressible, cellular outer layers according to the present invention and the hexagonal solid monolayer geogrid utilized in the test results presented in FIG. 34. The results shown in FIGS. 34 and 35 demonstrate that the three-layer integral geogrid having compressible, cellular outer layers according to the present invention requires significantly less force to compress than a solid monolayer geogrid. More specifically, the three-layer integral geogrid having compressible, cellular outer layers according to the present invention requires between 12% and 54% of the amount of force to compress than the solid monolayer geogrid.

Figure 36:
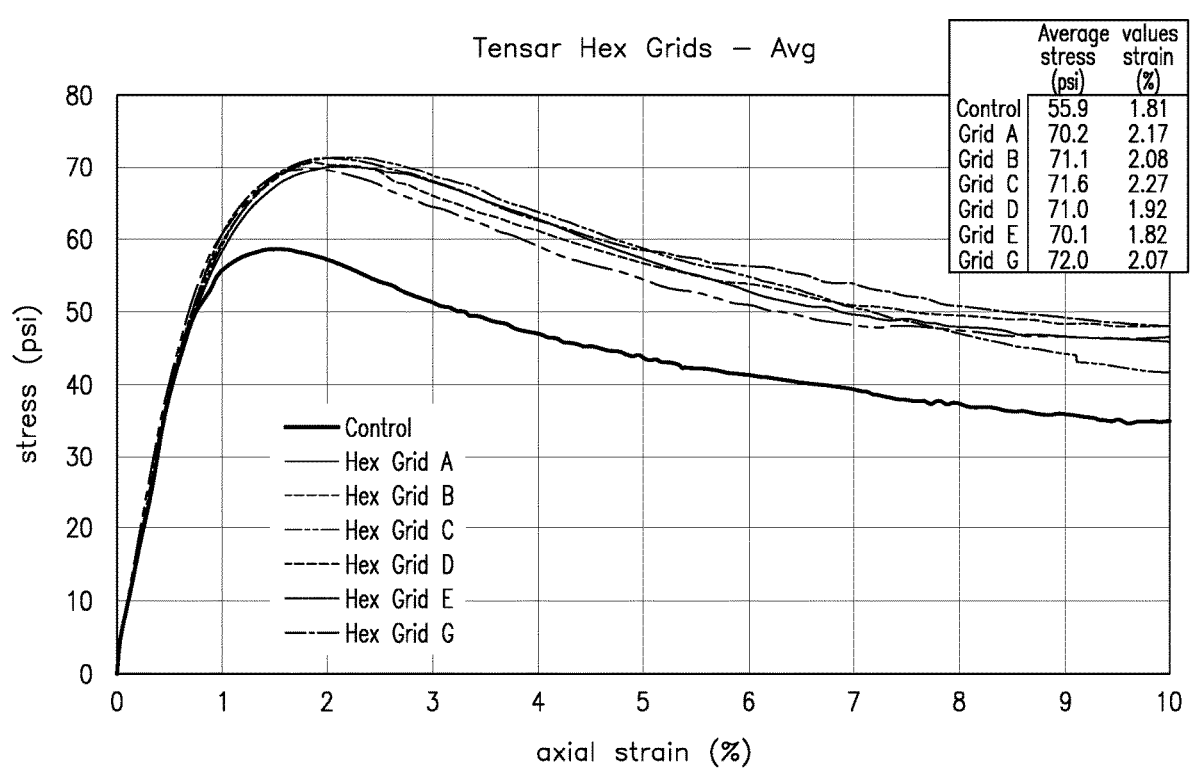
FIG. 36 is a plot of the stiffness achievable with a hexagonal three-layer integral geogrid having compressible, cellular outer layers according to the present invention versus that achievable with a hexagonal solid monolayer geogrid.

And now, FIGS. 36 and 37 present stress—strain experimental results that demonstrate the performance benefits of the present invention. FIG. 36 is a plot of the stiffness achievable with a hexagonal three-layer integral geogrid having compressible, cellular outer layers according to the present invention versus that achievable with a hexagonal solid monolayer geogrid. FIG. 37 is a table summarizing the stress and strain associated with the hexagonal three-layer integral geogrid having compressible, cellular outer layers and the hexagonal solid monolayer geogrid utilized in the test results presented in FIG. 36. Grids A and C are specimens having the three-layer compressible cellular outer layer structure according to the present invention. Grid E is a specimen having a solid monolayer structure. As is evident from FIGS. 36 and 37, for the three-layer compressible cellular outer layer structure according to the present invention, there is no loss in either stiffness or strength.

Figure 41:
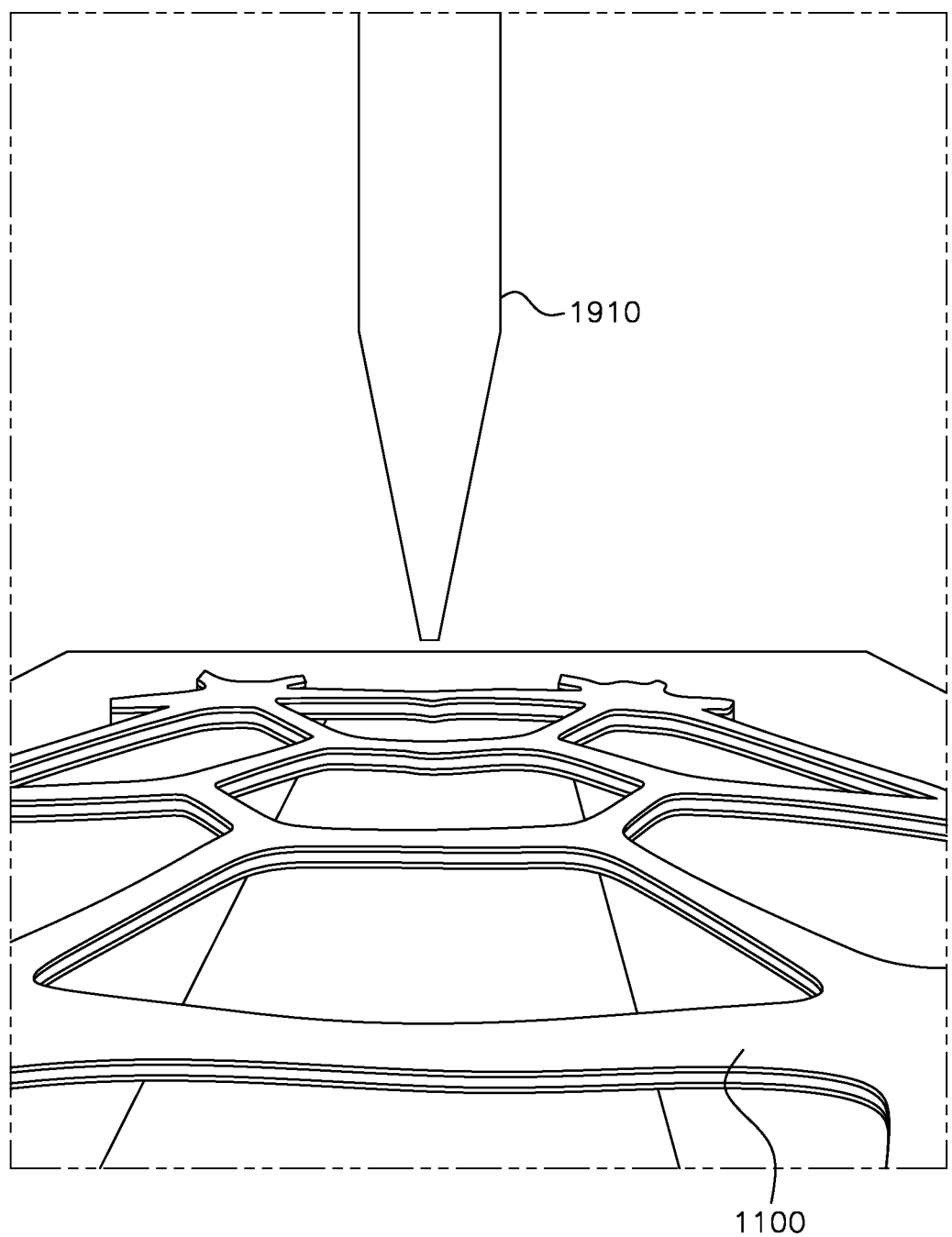
FIG. 41 illustrates an experimental apparatus used to measure the compressibility of integral geogrids according to various embodiments of the present invention.
Figure 42:
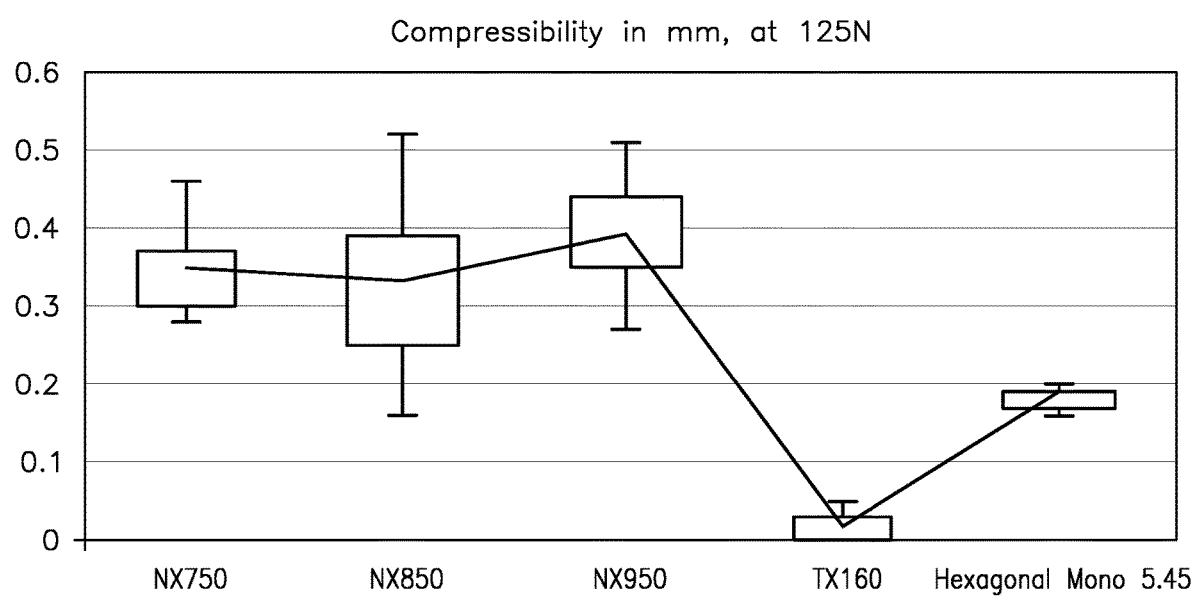
FIG. 42 presents a chart illustrating a comparison of the compressibility, using the apparatus shown in FIG. 41, of various embodiments of integral geogrids according to the present invention versus integral geogrids not having a layer with a cellular structure.

Now, turning to additional compressibility comparisons, FIG. 41 shows an experimental apparatus used to measure the compressibility of an integral geogrid 1100 specimen. The apparatus employs a 1.6 mm wide metal probe 1910 and the application of a 125 N force to compress the integral geogrid 1100 specimens. As shown in FIG. 42, the compressibility of the integral geogrid specimens having a layer with a cellular structure according to the present invention, i.e., NX750, NX850, and NX950, is substantially greater than that of the specimens not having a layer with a cellular structure, i.e., TX160 and Hexagonal Mono.

Figure 43:
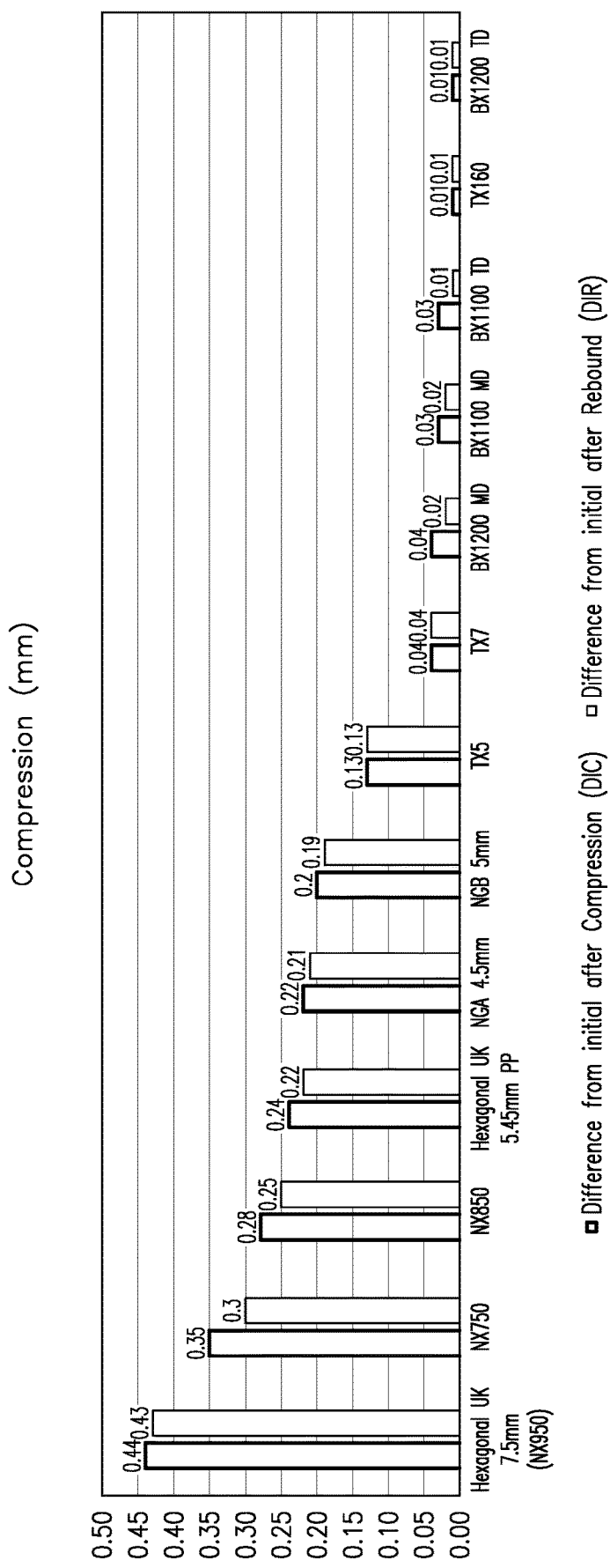
FIG. 43 presents a chart illustrating a comparison of the compressibility, using the apparatus shown in FIG. 41, of various embodiments of integral geogrids according to the present invention versus other integral geogrids not having a layer with a cellular structure.

And, as shown in FIG. 43, both the compressibility and the rebound ability of the integral geogrid specimens having a layer with a cellular structure according to the present invention, i.e., Hexagonal UK 7.5 mm, NX750, NX850, Hexagonal UK 5.45 mm, NGA 4.5 mm, and NGB 5 mm, is substantially greater than that of the specimens not having a layer with a cellular structure, i.e., TX5, TX7, BX 1200 MD, BX1100 MD, BX1100 TD, TX160, and BX1200 TD.

Figure 44:
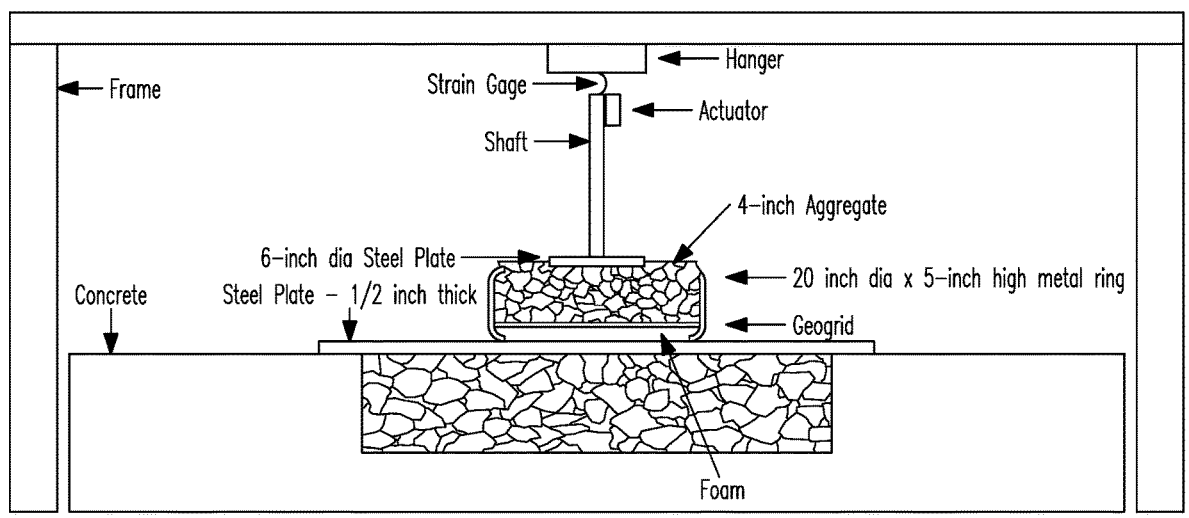
FIG. 44 illustrates another experimental apparatus, a Plate Load Test Rig ("PLTR"), used to measure the displacement of integral geogrids according to various embodiments of the present invention.

FIG. 44 shows another experimental apparatus associated with determining compressibility, a Plate Load Test Rig ("PLTR"), used to measure the displacement of an integral geogrid specimen. In the test, an integral geogrid specimen is layered between a 4-inch layer of aggregate and a layer of foam, with a steel plate being located beneath the foam layer. To determine the compressibility of an integral geogrid specimen, a 1,000 lb force is imparted over 10 cycles to the aggregate/integral geogrid/foam stack. The integral geogrid specimen is then removed from the apparatus and examined for rib compressibility and surface damage.

Figure 45:
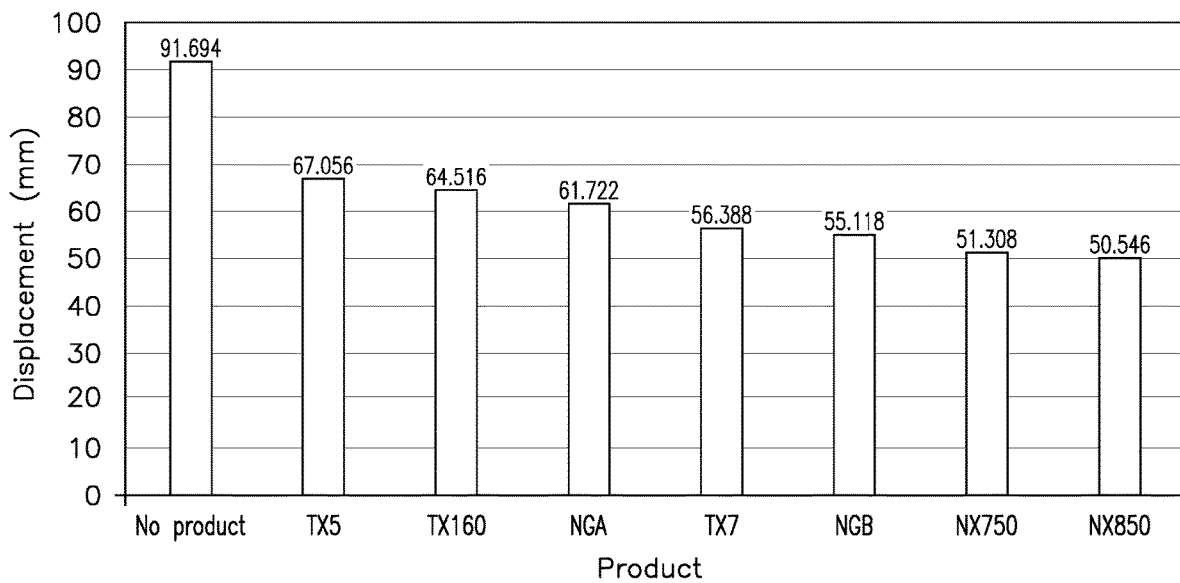
FIG. 45 presents a chart illustrating a comparison of the displacement, using the apparatus shown in FIG. 44, of various embodiments of integral geogrids according to the present invention versus other integral geogrids not having a layer with a cellular structure.
Figure 46:
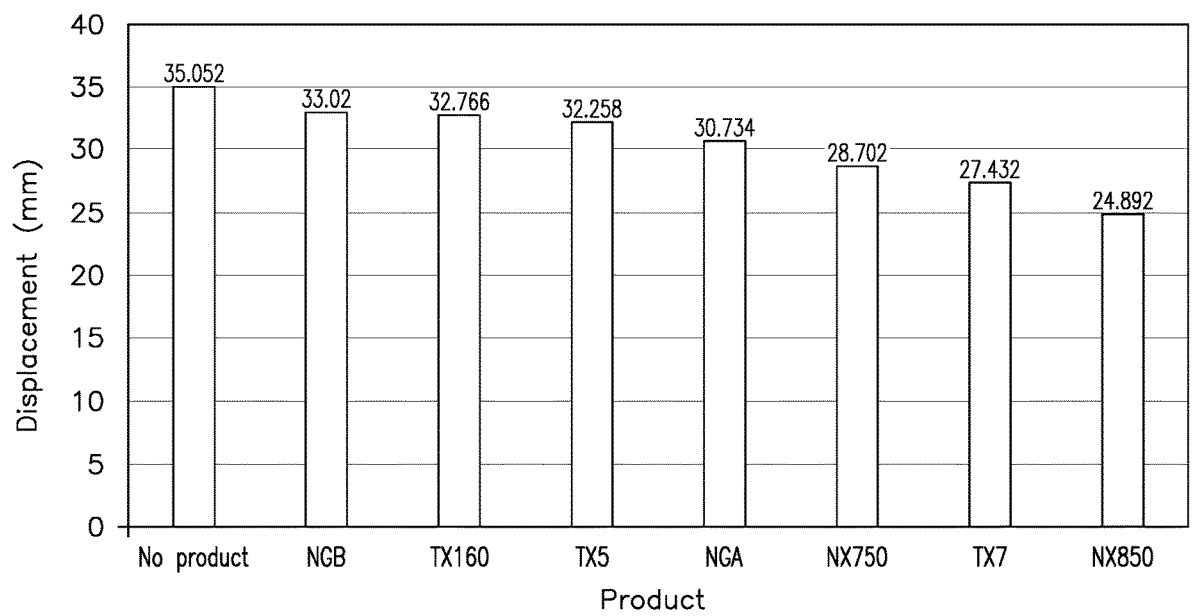
FIG. 46 presents another chart illustrating a comparison of the displacement, using the apparatus shown in FIG. 44, of various embodiments of integral geogrids according to the present invention versus other integral geogrids not having a layer with a cellular structure.
Figure 58:
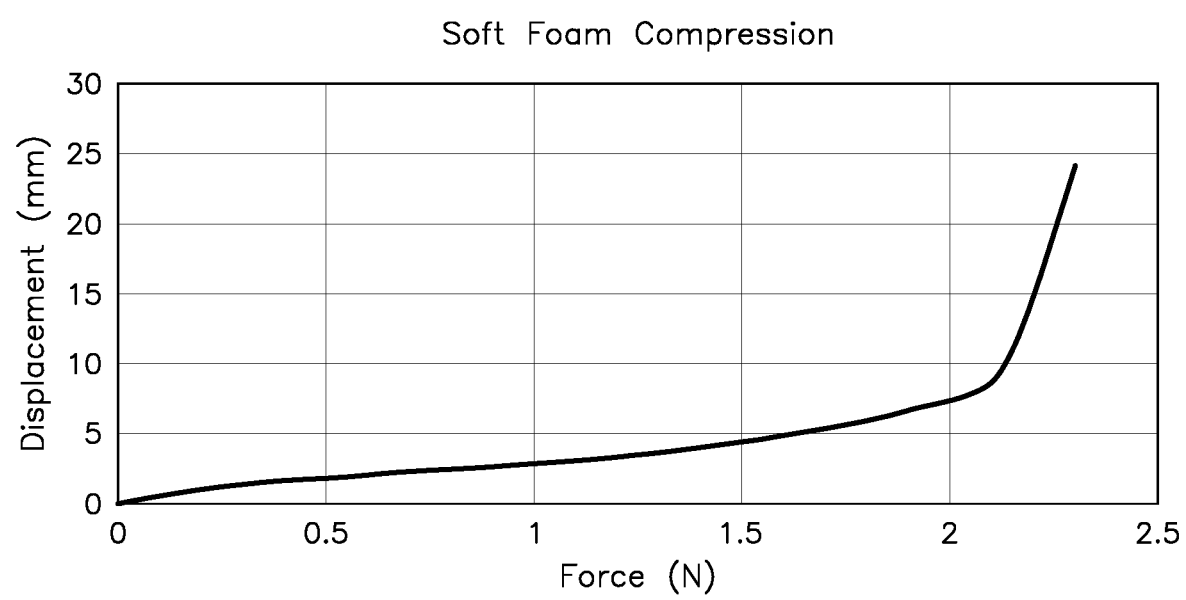
FIG. 58 presents a graph illustrating compression force versus displacement data for a soft foam embodiment of the present invention.
Figure 59:
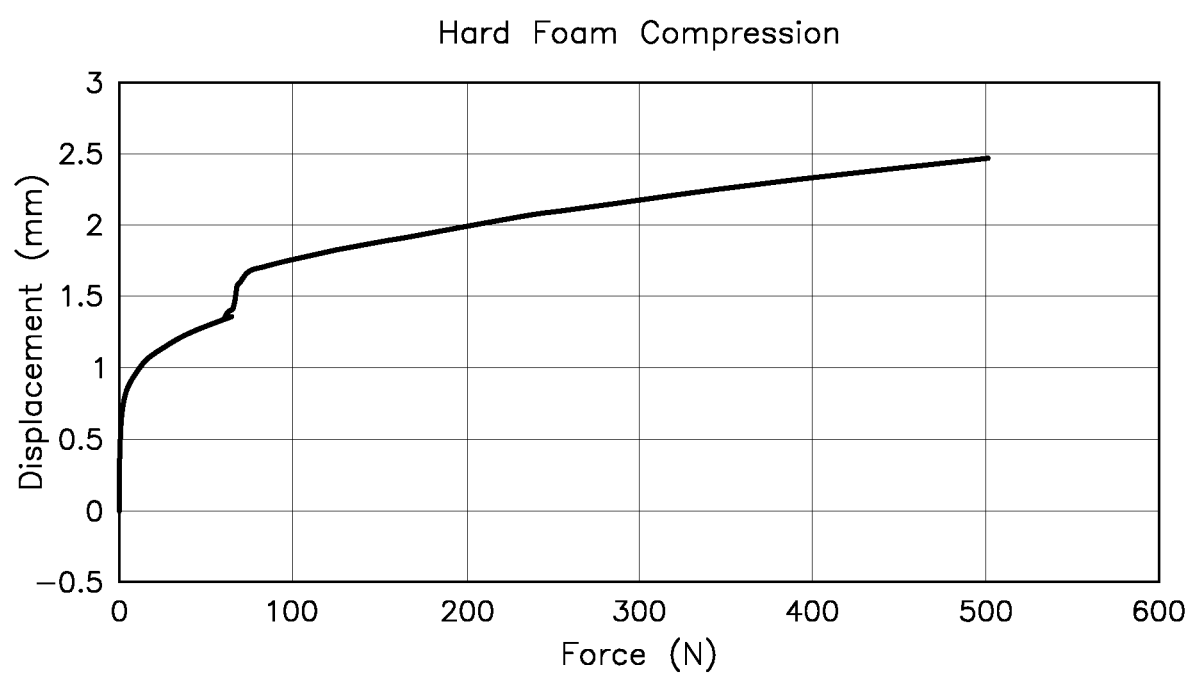
FIG. 59 presents a graph illustrating compression force versus displacement data for a hard foam embodiment of the present invention.

From the tests using the apparatus shown in FIG. 44, the average displacement of various integral geogrid specimens when employing a soft foam and a hard foam is shown, respectively, in FIG. 45 and FIG. 46. As to the meaning of the terms "soft foam" and "hard foam" as used in the aforementioned tests, FIGS. 58 and 59, respectively, present graphs illustrating compression force versus displacement data for such soft and hard foam embodiments. To generate the data shown in FIGS. 58 and 59, an apparatus having a square metal plate, measuring 3 inches×3 inches, is connected via a swivel joint capable of accommodating the angle of the sample to a force-measuring device (such as, for example, an Instron testing machine), and mounted in such a manner that the foam specimen can be compressed at a speed of 10 mm/minute. The apparatus is arranged to support the specimen on a level horizontal plate.

As is evident from FIGS. 45 and 46, the displacement of the integral geogrid specimens having a layer with a cellular structure according to the present invention, i.e., NX750, NX850, NGA, and NGB, is advantageously less than that of the specimens not having a layer with a cellular structure, i.e., TX5, TX160, and TX7.

And now, turning to trafficking test results, FIGS. 47-57 present experimental data that reflect various integral geogrid structural features and parameters that can impact the structural deformation of an integral geogrid when in use. FIGS. 47-51 and the associated description of each are presented herein simply as background information, i.e., as a way of describing how the research and development efforts of the inventors led to the integral geogrid structures described herein as the embodiments of the invention. The experimental data associated with said embodiments of the invention are presented in FIGS. 52-57.

Figure 47:
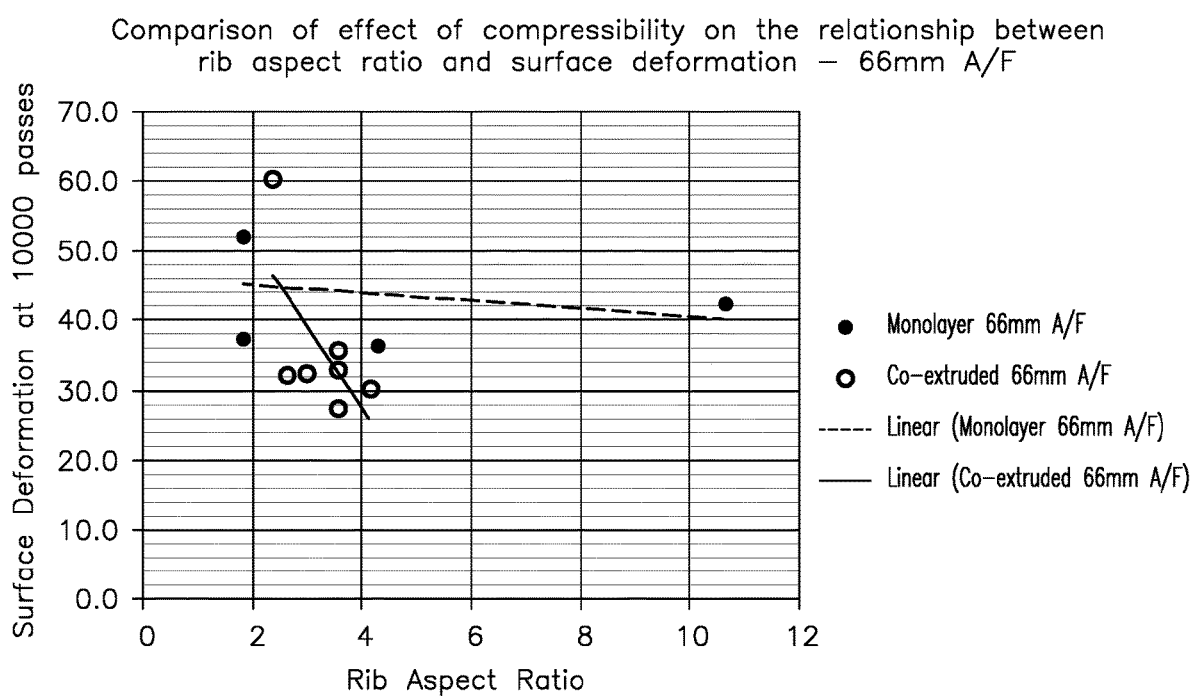
FIG. 47 presents a graph illustrating a comparison of the effect of compressibility on the relationship between rib aspect ratio and surface deformation for two integral geogrids, with one having a layer with a cellular structure.

With regard to the background information, FIG. 47 provides a comparison of the effect of compressibility on the relationship between rib aspect ratio and surface deformation for two integral geogrids, i.e., a monolayer integral geogrid and a coextruded multilayer integral geogrid with one layer having a cellular structure. FIG. 47 shows that, during trafficking, directionally at least, an integral geogrid having a coextruded multilayer structure with some degree of compressibility has some benefit in terms of the relationship between surface deformation and rib aspect ratio. That is, with a coextruded multilayer structure having some degree of compressibility, obtaining lower surface deformation without resorting to a very high aspect ratio can be beneficial.

Figure 48:
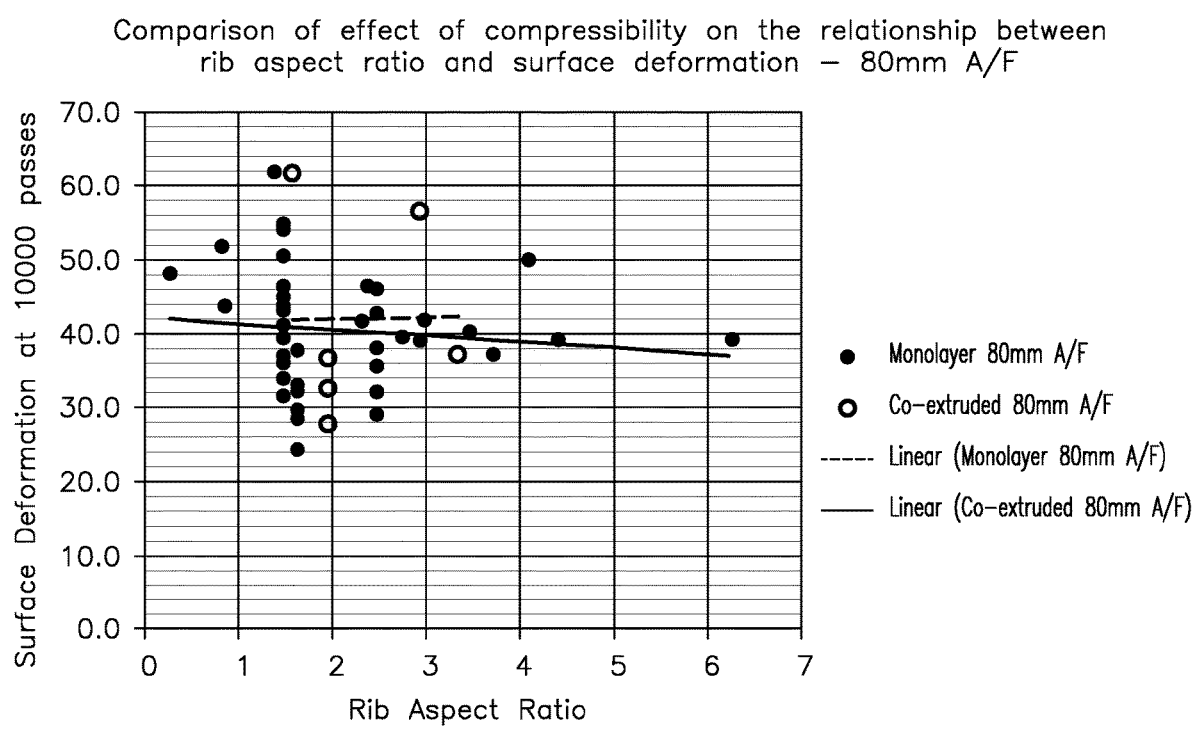
FIG. 48 presents a graph illustrating a comparison of the effect of compressibility on the relationship between rib aspect ratio and surface deformation for two other integral geogrids, with one having a layer with a cellular structure.

However, turning to FIG. 48, another comparison of the effect of compressibility on the relationship between rib aspect ratio and surface deformation for two integral geogrids i.e., a monolayer integral geogrid and a coextruded multilayer integral geogrid with one layer having a cellular structure, shows that the benefit shown in FIG. 47 can, depending upon the integral geogrid geometry, be less pronounced. While the integral geogrids employed in the FIG. 47 test have a 66 mm across the flats dimension, the integral geogrids employed in the FIG. 48 test have an 80 mm across the flats dimension. Essentially, the FIG. 48 data show that some benefit can be derived from optimizing both material properties and geometry, as an 80 mm geometry is, in general, more suitable than a 66 mm geometry for the majority of granular materials encountered in typical geogrid applications.

Figure 49:
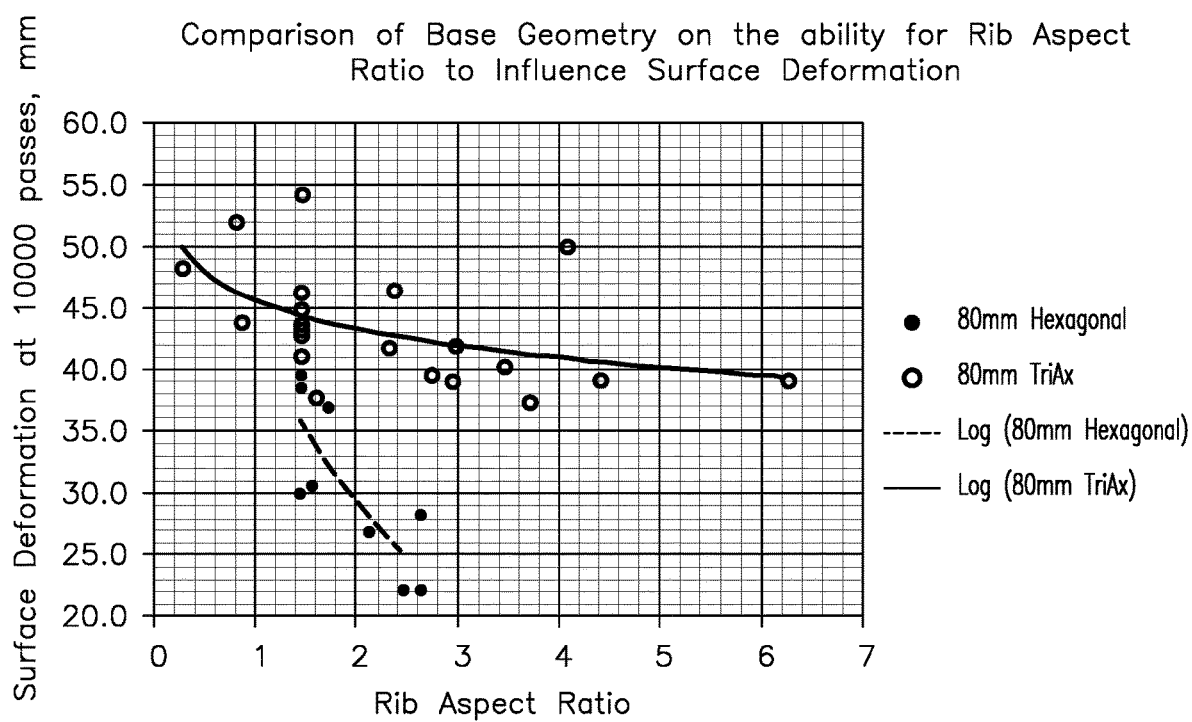
FIG. 49 presents a graph illustrating a comparison of base geometry on the ability of rib aspect ratio to influence surface deformation for two integral geogrids not having a layer with a cellular structure.
Figure 51:
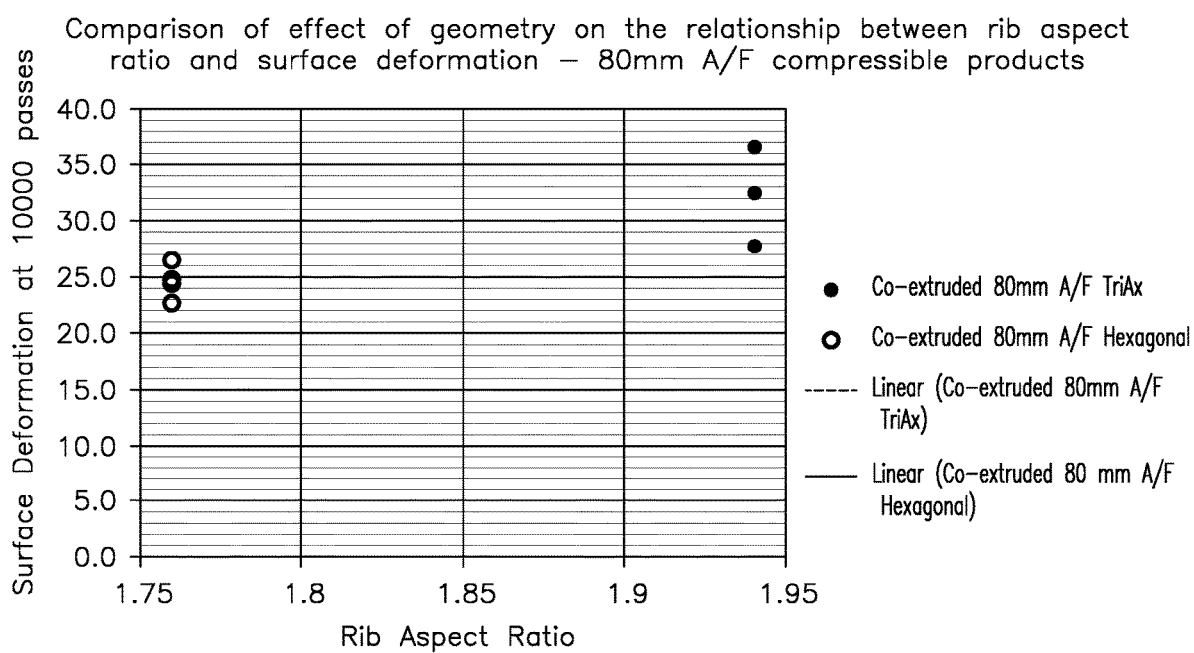
FIG. 51 presents a graph illustrating a comparison of the effect of base geometry on the relationship between rib aspect ratio and surface deformation in similarly compressible integral geogrids.

Now, turning to a comparison based on geometry alone, FIG. 49 shows the effect of base geometry on the ability of rib aspect ratio to influence surface deformation for two integral geogrids not having a layer with a cellular structure, i.e., a triaxial integral geogrid, and a hexagonal integral geogrid as described herein. FIG. 49 shows that, during trafficking, directionally at least, an integral geogrid having a hexagonal geometry has some benefit in terms of the relationship between surface deformation and rib aspect ratio. That is, with a hexagonal geometry, obtaining lower surface deformation without resorting to a very high aspect ratio can be beneficial. And finally, with regard to the background information, FIG. 50 provides a comparison of the benefits of base geometry in similarly compressible integral geogrid products. That is, FIG. 50 shows that, during trafficking, for a triaxial integral geogrid and a hexagonal integral geogrid, each of which has a single inner layer having a cellular structure disposed between a first and a second outer layer of a non-cellular structure, use of the hexagonal geometry is beneficial in that it provides lower surface deformation with a lower rib aspect ratio. Similarly, FIG. 51 provides graphically a comparison of the effect of base geometry on the relationship between rib aspect ratio and surface deformation in similarly compressible integral geogrids, i.e., the above-described triaxial integral geogrid and hexagonal integral geogrid.

Now, turning to the trafficking data associated with the various embodiments of the instant invention, the experimental results shown in FIGS. 52-57 demonstrate the benefit to be achieved with an integral geogrid having first and second outer layers of a cellular structure as described herein, and an inner layer of a non-cellular structure.

Figure 53:
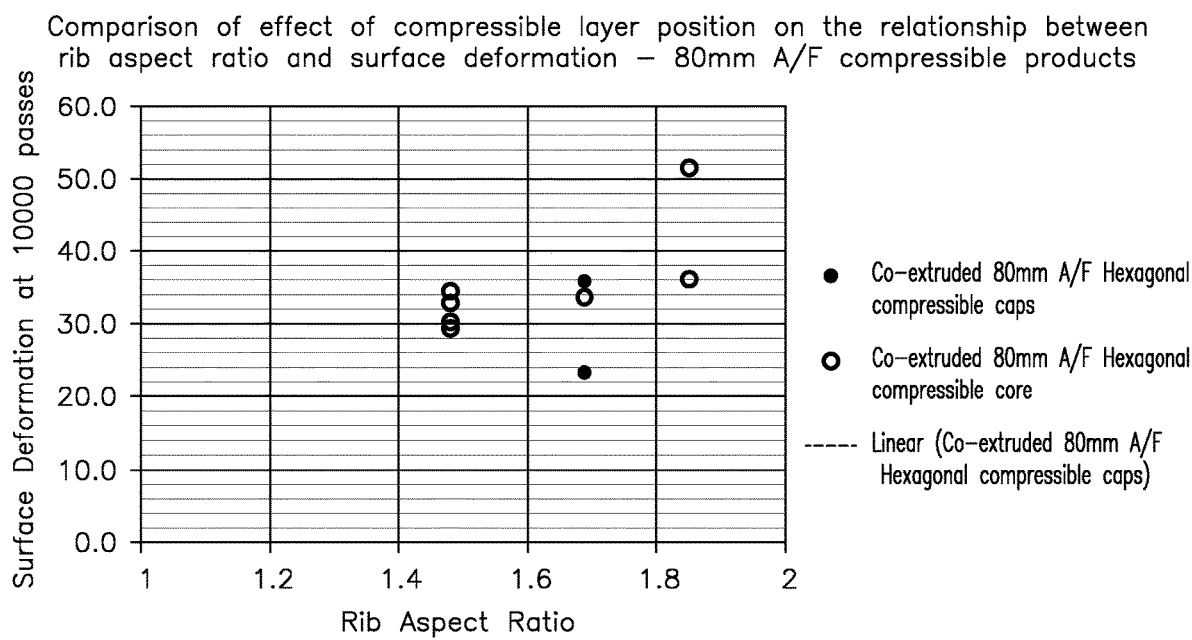
FIG. 53 presents a graph illustrating a comparison, for the single base geometry associated with FIG. 52, of the effect of the position of the layer with a cellular structure on the relationship between rib aspect ratio and surface deformation.

FIG. 52 provides a comparison, for a single base geometry, of the effect on surface deformation of the position of the layer with a cellular structure in the multilayered integral geogrid. FIG. 53 provides a graphical comparison, for the single base geometry associated with FIG. 52, of the effect of the position of the layer with a cellular structure on the relationship between rib aspect ratio and surface deformation. As is evident from FIGS. 52 and 53, the integral geogrid according to the present invention having the outer layers of a cellular structure and an inner layer of a non-cellular structure exhibits less surface deformation during trafficking than an integral geogrid having the cellular structure layer as the inner layer.

Figure 55:
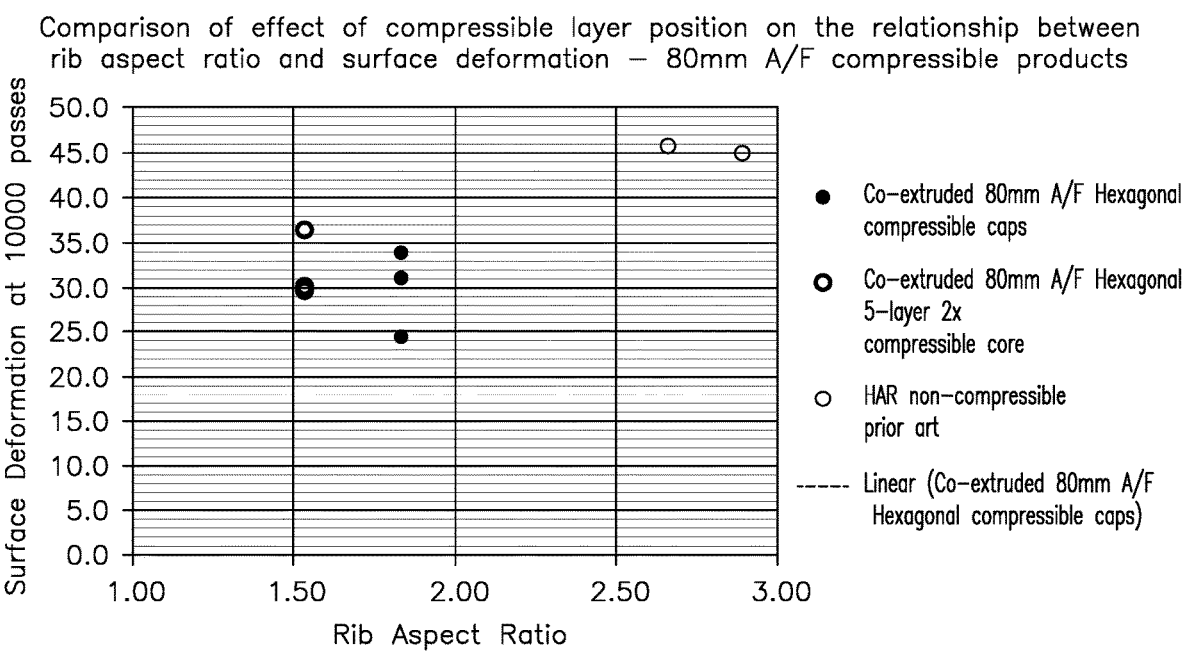
FIG. 55 presents another graph illustrating a comparison, for the single base geometry associated with FIG. 52, of the effect of the position of the layer with a cellular structure on the relationship between rib aspect ratio and surface deformation.

And, FIG. 54 provides still another comparison for the single base geometry associated with FIG. 52, of the effect on surface deformation of the position of the layer with a cellular structure in the multilayered integral geogrid. The associated FIG. 55 presents another graphical comparison, for the single base geometry associated with FIG. 52, of the effect of the position of the layer with a cellular structure on the relationship between rib aspect ratio and surface deformation. In the experiments reported in FIGS. 54 and 55, the performance of a three-layer integral geogrid having outer cellular structure layers is compared with both a five-layer integral geogrid having two "sandwiched" inner cellular structure layers, and an integral geogrid having a single layer without a cellular structure. As is evident from FIGS. 54 and 55, of the three aforementioned integral geogrid structures, the integral geogrid according to the present invention having the outer layers of a cellular structure and an inner layer of a non-cellular structure exhibits the least surface deformation during trafficking.

Figure 57:
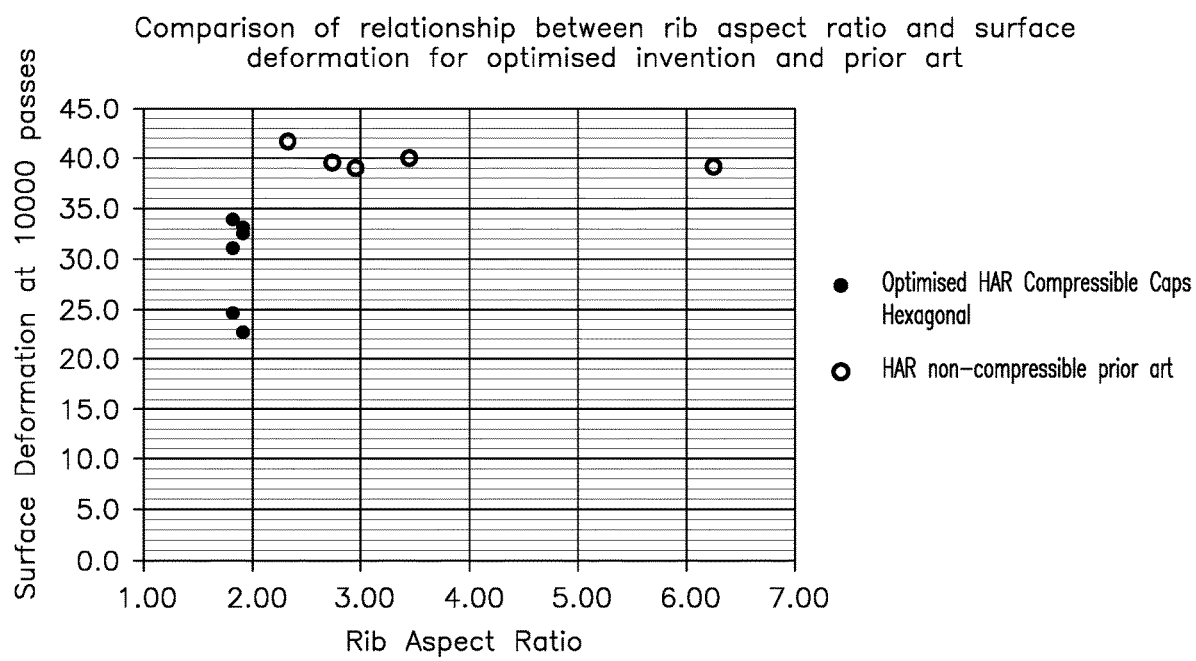
FIG. 57 presents a graph illustrating a comparison, for the integral geogrid according to the present invention having the single base geometry associated with FIG. 52 and a prior art geogrid not having a layer with a cellular structure, of the effect of the compressibility of the layer with a cellular structure on the relationship between rib aspect ratio and surface deformation.

And finally, FIGS. 56 and 57 present experimental data that reflect the combined beneficial effect of incorporating in an integral geogrid the various features of the integral geogrid according to the present invention. FIG. 56 provides a comparison, for the integral geogrid according to the present invention having the single base geometry associated with FIG. 52 and a prior art geogrid not having a layer with a cellular structure, of the effect on surface deformation of the layer with a cellular structure. And, the associated FIG. 57 provides a graphical comparison, for the integral geogrid according to the present invention having the single base geometry associated with FIG. 52 and a prior art geogrid not having a layer with a cellular structure, of the effect of the compressibility of the layer with a cellular structure on the relationship between rib aspect ratio and surface deformation. FIGS. 56 and 57 show that by optimizing both the geometry and the material properties via coextrusion, and by correctly positioning the layers having the compressive, cellular structure, the integral geogrid according to the present invention provides a reduction of approximately 25% in terms of aggregate surface deformation. Furthermore, the aforementioned result is achieved with starting sheet thicknesses that are between 12% and 28% of those of prior art geogrids.

In summary, by virtue of the multilayer integral geogrids having one or more cellular layers of the present invention having not only a multilayer construction, but with at least one layer thereof having a cellular structure as a result of the distribution of cellular openings therein, the integral geogrids provide for increased layer compressibility under load.

Furthermore, the multilayer nature of the multilayer integral geogrids having one or more cellular layers of the present invention provides for overall greater aggregate engagement by the integral geogrid relative to that of prior monolayer integral geogrids. In addition, by virtue of the one or more cellular layers, the multilayer integral geogrids of the present invention are characterized by a structural compliance, i.e., initial give or flexibility, that leads to better compaction and higher density, yet with a final integral geogrid composite stiffness when incorporated in a soil construction that is greater as a result of the initial give of the multilayer integral geogrid.

In addition, certain embodiments of the multilayer integral geogrids having one or more cellular layers of the present invention provide higher aspect ratios on all strands compared to those of prior integral geogrids. Because the higher aspect ratio associated with certain embodiments of the integral geogrids of the present invention increases aggregate interlock, the multilayer integral geogrids having one or more cellular layers of the present invention can better accommodate the varying aspect ratios of aggregate.

The foregoing is considered as illustrative only of the principles of the invention. Furthermore, since numerous modifications and changes may readily occur to those skilled in the art, it is not desired to limit the invention to the exact construction and operation described and shown.

What is claimed is:

1. A multilayer integral geogrid for interlocking with, stabilizing, and strengthening aggregate, said integral geogrid comprising:
 a plurality of layers each of a polymeric material,
 with at least a first outer layer and a second outer layer of said plurality of layers having a cellular structure to improve the initial interaction between and compatibility of a soil or aggregate and the integral geogrid to maximize soil or aggregate density and properties after compaction, and
 wherein each of the polymeric layers comprises a plurality of interconnected oriented strands and partially oriented junctions forming a repeating pattern of outer hexagons having an array of openings therein,
 supporting ribs extending inwardly from each of said outer hexagons to support inside each of said outer hexagons a smaller inner hexagon having an unobstructed, open center and oriented strands and tri-nodes, each of said tri-nodes interconnecting only one of said supporting ribs and two of said oriented strands of the inner hexagon, said outer hexagons, said supporting ribs and said inner hexagons defining three different geometric configurations which are repeating throughout an entirety of the integral geogrid, and
 said oriented strands and said partially oriented junctions of said outer hexagons defining a plurality of linear strands that extend continuously throughout the entirety of the integral geogrid.

2. The multilayer integral geogrid according to claim 1, wherein the first cellular outer layer and the second cellular outer layer have a void volume of from about 20% to about 70%.

3. The multilayer integral geogrid according to claim 1, wherein the first cellular outer layer and the second cellular outer layer have a compressibility factor of from about 20% to about 60%.

4. The multilayer integral geogrid according to claim 1, wherein the first cellular outer layer and the second cellular outer layer have a foam construction.

5. The multilayer integral geogrid according to claim 4, wherein the foam is associated with a foaming agent or gas injection.

6. The multilayer integral geogrid according to claim 1, wherein the first cellular outer layer and the second cellular outer layer have a construction that includes a particulate filler.

7. The multilayer integral geogrid according to claim 6, wherein the particulate filler is calcium carbonate.

8. The multilayer integral geogrid according to claim 1, wherein the multilayer integral geogrid is produced from a coextruded multilayer polymer sheet.

9. The multilayer integral geogrid according to claim 1, wherein the multilayer integral geogrid is produced from a laminated multilayer polymer sheet.

10. The multilayer integral geogrid according to claim 1, wherein the oriented strands have been biaxially stretched.

11. The multilayer integral geogrid according to claim 1, wherein the multilayer integral geogrid has the first cellular outer layer, a non-cellular inner layer, and the second cellular outer layer, with the first cellular outer layer and the second cellular outer layer being arranged on opposite planar surfaces of the non-cellular inner layer.

* * * * *